(12) United States Patent  (10) Patent No.: US 6,705,776 B2
Watanabe  (45) Date of Patent: Mar. 16, 2004

(54) ELECTROMAGNETIC ACTUATOR AND SHUTTER DEVICE FOR CAMERA

(75) Inventor: Nobuaki Watanabe, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 10/031,511

(22) PCT Filed: May 18, 2001

(86) PCT No.: PCT/JP01/04142
§ 371 (c)(1),
(2), (4) Date: Jan. 16, 2002

(87) PCT Pub. No.: WO01/89067
PCT Pub. Date: Nov. 22, 2001

(65) Prior Publication Data
US 2002/0113502 A1 Aug. 22, 2002

(30) Foreign Application Priority Data

May 18, 2000 (JP) ........................................ 2000-152681
Aug. 10, 2000 (JP) ........................................ 2000-243465

(51) Int. Cl.[7] .............................. G03B 9/00; G03B 9/36
(52) U.S. Cl. ...................................... 396/463; 396/508
(58) Field of Search ................................ 396/463, 465, 396/467, 468, 469, 508

(56) References Cited

U.S. PATENT DOCUMENTS 4,265,530 A 5/1981 Petersen
4,531,820 A 7/1985 Petersen
5,689,746 A 11/1997 Akada

FOREIGN PATENT DOCUMENTS

| DE | 3100474 A1 | 12/1981 |
| JP | 4109856 | 4/1992 |
| JP | 10112968 | 4/1998 |
| JP | 11136919 | 5/1999 |
| JP | 11178306 | 7/1999 |
| WO | WO83/04348 | 12/1983 |

Primary Examiner—Rodney Fuller
Assistant Examiner—Michael Dalakis
(74) Attorney, Agent, or Firm—Pillsbury Winthrop LLP

(57) ABSTRACT

An electromagnetic actuator for driving the shutter of a camera includes a rotor (10) magnetized with the N and S poles, and first magnetic pole parts (21, 31) and second magnetic pole parts (22, 32) that are disposed to face the outer circumferential surface of the rotor (10) and generate mutually different magnetic poles when an electric current is applied to the coil (40), in which an output pin (11) of the rotor (10) is magnetized with one of the N and the S poles and forms a projection that projects outward in the radial direction, and, in the vicinity of the first magnetic pole part (31), an auxiliary magnetic pole piece (33) is provided that is disposed near the output pin (11) serving as a projection when the rotor (10) is located at an initial position and that generates the same magnetic pole as the first magnetic pole part (31) in a current-running state. Therefore, a maintaining force can be raised especially in a current-stopped state, and a driving force can be raised.

21 Claims, 30 Drawing Sheets

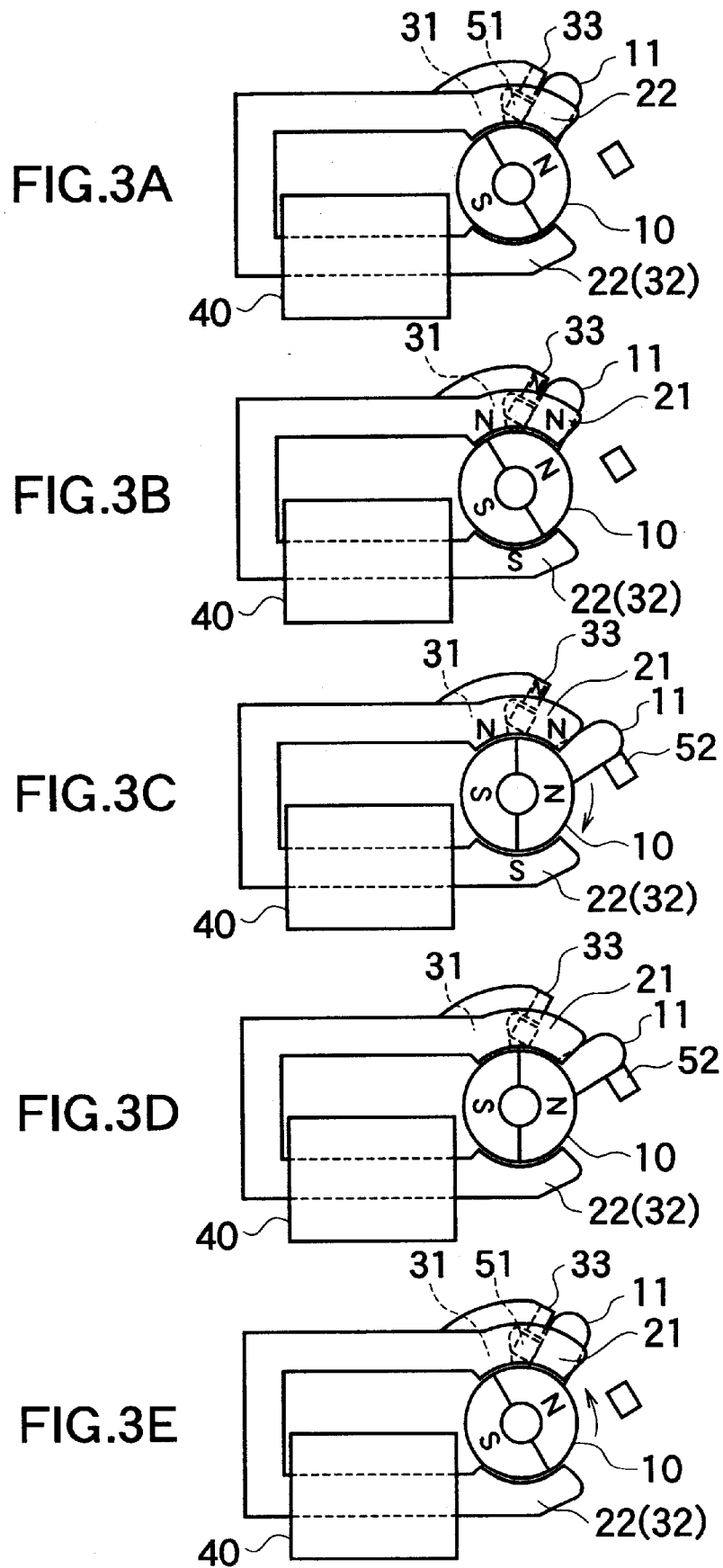

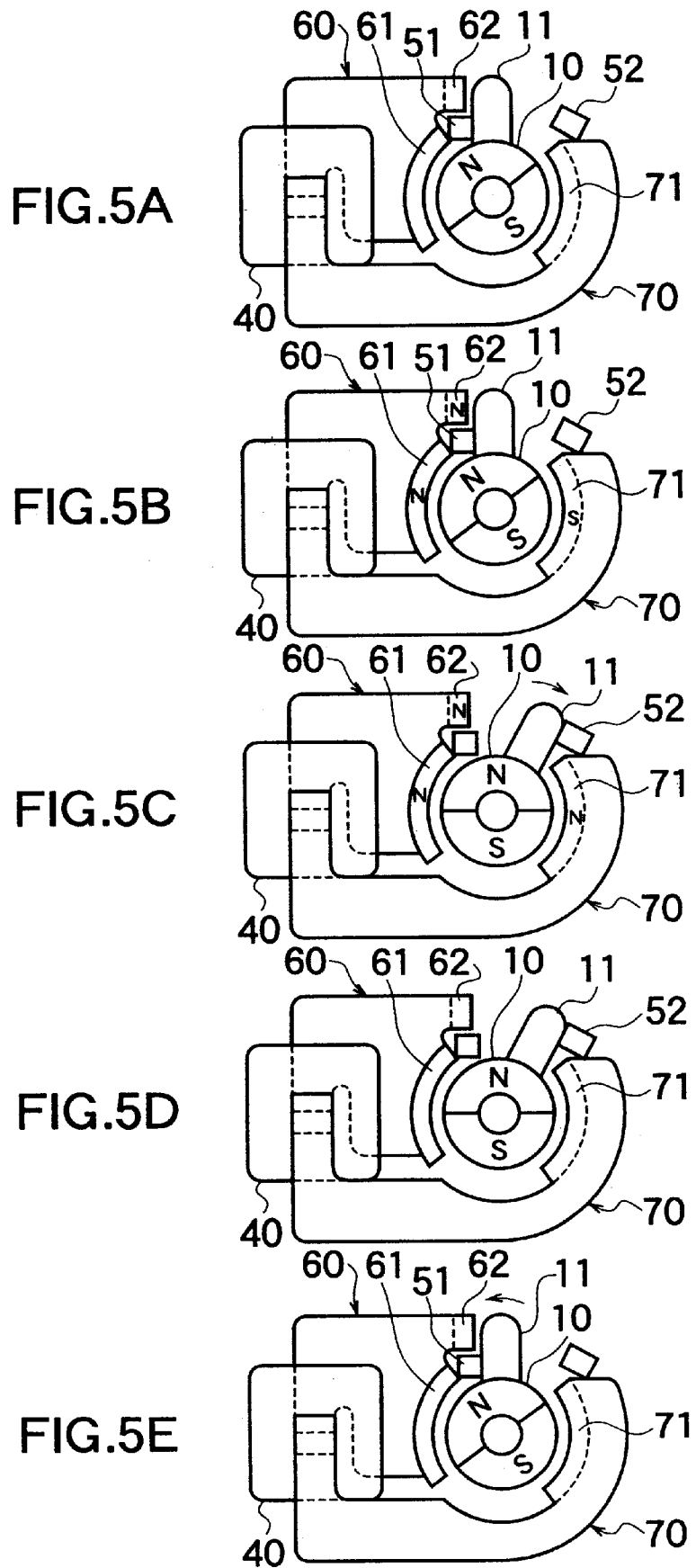

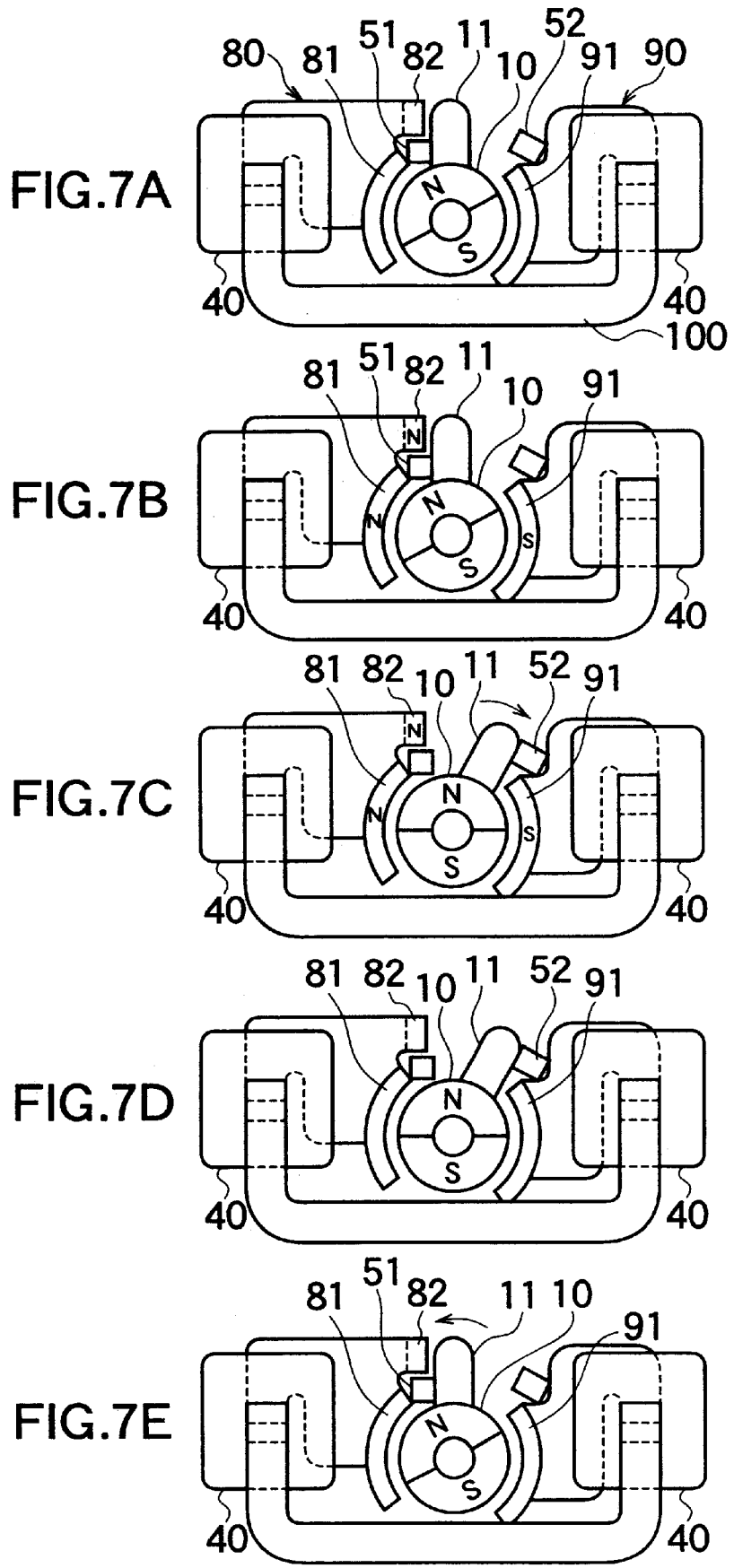

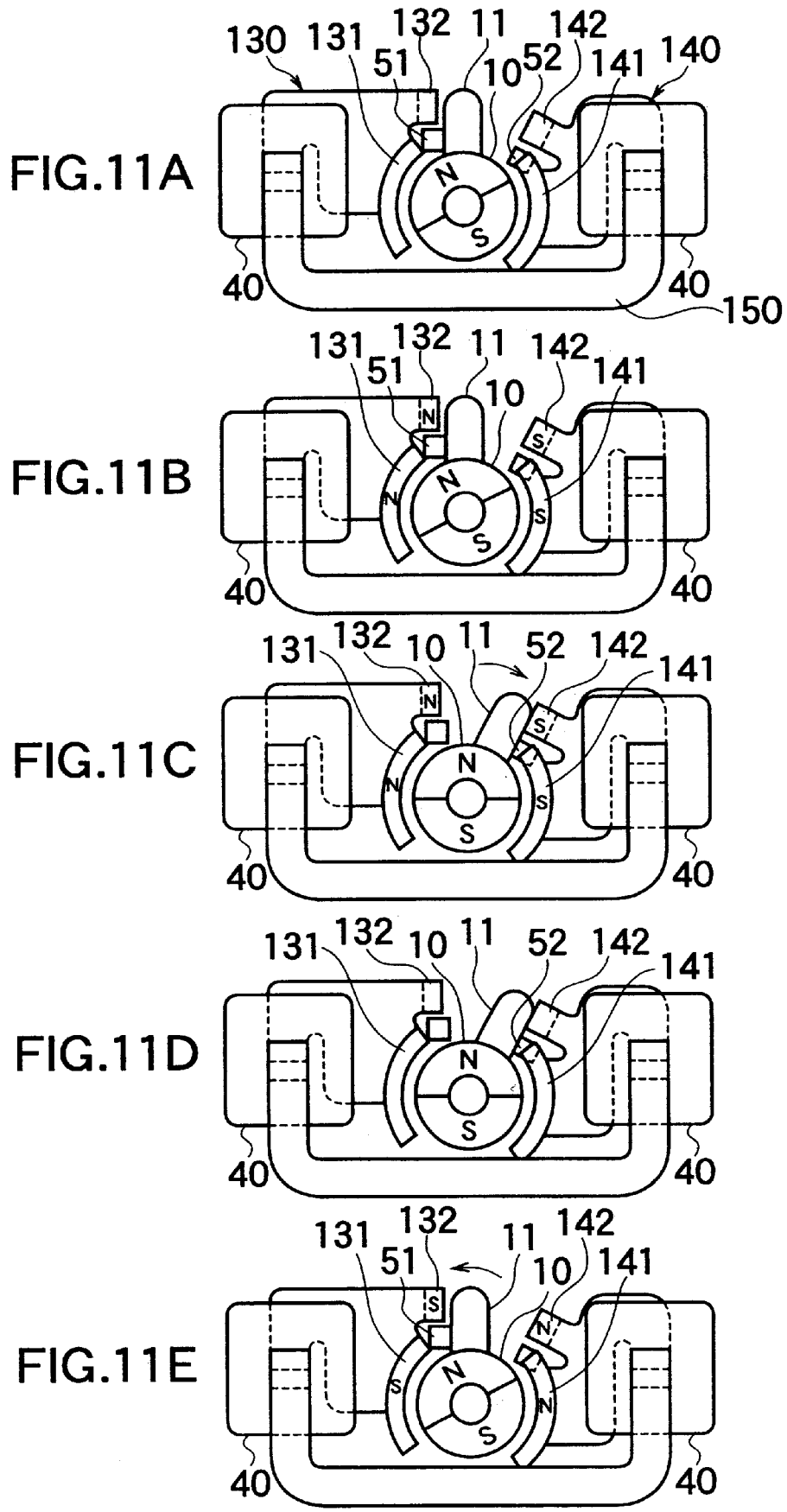

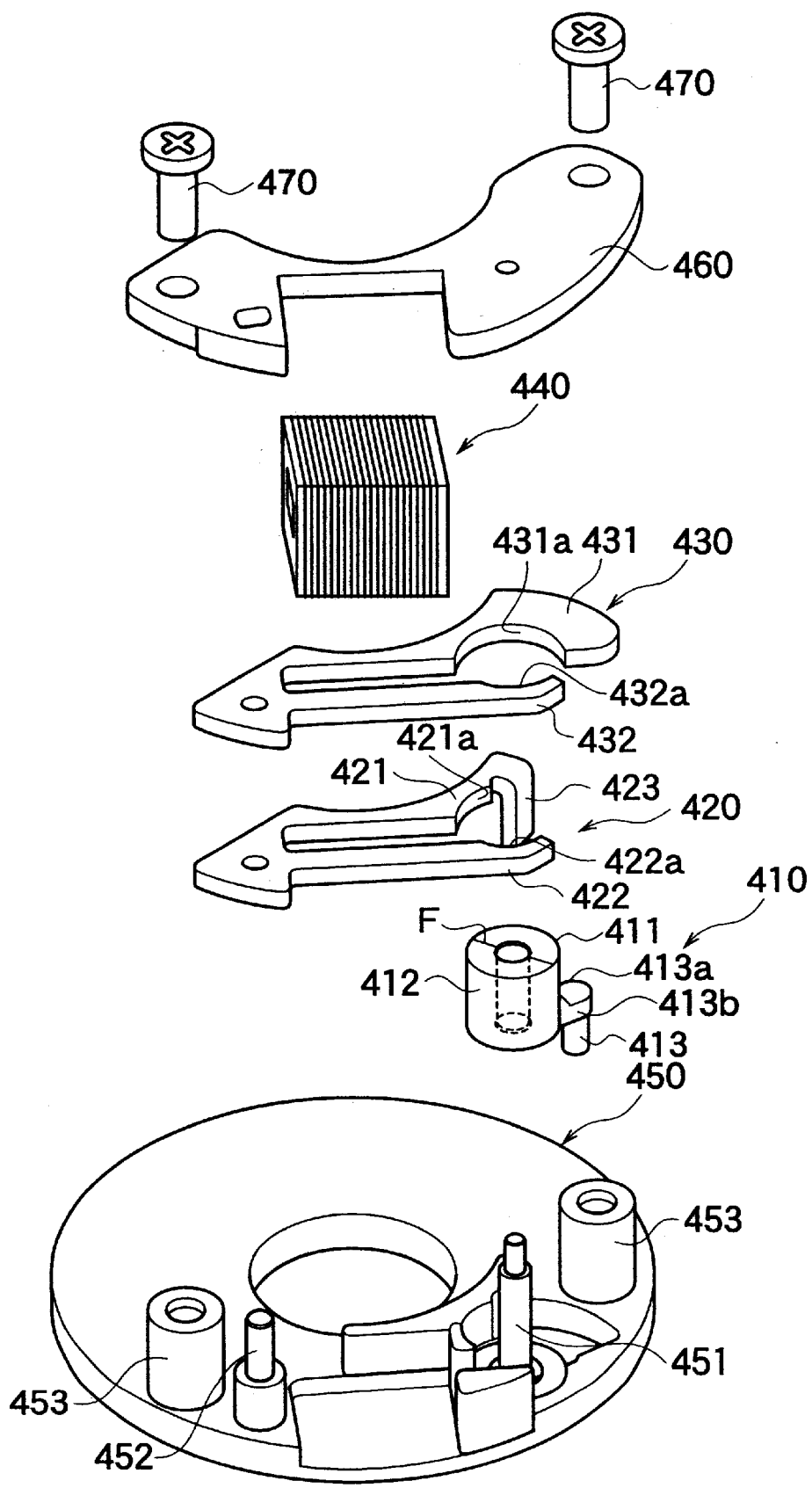

FIG.25
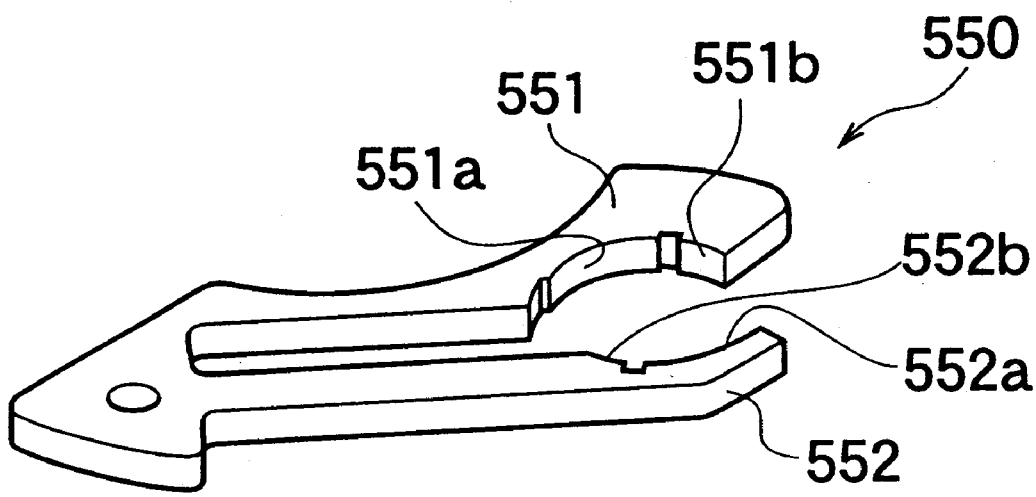
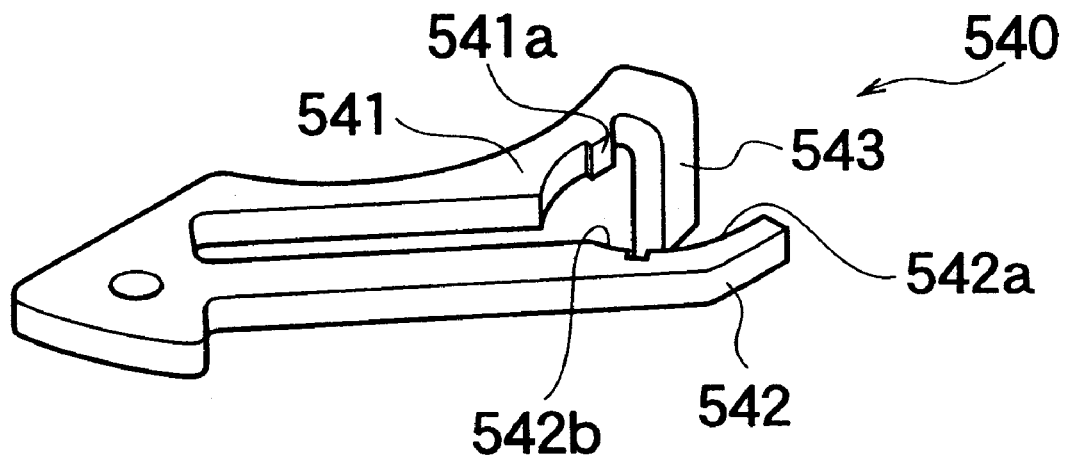

ELECTROMAGNETIC ACTUATOR AND SHUTTER DEVICE FOR CAMERA

TECHNICAL FIELD

The present invention relates to an electromagnetic actuator that generates a driving force by an electromagnetic force. More specifically, the present invention relates to an electromagnetic actuator that generates a rotational driving force by rotating by a predetermined angle range and that is employed for driving a camera shutter or the like, and the present invention relates to a camera shutter unit using this electromagnetic actuator.

BACKGROUND ART

A conventional electromagnetic actuator is made up of, for example, a rotor magnetized with different polarities (the N pole and the S pole), a pair of arcuate magnetic pole parts disposed in such a way as to surround a part of the outer circumferential surface of the rotor, a yoke (magnetic-path forming member) that magnetically connects the magnetic pole parts to each other and forms a magnetic path (magnetic circuit), a magnetizing coil wrapped around a part of the yoke, etc.

However, since this structure has a disadvantage in the fact that a magnetic attraction force by which the rotor is maintained at an initial position (resting position) is weak in a current-stopped state in which an electric current is not passed through the coil, a technique is employed in which, for example, the relationship between the pair of magnetic pole parts and the magnetization angle of the rotor is changed, or a magnetic gap between the outer circumferential surface of the rotor and the magnetic pole parts is narrowed, in order to strengthen the magnetic attraction force and raise the maintaining force. Without being limited to the situation of the initial position (resting position), this technique is likewise applied to a situation in which the rotor is maintained at the maximum rotational position where the rotor has rotated angularly to the maximum.

In order to raise the maintaining force according to techniques like the aforementioned one, there arises a need to set an actuating voltage (lowest actuating voltage) required to actuate the rotor at a high level in any technique, thus bringing about an increase in power consumption. On the other hand, in order to set the lowest actuating voltage at a low level, there is a technique of, for example, extending an area where the outer circumferential surface of the rotor faces the magnetic pole part. However, if this technique is employed, a magnetic attraction force (rotational urging force) that prompts rotation will be oppositely lowered, thereby bringing about a decrease in the maintaining force serving to urge it in a predetermined rotational direction and maintain it.

As a conventional electromagnetic actuator, one of U.S. Pat. No. 5,689,746 is known. In this electromagnetic actuator, yokes, which form magnetic pole parts and are opposite to each other with a rotor therebetween, branch into two parts to each be linear, and one of them holds a coil. However, if these yokes are disposed around the opening of a camera and are used as driving sources of a shutter unit, a space cannot be efficiently exploited, thus leading to the enlargement of the unit.

The present invention has been made in consideration of the problems of the conventional techniques, and an object of the present invention is to provide an electromagnetic actuator capable of giving a desired rotational urging force to a rotor and maintaining the rotor at a predetermined position, and capable of heightening a driving force when rotated, while aiming for structural simplification or size reduction without raising an actuating voltage, i.e., under the state of controlling power consumption. Another object is to provide a camera shutter unit that employs this electromagnetic actuator.

DISCLOSURE OF INVENTION

An electromagnetic actuator according to a first aspect of the present invention includes a magnetizing coil; a rotor that is magnetized with different polarities and rotates by a predetermined angle range between an initial position taken when an electric current is stopped and a maximum rotational position where the rotor rotates angularly to the maximum when an electric current is applied, thereby outputting a driving force; and a first magnetic pole part and a second magnetic pole part that are disposed so as to face an outer circumferential surface of the rotor and that generate mutually different magnetic poles through a magnetic path when an electric current is passed through the coil; in which the rotor has a projection that is magnetized with one of the different polarities and that projects outward in its radial direction, and, in the vicinity of the first magnetic pole part, an auxiliary magnetic pole piece is provided that is disposed so as to be close to or be in contact with the projection when the rotor is located at the initial position and that generates the same magnetic pole as the first magnetic pole part when a current is applied.

According to this structure, when the rotor is located at the initial position in the current-stopped state, a strong magnetic attraction force acts between the projection of the rotor and the auxiliary magnetic pole piece, and the rotor is infallibly maintained at the initial position. On the other hand, in the current-running state, the same magnetic pole as the magnetic pole with which the rotor projection is magnetized occurs in the auxiliary magnetic pole piece, and a strong repulsion force occurs, thereby rotating the rotor swiftly in a predetermined direction.

An electromagnetic actuator according to a second aspect of the present invention includes a magnetizing coil; a rotor that is magnetized with different polarities and rotates by a predetermined angle range between an initial position taken when an electric current is stopped and a maximum rotational position where the rotor rotates angularly to the maximum when an electric current is applied, thereby outputting a driving force; and a first magnetic pole part and a second magnetic pole part that are disposed so as to face an outer circumferential surface of the rotor and that generate mutually different magnetic poles through a magnetic path when an electric current is passed through the coil; in which the rotor has a projection that is magnetized with one of the different polarities and that projects outward in its radial direction, and, in the vicinity of the first magnetic pole part, a first auxiliary magnetic pole piece is provided that is disposed so as to be close to or be in contact with the projection when the rotor is located at the initial position and that generates the same magnetic pole as the first magnetic pole part when a current is applied, and, in the vicinity of the second magnetic pole part, a second auxiliary magnetic pole piece is provided that is disposed so as to be close to or be in contact with the projection when the rotor is located at the maximum rotational position and that generates the same magnetic pole as the second magnetic pole part when a current is applied.

According to this structure, in addition to the same action as the aforementioned one, when the rotor is located at the maximum rotational position, a strong magnetic attraction force acts between the projection and the second auxiliary magnetic pole piece, and the rotor is infallibly maintained at the maximum rotational position. On the other hand, when a current is applied in an opposite direction in this state, the same magnetic pole as the magnetic pole with which the rotor projection is magnetized occurs in the second auxiliary magnetic pole piece, and a strong repulsion force occurs, thereby rotating the rotor swiftly in the opposite direction and returning it to the initial position.

In the aforementioned structure, the auxiliary magnetic pole piece may be formed by bending a planar magnetic member so as to be close to or be in contact with the projection.

According to this structure, the auxiliary magnetic pole piece can be formed to have a wide area while aiming for structural simplification and weight reduction, and a magnetic attraction force or repulsion force acting between the projection and the auxiliary magnetic pole piece can be efficiently generated.

In the aforementioned structure, the rotor may have an output pin, which has been integrally formed, for outputting its rotational driving force, and the output pin may be used also as the projection. According to this structure, there is no need to form another projection, and the rotor can be structurally simplified, or a conventional molding method can be reused.

In the aforementioned structure, the first magnetic pole part and the second magnetic pole part may be positioned at both ends, respectively, of a magnetic-path forming member that has a part around which a coil is wrapped and that forms a magnetic path. The auxiliary magnetic pole piece may branch from a part that forms the first magnetic pole part, and the coil may be wrapped around two places of the magnetic-path forming member. According to this structure, the magnetic operation force can be heightened while aiming for structural simplification.

In the aforementioned structure, the first magnetic pole part and the second magnetic pole part may be positioned at both ends, respectively, of a magnetic-path forming member that has a part around which a coil is wrapped and that forms a magnetic path. The first auxiliary magnetic pole piece may branch from a part that forms the first magnetic pole part, and the second auxiliary magnetic pole piece may branch from a part that forms the second magnetic pole part, and the coil may be wrapped around two places of the magnetic-path forming member. According to this structure, likewise, the magnetic operation force can be heightened while aiming for structural simplification.

In the aforementioned structure, the first magnetic pole part and the second magnetic pole part may be disposed so as to generate a magnetic urging force by which the rotor is returned to the initial position when no current is passed through the coil. According to this structure, when a current-stopped state is reached, the rotor always returns to the initial position independently of the rotational position (e.g., maximum rotational position) of the rotor.

In the aforementioned structure, the first magnetic pole part and the second magnetic pole part may be disposed so as to generate a magnetic urging force by which the rotor is maintained at the maximum rotational position when the application of a current to the coil is stopped in a state in which the rotor is located at the maximum rotational position. According to this structure, the rotor is infallibly maintained at the maximum rotational position in spite of the fact that no current is applied under the state in which the rotor has reached the maximum rotational position.

An electromagnetic actuator according to a third aspect of the present invention includes a magnetizing coil; a rotor that has a first outer circumferential surface and a second outer circumferential surface which are magnetized with different polarities and into which the rotor is divided, the rotor rotating by a predetermined angle range between an initial position taken when an electric current is not applied and a maximum rotational position where the rotor rotates angularly to the maximum when an electric current is applied, thereby outputting a driving force; and a yoke that has a first magnetic pole part and a second magnetic pole part that are disposed so as to face an outer circumferential surface of the rotor and that generate mutually different magnetic poles when an electric current is passed through the coil; in which the rotor has a projection that is magnetized with one of the different polarities and that projects outward in its radial direction, and, in the vicinity of the first magnetic pole part, an auxiliary magnetic pole piece is provided that is disposed so as to be close to or be in contact with the projection when the rotor is located at the initial position and that generates the same magnetic pole as the first magnetic pole part when a current is applied, and the first magnetic pole part has a first wide facing surface that faces the first outer circumferential surface of the rotor over a length wider than a predetermined one in a rotational direction of the rotor, and the second magnetic pole part has a second wide facing surface that faces the second outer circumferential surface of the rotor over a length wider than a predetermined one in the rotational direction of the rotor.

According to this structure, when the rotor is located at the initial position in the current-stopped state, a magnetic attraction force acts between the rotor projection and the auxiliary magnetic pole piece, and the rotor is infallibly maintained at the initial position. On the other hand, in the current-running state, a repulsion force resulting from the fact that the same magnetic pole as a magnetic pole with which the rotor projection is magnetized has occurred is generated in the auxiliary magnetic pole piece, and a strong repulsion force is generated also between the first wide facing surface and the first outer circumferential surface and between the second wide facing surface and the second outer circumferential surface, thus giving a strong rotational force to the rotor and rotating the rotor swiftly in the predetermined direction.

In the aforementioned structure, the yoke may be made up of a first planar yoke and a second planar yoke that are laid on each other in the direction of a rotational shaft of the rotor, the first yoke provided with the first wide facing surface, the second wide facing surface, and the auxiliary magnetic pole piece, and the second yoke provided with the first wide facing surface and the second wide facing surface.

According to this structure, it is possible to easily form the first wide facing surface and the auxiliary magnetic pole piece that constitute the first magnetic pole part, the second wide facing surface that constitutes the second magnetic pole part, etc., and to achieve structural simplification.

An electromagnetic actuator according to a fourth aspect of the present invention includes a magnetizing coil; a rotor that has a first outer circumferential surface and a second outer circumferential surface which are magnetized with different polarities and into which the rotor is divided, the rotor rotating by a predetermined angle range between an initial position taken when an electric current is not applied and a maximum rotational position where the rotor rotates angularly to the maximum when an electric current is applied, thereby outputting a driving force; and a yoke that has a first magnetic pole part and a second magnetic pole part that are disposed so as to face the outer circumferential surface of the rotor and that generate mutually different magnetic poles when an electric current is passed through the coil; in which the rotor has a projection that is magnetized with one of the different polarities and that projects outward in its radial direction, and, in the vicinity of the first magnetic pole part, an auxiliary magnetic pole piece is provided that is disposed so as to be close to or be in contact with the projection when the rotor is located at the initial position and that generates the same magnetic pole as the first magnetic pole part when a current is applied, and the first magnetic pole part has a first wide facing surface that faces the first outer circumferential surface of the rotor over a length wider than a predetermined one in a rotational direction of the rotor and has a first narrow facing surface narrower than the first wide facing surface that faces the first outer circumferential surface of the rotor, and the second magnetic pole part has a second wide facing surface that faces the second outer circumferential surface of the rotor over a length wider than a predetermined one in the rotational direction of the rotor and has a second narrow facing surface narrower than the second wide facing surface that faces the second outer circumferential surface of the rotor.

According to this structure, when the rotor is located at the initial position in the current-stopped state, a strong magnetic attraction force (rotational urging force) acts between the rotor projection and the auxiliary magnetic pole piece, between the first narrow facing surface and the first outer circumferential surface, and between the second narrow facing surface and the second outer circumferential surface by appropriately selecting the positions where the first narrow facing surface and the second narrow facing surface are disposed, and therefore the rotor is infallibly maintained at the initial position. On the other hand, in the current-running state, a repulsion force resulting from the fact that the same magnetic pole as a magnetic pole with which the rotor projection is magnetized has occurred is generated in the auxiliary magnetic pole piece, and a strong repulsion force is generated also between the first wide facing surface and the first outer circumferential surface and between the second wide facing surface and the second outer circumferential surface, thus giving a strong rotational force to the rotor and rotating the rotor swiftly in the predetermined direction.

In the aforementioned structure, the yoke may be made up of a first planar yoke and a second planar yoke that are laid on each other in the direction of a rotational shaft of the rotor, the first yoke provided with the first narrow facing surface, the second narrow facing surface, and the auxiliary magnetic pole piece, and the second yoke provided with the first wide facing surface and the second wide facing surface.

According to this structure, it is possible to easily form or select surfaces and pieces different in width, such as the first wide facing surface, the first narrow facing surface, and the auxiliary magnetic pole piece that constitute the first magnetic pole part, and the second wide facing surface and the second narrow facing surface that constitute the second magnetic pole part. Further, it is possible to achieve structural simplification.

An electromagnetic actuator according to a fifth aspect of the present invention includes a magnetizing coil; a rotor that has a first outer circumferential surface and a second outer circumferential surface which are magnetized with different polarities and into which the rotor is divided, the rotor rotating by a predetermined angle range between an initial position taken when an electric current is not applied and a maximum rotational position where the rotor rotates angularly to the maximum when an electric current is applied, thereby outputting a driving force; and a yoke that has a first magnetic pole part and a second magnetic pole part that are disposed so as to face the outer circumferential surface of the rotor and that generate mutually different magnetic poles when an electric current is passed through the coil; in which the rotor has a projection that is magnetized with one of the different polarities and that projects outward in its radial direction, and, in the vicinity of the first magnetic pole part, an auxiliary magnetic pole piece is provided that is disposed so as to be close to or be in contact with the projection when the rotor is located at the initial position and that generates the same magnetic pole as the first magnetic pole part when a current is applied, and the first magnetic pole part has a first wide facing surface that faces the first outer circumferential surface of the rotor over a length wider than a predetermined one in a rotational direction of the rotor and has a first narrow facing surface narrower than the first wide facing surface that faces the first outer circumferential surface of the rotor, and the second magnetic pole part has a second narrow facing surface that faces the second outer circumferential surface of the rotor over a narrow length less than a predetermined one in the rotational direction of the rotor.

According to this structure, when the rotor is located at the initial position in the current-stopped state, a strong magnetic attraction force (rotational urging force) acts between the rotor projection and the auxiliary magnetic pole piece, between the first narrow facing surface and the first outer circumferential surface, and between the second narrow facing surface and the second outer circumferential surface by appropriately selecting the positions where the first narrow facing surface and the second narrow facing surface are disposed, and therefore the rotor is infallibly maintained at the initial position. On the other hand, in the current-running state, a strong repulsion force resulting from the fact that the same magnetic pole as a magnetic pole with which the rotor projection is magnetized has occurred is generated in the auxiliary magnetic pole piece, and a repulsion force is generated also between the first wide facing surface and the first outer circumferential surface, thus giving a rotational force to the rotor and rotating the rotor swiftly in the predetermined direction.

In the aforementioned structure, the yoke may be made up of a first planar yoke and a second planar yoke that are laid on each other in the direction of a rotational shaft of the rotor, the first yoke provided with the first narrow facing surface, the second narrow facing surface, and the auxiliary magnetic pole piece, and the second yoke provided with the first wide facing surface and the second narrow facing surface.

According to this structure, it is possible to easily form or select surfaces and pieces different in width, such as the first wide facing surface, the first narrow facing surface, and the auxiliary magnetic pole piece that constitute the first magnetic pole part, and the second narrow facing surface that constitutes the second magnetic pole part. Further, it is possible to achieve structural simplification.

An electromagnetic actuator according to a sixth aspect of the present invention includes a magnetizing coil; a rotor that has a first outer circumferential surface and a second outer circumferential surface which are magnetized with different polarities and into which the rotor is divided, the rotor rotating by a predetermined angle range between an initial position taken when an electric current is not applied and a maximum rotational position where the rotor rotates angularly to the maximum when an electric current is applied, thereby outputting a driving force; and a yoke that has a first magnetic pole part and a second magnetic pole part that are disposed so as to face the outer circumferential surface of the rotor and that generate mutually different magnetic poles when an electric current is passed through the coil; in which the rotor has a projection that is magnetized with one of the different polarities and that projects outward in its radial direction, and, in the vicinity of the first magnetic pole part, an auxiliary magnetic pole piece is provided that is disposed so as to be close to or be in contact with the projection when the rotor is located at the initial position and that generates the same magnetic pole as the first magnetic pole part when a current is applied, and the first magnetic pole part has a first wide facing surface that faces the first outer circumferential surface of the rotor over a length wider than a predetermined one in a rotational direction of the rotor, a first narrow facing surface that is disposed close to the first wide facing surface in the rotational direction of the rotor and that is narrower than the first wide facing surface that faces the first outer circumferential surface of the rotor, and a second narrow facing surface that is disposed close to the first wide facing surface in the direction of a rotational shaft of the rotor and that is narrower than the first wide facing surface in the rotational direction of the rotor that faces the first outer circumferential surface of the rotor; and the second magnetic pole part has a second wide facing surface that faces the second outer circumferential surface of the rotor over a length wider than a predetermined one in the rotational direction of the rotor, and a third narrow facing surface that is disposed close to the second wide facing surface in the rotational direction of the rotor and that is narrower than the second wide facing surface.

According to this structure, when the rotor is located at the initial position in the current-stopped state, a strong magnetic attraction force (rotational urging force) acts between the rotor projection and the auxiliary magnetic pole piece and between the second narrow facing surface and the first outer circumferential surface, by appropriately selecting the positions where the first narrow facing surface, the second narrow facing surface, the third narrow facing surface, etc., are disposed, and therefore the rotor is infallibly maintained at the initial position. On the other hand, in the current-running state, a strong repulsion force resulting from the fact that the same magnetic pole as a magnetic pole with which the rotor projection is magnetized has occurred is generated in the auxiliary magnetic pole piece, and a repulsion force is generated also between the first wide facing surface and the first outer circumferential surface and between the second wide facing surface and the second outer circumferential surface, thus giving a rotational force to the rotor and rotating the rotor swiftly in the predetermined direction.

Further, when a current is applied, for example, in an opposite direction at the maximum rotational position, a strong attraction force is generated between the first narrow facing surface and the first outer circumferential surface and between the third narrow facing surface and the second outer circumferential surface, thus rotating the rotor swiftly toward the initial position.

In the aforementioned structure, the yoke may be made up of a first planar yoke and a second planar yoke that are laid on each other in the direction of the rotational shaft of the rotor, the first yoke provided with the second narrow facing surface, the second wide facing surface, the third narrow facing surface, and the auxiliary magnetic pole piece, and the second yoke provided with the first wide facing surface, the first narrow facing surface, the second wide facing surface, and the third narrow facing surface, in which the first wide facing surface, the second narrow facing surface, and the second wide facing surface are disposed to face each other with the rotor therebetween, and the first narrow facing surface and the third narrow facing surface are disposed to face each other with the rotor therebetween.

According to this structure, it is possible to easily form or select surfaces and pieces different in width, such as the first wide facing surface, the first narrow facing surface, the second narrow facing surface, and the auxiliary magnetic pole piece that constitute the first magnetic pole part, and the second wide facing surface and the third narrow facing surface that constitute the second magnetic pole part. Further, it is possible to achieve structural simplification.

In the electromagnetic actuator of the present invention, the first wide facing surface of the second yoke may be formed by bending a part of the second yoke in the direction of the rotational shaft of the rotor.

According to this structure, the first wide facing surface that faces the first outer circumferential surface of the rotor can be made larger, and, proportionately with it, the rotational force in the current-running state can be raised.

Further, in the electromagnetic actuator of the present invention, the auxiliary magnetic pole piece may be formed by bending a part of the first yoke so as to be close to or be in contact with the projection.

According to this structure, the auxiliary magnetic pole piece can be formed to have a wide area while aiming for structural simplification and weight reduction, and the magnetic attraction force or the repulsion force acting upon the projection can be efficiently generated.

Further, in the electromagnetic actuator of the present invention, the rotor may have an output pin that is integrally formed, and that is used to output its rotational driving force, and that is used also as the projection.

According to this structure, there is no need to independently form another projection, and the rotor can be structurally simplified, or a conventional molding method can be reused.

An electromagnetic actuator according to a seventh aspect of the present invention includes a magnetizing coil; a rotor that is magnetized with different polarities and rotates by a predetermined angle range between an initial position taken when an electric current is not applied and a maximum rotational position where the rotor rotates angularly to the maximum when an electric current is applied, thereby outputting a driving force; and a yoke that has a first magnetic pole part and a second magnetic pole part that are disposed so as to face the outer circumferential surface of the rotor and that generate mutually different magnetic poles when an electric current is passed through the coil; in which the rotor has a projection that is magnetized with one of the different polarities and that projects outward in its radial direction, and, in the vicinity of the first magnetic pole part, an auxiliary magnetic pole piece is provided that is disposed so as to be close to or be in contact with the projection when the rotor is located at the initial position and that generates the same magnetic pole as the first magnetic pole part when a current is applied, and the yoke has a first long part that forms the first magnetic pole part in an end area thereof and a second long part that forms the second magnetic pole part in an end area thereof, the first long part having a bent shape, and the second long part having a linear shape by which the coil is held.

According to this structure, since the coil is held by the second long part having a linear shape, the coil can be easily attached, and, on the other hand, since the first long part has a bent shape, the first long part can be disposed along an opening when it is used as, for example, a driving source for a camera shutter unit, thus allowing the unit to become more compact.

A camera shutter unit according to an eighth aspect of the present invention includes a base plate to define an opening for exposure, a shutter blade mounted on the base plate so that it can freely reciprocate between an open position where the opening is opened and a closed position where the opening is closed, and a driving source to exert a driving force for reciprocating the shutter blade, and the driving source is any one of the aforementioned electromagnetic actuators of the first through seventh aspects of the present invention.

According to this structure, the shutter blade is driven by a desired rotational driving force without raising an actuating voltage, i.e., with low power consumption in the current-running state, whereas the shutter blade is infallibly maintained at a predetermined resting position (initial position) in the current-stopped state.

BRIEF DESCRIPTION OF DRAWINGS

FIG. 1A is a plan view showing a rotor in a resting position; FIG. 1B is a plan view showing the rotor in a maximum rotational position.

FIGS. 3A through 3E are views for explaining the operation of the electromagnetic actuator shown in FIGS. 1A and 1B; FIG. 3A shows the rotor in the resting position; FIG. 3B shows the rotor immediately after a current is applied; FIG. 3C shows the rotor reaching the maximum rotational position; FIG. 3D shows the rotor immediately after the current is cut off; FIG. 3E shows the rotor that has returned to the resting position.

FIG. 4A is a plan view showing the rotor in the resting position; FIG. 4B is a plan view showing the rotor in the maximum rotational position.

FIGS. 5A through 5E are views for explaining the operation of the electromagnetic actuator shown in FIGS. 4A and 4B; FIG. 5A shows the rotor in the resting position; FIG. 5B shows the rotor immediately after a current is applied; FIG. 5C shows the rotor reaching the maximum rotational position; FIG. 5D shows the rotor immediately after the current is cut off; FIG. 5E shows the rotor that has returned to the resting position.

FIG. 6A is a plan view showing the rotor in the resting position; FIG. 6B is a plan view showing the rotor in the maximum rotational position.

FIGS. 7A through 7E are views for explaining the operation of the electromagnetic actuator shown in FIGS. 6A and 6B; FIG. 7A shows the rotor in the resting position; FIG. 7B shows the rotor immediately after a current is applied; FIG. 7C shows the rotor reaching the maximum rotational position; FIG. 7D shows the rotor immediately after the current is cut off; FIG. 7E shows the rotor that has returned to the resting position.

FIG. 8A is a plan view showing the rotor in the resting position; FIG. 8B is a plan view showing the rotor in the maximum rotational position.

FIG. 9A shows the rotor in the resting position; FIG. 9B shows the rotor immediately after a current is applied; FIG. 9C shows the rotor reaching the maximum rotational position; FIG. 9D shows the rotor immediately after the current is cut off; FIG. 9E shows the rotor that has returned to the resting position.

FIG. 10A is a plan view showing the rotor in the resting position; FIG. 10B is a plan view showing the rotor in the maximum rotational position.

FIGS. 11A through 11E are views for explaining the operation of the electromagnetic actuator shown in FIGS. 10A and 10B; FIG. 11A shows the rotor in the resting position; FIG. 11B shows the rotor immediately after a current is applied; FIG. 11C shows the rotor reaching the maximum rotational position; FIG. 11D shows the rotor immediately after the current is cut off; FIG. 11E shows the rotor that has returned to the resting position.

FIG. 12A is a plan view; FIG. 12B is a sectional view.

FIG. 13A is a plan view; FIG. 13B is a sectional view.

FIG. 14A is a plan view; FIG. 14B is a sectional view.

FIG. 15 is an exploded perspective view showing one embodiment of the electromagnetic actuator according to the third aspect of the present invention.

FIG. 18A shows the rotor in the resting position; FIG. 18B shows the rotor immediately after a current is applied; FIG. 18C shows the rotor reaching the maximum rotational position; FIG. 18D shows the rotor immediately after the current is applied in an opposite direction; FIG. 18E shows the rotor that has returned to the resting position.

FIG. 21A shows the rotor in the resting position; FIG. 21B shows the rotor immediately after a current is applied; FIG. 21C shows the rotor reaching the maximum rotational position; FIG. 21D shows the rotor immediately after the current is applied in an opposite direction; FIG. 21E shows the rotor that has returned to the resting position.

FIG. 24A shows the rotor in the resting position; FIG. 24B shows the rotor immediately after a current is applied; FIG. 24C shows the rotor reaching the maximum rotational position; FIG. 24D shows the rotor immediately after the current is applied in an opposite direction; FIG. 24E shows the rotor that has returned to the resting position.

FIG. 25 is a perspective view showing a lower yoke and an upper yoke according to one embodiment of the electromagnetic actuator according to the sixth aspect of the present invention.

FIG. 26A shows the rotor in the resting position; FIG. 26B shows the rotor immediately after a current is applied; FIG. 26C shows the rotor reaching the maximum rotational position; FIG. 26D shows the rotor immediately after the current is applied in an opposite direction; FIG. 26E shows the rotor that has returned to the resting position.

FIG. 27A is a plan view; FIG. 27B is a sectional view.

FIG. 28A is a plan view; FIG. 28B is a sectional view.

FIG. 29A is a plan view; FIG. 29B is a sectional view.

FIG. 30A is a plan view; FIG. 30B is a sectional view.

FIG. 33A is a plan view; FIG. 33B is a sectional view.

BEST MODES FOR CARRYING OUT THE INVENTION

Embodiments of the present invention will be hereinafter described with reference to the attached drawings.

Figure 1A:
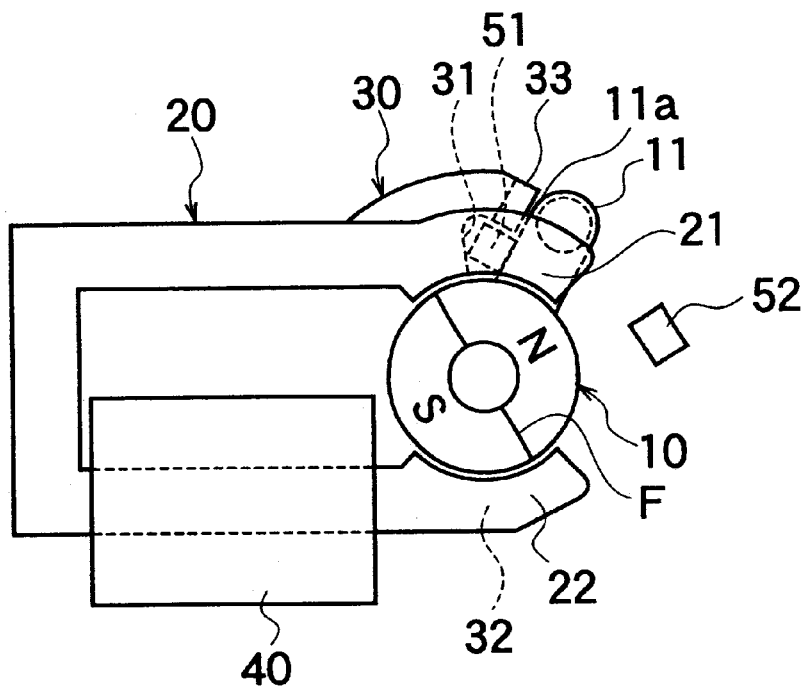
FIGS. 1A and 1B show one embodiment of the electromagnetic actuator according to the first aspect of the present invention.
Figure 1B:
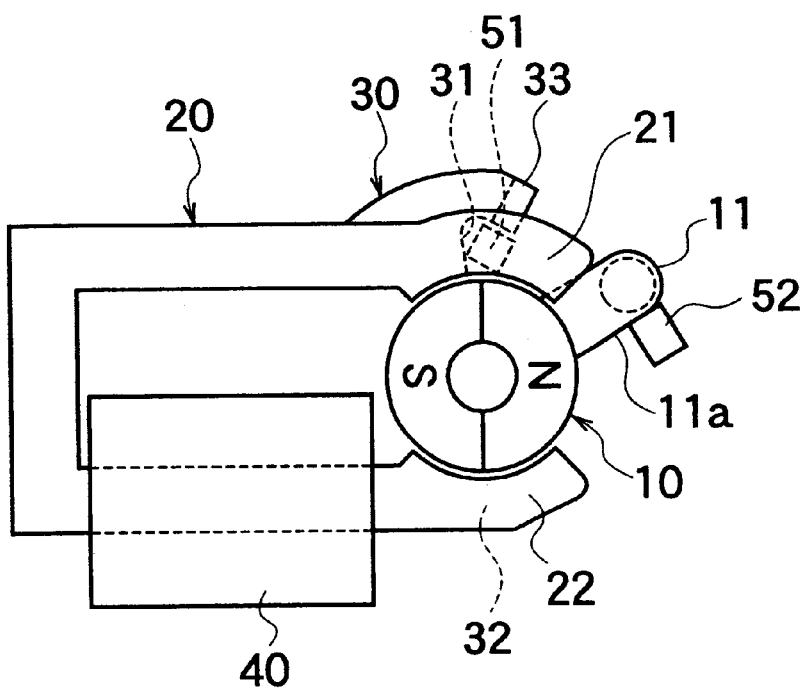
Figure 2:
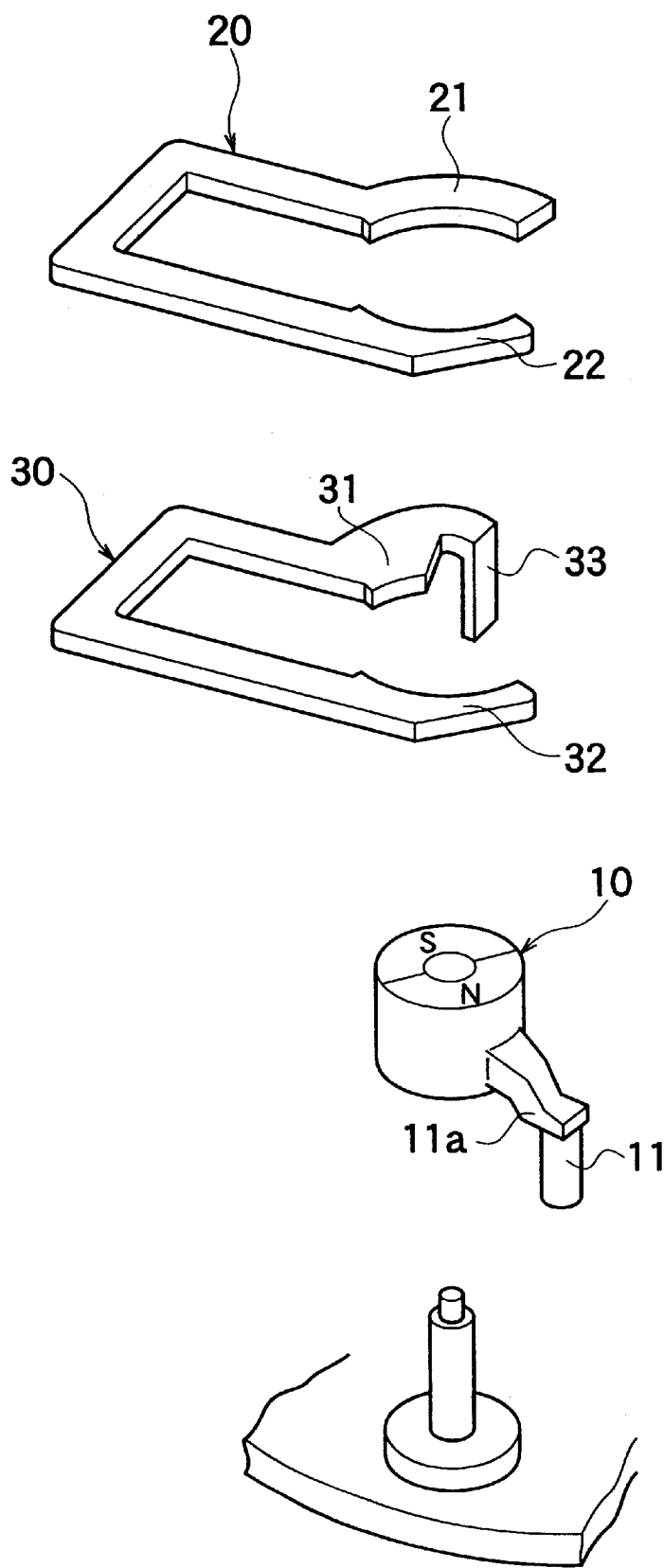
FIG. 2 is an exploded perspective view of the electromagnetic actuator shown in FIGS. 1A and 1B.

FIG. 1A, FIG. 1B, FIG. 2, and FIGS. 3A through 3E show one embodiment of the electromagnetic actuator according to the first aspect of the present invention. As shown in FIGS. 1A, 1B, and 2, the electromagnetic actuator according to this embodiment is made up of a rotor 10 magnetized with different polarities, i.e., with the N and S poles with a boundary plane F passing through a rotational shaft therebetween, first magnetic pole parts 21, 31 and second magnetic pole parts 22, 32 disposed to face the outer circumferential surface of the rotor 10, an auxiliary magnetic pole piece 33 disposed in the vicinity of the first magnetic pole part 31, a planar upper yoke 20 serving as a magnetic-path forming member that forms a magnetic path (magnetic circuit) by the connection between the first magnetic pole part 21 and the second magnetic pole part 22, a planar lower yoke 30 serving as a magnetic-path forming member that forms a magnetic path (magnetic circuit) by the connection between the first magnetic pole part 31 and the second magnetic pole part 32, and a magnetizing coil 40 wrapped (i.e., wound) around a bobbin integrally surrounding the upper and lower yokes 20 and 30 laid on each other.

The rotor 10 is provided with, as shown in FIGS. 1A, 1B, and 2, an output pin 11 that projects outward in the radial direction from the outer circumferential surface of the half magnetized with the N pole at a predetermined angle with the boundary plane F and further extends downward. A role of the output pin 11 is to transmit a rotational driving force of the rotor 10 to the outside. Another role of the output pin 11 is to be used also as a projection that generates a magnetic attraction force and a repulsion force in cooperation with the auxiliary magnetic pole piece 33, because the whole of it is magnetized with the N pole.

In a current-stopped state in which an electric current is not passed through the coil 40, the rotor 10 rotates counterclockwise as shown in FIG. 1A, and the side part 11a of the pin 11 comes in contact with a stopper 51, and the rotor 10 is located at an initial position (resting position) where its further rotation is restricted. On the other hand, when the current is passed through the coil 40, the rotor 10 rotates clockwise angularly to the maximum as shown in FIG. 1B, and the side part 11a comes in contact with a stopper 52, and the rotor 10 is located at a maximum rotational position (operating position) where its further rotation is restricted.

In this structure, the output pin 11 as a projection may project outward in the radial direction from the outer circumferential surface of the half magnetized with the S pole at a predetermined angle with the boundary plane F, and the whole thereof may be magnetized with the S pole. Further, without using the output pin 11 also as a projection, a projection in cooperation with the auxiliary magnetic pole piece 33 may be provided independently of the output pin 11, and this projection may be magnetized with the N pole or the S pole.

The lower yoke 30 is provided with an auxiliary magnetic pole piece 33 vertically bent in the vicinity of the first magnetic pole part 31 as shown in FIGS. 1A, 1B, and 2. The auxiliary magnetic pole piece 33 is used to generate a magnetic attraction force and a repulsion force with respect to the output pin 11, and, since it is formed by bending the planar magnetic member (i.e., lower yoke 30), an area facing the output pin 11 increases, thus making it possible to efficiently generate a magnetic operation force.

Concerning the positional relationship between the auxiliary magnetic pole piece 33 and the output pin (projection) 11, when the rotor 10 is in contact with the stopper 51 and is stopped at the initial position (resting position) as shown in FIG. 1A, one side part 11a of the output pin 11 may be arranged to face the auxiliary magnetic pole piece 33 without contact therewith and in the close vicinity thereof, or, alternatively, may be arranged to be in contact with the auxiliary magnetic pole piece 33.

Next, the operation of the electromagnetic actuator according to this embodiment will be described with reference to FIGS. 3A through 3E. First, in a current-stopped state in which an electric current is not passed through the coil 40, the rotor 10 is located at the initial position (resting position) where it is in contact with the stopper 51 as shown in FIG. 3A. At this time, a magnetic attraction force that urges the rotor 10 to rotate counterclockwise acts between the rotor 10 and the first magnetic pole parts 21, 31 and between the rotor 10 and the second magnetic pole parts 22, 32. Further, a strong magnetic attraction force acts between the output pin (projection) 11 magnetized with the N pole and the auxiliary magnetic pole piece 33.

Especially, since the auxiliary magnetic pole piece 33 and the output pin 11 are located outside in the radial direction by a predetermined distance from the outer circumferential surface of the rotor 10, torque T (f×d), which is a multiplication between a distance (d) from the rotational center shaft of the rotor 10 to the position and an attraction force (f) to be generated, effectively acts counterclockwise, and therefore the rotor 10 is infallibly maintained at the initial position.

Thereafter, when a predetermined electric current (positive electric current) is passed through the coil 40, the N pole occurs in the first magnetic pole parts 21, 31 and in the auxiliary magnetic pole piece 33, whereas the S pole occurs in the second magnetic pole parts 22, 32, as shown in FIG. 3B. Therefore, the first magnetic pole parts 21, 31 generate a repulsion force against the N pole of the rotor 10, whereas the second magnetic pole parts 22, 32 generate a repulsion force against the S pole of the rotor 10. Further, the auxiliary magnetic pole piece 33 generates a repulsion force against the output pin 11 of the rotor 10.

As a result, a strong clockwise rotational driving force is generated, and the rotor 10 rotates clockwise as shown in FIG. 3C, then comes in contact with the stopper 52, and is maintained at the maximum rotational position. As long as the current-running state continues, the rotor 10 continues to be maintained at this maximum rotational position.

When the current to the coil 40 is stopped here, the magnetic poles occurring in the first magnetic pole parts 21, 31, in the auxiliary magnetic pole piece 33, and in the second magnetic pole parts 22, 32 disappear as shown in FIG. 3D. Thereafter, under the action of a magnetic attraction force generated from the relationship between the positions of the first magnetic pole parts 21, 31 and the second magnetic pole parts 22, 32 and the magnetization angle of the rotor 10, and under the action of a magnetic attraction force generated from the relationship between the auxiliary magnetic pole piece 33 and the output pin 11, the rotor 10 rotates counterclockwise and returns to the initial position as shown in FIG. 3E. If the current is applied to the coil 40 in an opposite direction at the maximum angle position, the rotor 10 returns to the initial position more swiftly (at high speed) because of an attraction force and a repulsion force to be generated.

In this embodiment, the projection (output pin 11) projecting from the rotor 10 and the auxiliary magnetic pole piece 33 facing the projection are provided, and a strong attraction force is generated therebetween. Therefore, this makes it possible to raise the maintaining force at the initial position, and a strong repulsion force generated therebetween makes it possible to obtain a sufficient rotational driving force, without raising an actuating voltage when rotated, i.e., without expanding power consumption.

In the aforementioned structure, the magnetization angle of the rotor 10 may be changed, i.e., the boundary plane F may be arranged at the position where the plane F is rotated by a predetermined angle clockwise so that the area of an N-pole part (of the rotor 10) that faces the second magnetic pole parts 22, 32 can increase. If so, when the current to the coil 40 is stopped in a state where the rotor 10 has reached the maximum rotational position, the rotor 10 will be maintained at this maximum rotational position because of the action of a magnetic urging force.

Figure 4A:
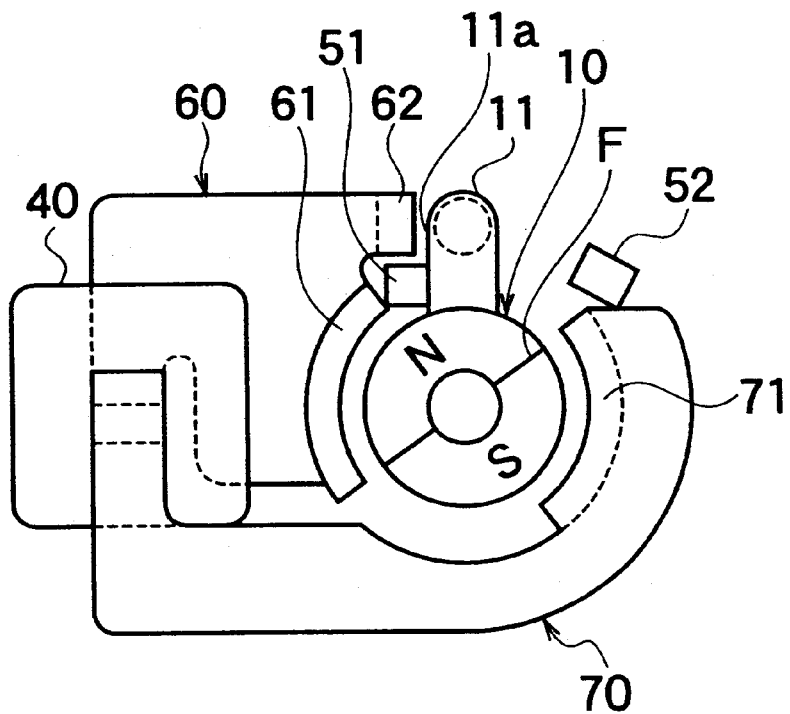
FIGS. 4A and 4B show another embodiment of the electromagnetic actuator according to the first aspect of the present invention.
Figure 4B:
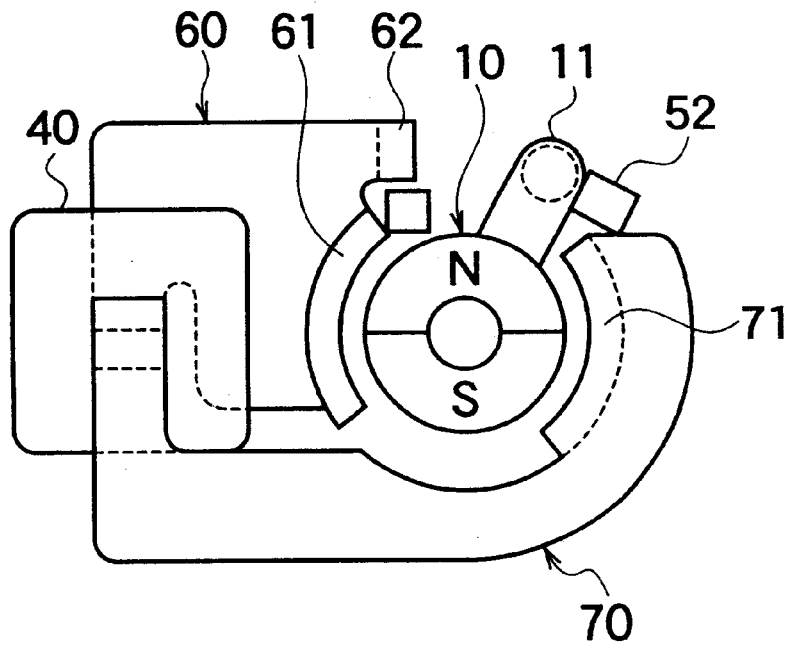

FIGS. 4A, 4B, and 5A through 5E show another embodiment of the electromagnetic actuator according to the first aspect of the present invention. FIG. 4A shows the rotor 10 located at the initial position, FIG. 4B shows the rotor 10 located at the maximum rotational position, and FIGS. 5A through 5E each show a state in the operating position.

As shown in FIGS. 4A and 4B, the electromagnetic actuator according to this embodiment is made up of a rotor 10 magnetized with different polarities, i.e., with the N and S poles with a boundary plane F passing through a rotational shaft therebetween, a first magnetic pole part 61 and a second magnetic pole part 71 disposed to face the outer circumferential surface of the rotor 10, an auxiliary magnetic pole piece 62 disposed in the vicinity of the first magnetic pole part 61, a planar lower yoke 60 and a planar upper yoke 70 serving as magnetic-path forming members that form a magnetic path (magnetic circuit) by the connection between the first magnetic pole part 61 and the second magnetic pole part 71, and a magnetizing coil 40 wrapped around a bobbin at the connection between the lower and upper yokes 60 and 70.

Herein, the first magnetic pole part 61 is bent (erected) upward (frontward in the vertical direction with respect to the sheet of FIGS. 4A and 4B) at one end of the lower yoke 60 and is curved to face the outer circumferential surface of the rotor 10. The second magnetic pole part 71 is bent (erected) downward (rearward with respect to the sheet of FIGS. 4A and 4B) at one end of the upper yoke 70 and is curved to face the outer circumferential surface of the rotor 10.

The auxiliary magnetic pole piece 62 is further formed in such a way as to branch from the first magnetic pole part 61, i.e., in the vicinity of the first magnetic pole part 61 at the end of the lower yoke 60. The auxiliary magnetic pole piece 62 is bent downward in the same way as in the aforementioned embodiment. The auxiliary magnetic pole piece 62 is used to generate a magnetic attraction force and a repulsion force with respect to the output pin 11, and can efficiently generate a magnetic operation force because it is formed by bending the planar magnetic member (i.e., lower yoke 60) as in the aforementioned embodiment.

Concerning the positional relationship between the auxiliary magnetic pole piece 62 and the output pin (projection) 11, one side part 11a of the output pin 11 may be arranged to face the auxiliary magnetic pole piece 62 out of contact therewith and in the close vicinity thereof, or may be arranged to come in contact with the auxiliary magnetic pole piece 62 when the rotor 10 is in contact with the stopper 51 and is located at the initial position (resting position) as shown in FIG. 4A.

The operation of the electromagnetic actuator according to this embodiment follows the initial state of FIG. 5A, the state immediately after current application of FIG. 5B, the state of having rotated to the maximum rotational position of FIG. 5C, the state immediately after the stopping of current application at the maximum rotational position of FIG. 5D, and the state of having returned to the initial position of FIG. 5E. A description of the operation details is omitted because they are the same as those in the aforementioned embodiment.

As in the aforementioned embodiment, the projection (output pin 11) projecting from the rotor 10 and the auxiliary magnetic pole piece 62 facing the projection are provided in this embodiment, and a strong attraction force is generated therebetween. Therefore, this makes it possible to raise the maintaining force at the initial position, and a strong repulsion force generated therebetween makes it possible to obtain a sufficient rotational driving force, without raising an actuating voltage when rotated, i.e., without raising power consumption.

In this structure, the magnetization angle of the rotor 10 may be changed, i.e., the boundary plane F may be set at the position where the plane F is rotated by a predetermined angle clockwise so that the area of an N-pole part (of the rotor 10) that faces the second magnetic pole part 71 can increase. If so, when the current to the coil 40 is stopped in a state where the rotor 10 has reached the maximum rotational position, the rotor 10 will be maintained at this maximum rotational position because of the action of a magnetic urging force.

Figure 6A:
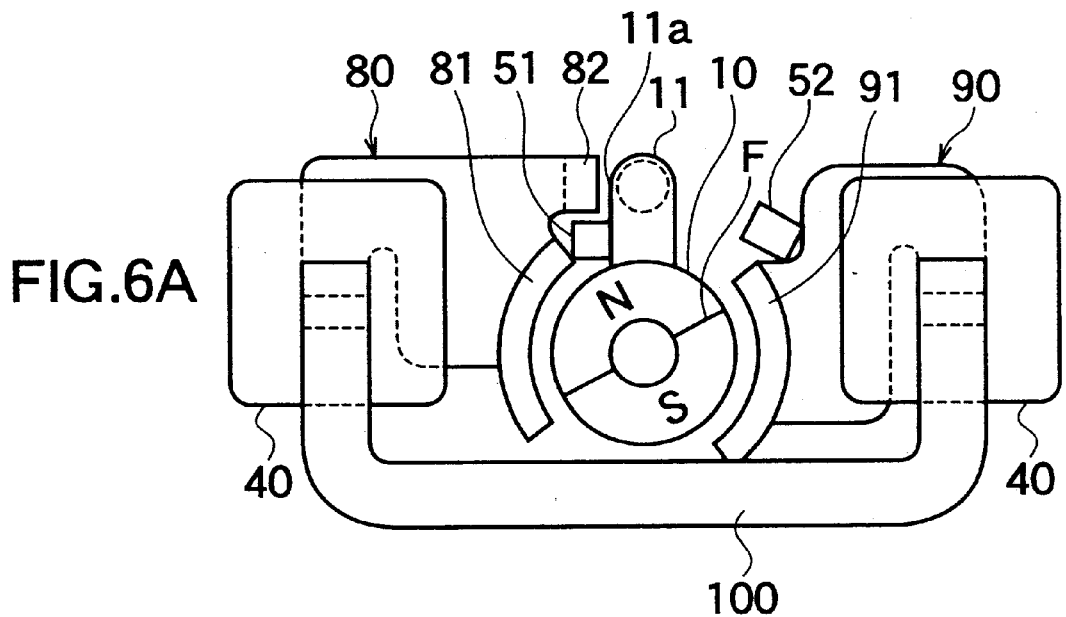
FIGS. 6A and 6B show another embodiment of the electromagnetic actuator according to the first aspect of the present invention.
Figure 6B:
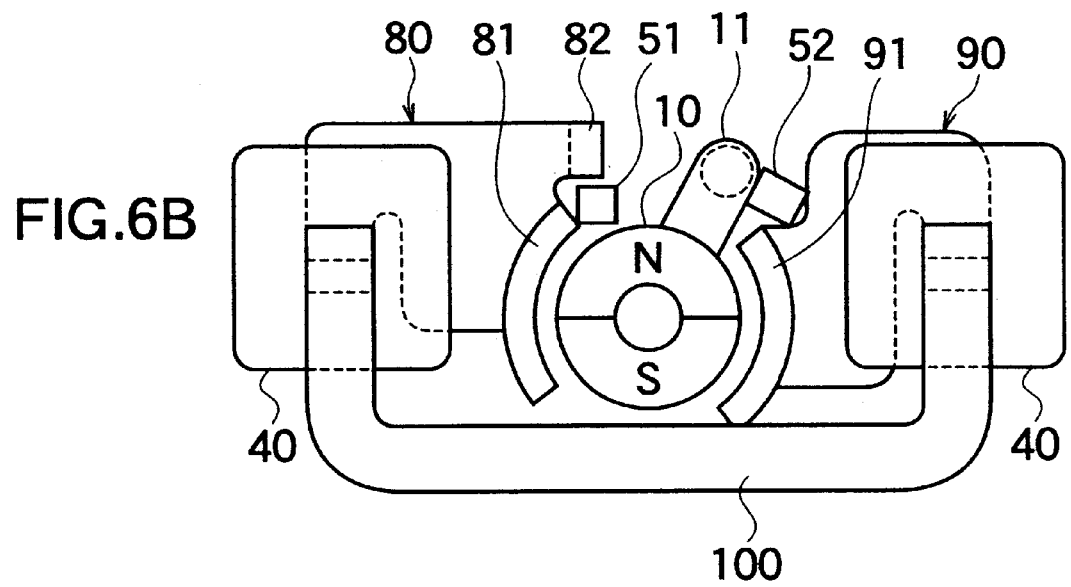

FIGS. 6A, 6B, and 7A through 7E show another embodiment of the electromagnetic actuator according to the first aspect of the present invention. FIG. 6A shows the rotor 10 located at the initial position, FIG. 6B shows the rotor 10 located at the maximum rotational position, and FIGS. 7A through 7E each show a state in the operating position.

As shown in FIGS. 6A and 6B, the electromagnetic actuator according to this embodiment is made up of a rotor 10 magnetized with different polarities, i.e., magnetized with the N and S poles with a boundary plane F passing through a rotational shaft therebetween, a first magnetic pole part 81 and a second magnetic pole part 91 disposed to face the outer circumferential surface of the rotor 10, an auxiliary magnetic pole piece 82 disposed in the vicinity of the first magnetic pole part 81, a planar first lower yoke 80 serving as a magnetic-path forming member that has the first magnetic pole part 81 at an end thereof and forms a part of a magnetic path (magnetic circuit), a planar second lower yoke 90 serving as a magnetic-path forming member that has the second magnetic pole part 91 at an end thereof and forms a part of a magnetic path (magnetic circuit), a planar upper connection yoke 100 serving as a magnetic-path forming member that connects the other end of the first lower yoke 80 to the other end of the second lower yoke 90 and forms a magnetic path (magnetic circuit), and two magnetizing coils 40 wrapped around a bobbin at the connection between the first lower yoke 80 and the upper connection yoke 100 and around a bobbin at the connection between the second lower yoke 90 and the upper connection yoke 100, respectively.

Herein, the first magnetic pole part 81 is bent (erected) upward (frontward in the vertical direction with respect to the sheet of FIGS. 6A and 6B) at one end of the first lower yoke 80 and is curved to face the outer circumferential surface of the rotor 10. The second magnetic pole part 91 is bent (erected) upward (frontward with respect to the sheet of FIGS. 6A and 6B) at one end of the second lower yoke 90 and is curved to face the outer circumferential surface of the rotor 10.

The auxiliary magnetic pole piece 82 is further formed in such a way as to branch from the first magnetic pole part 81, i.e., in the vicinity of the first magnetic pole part 81 at the end of the first lower yoke 80. The auxiliary magnetic pole piece 82 is bent downward in the same way as in the aforementioned embodiment. The auxiliary magnetic pole piece 82 is used to generate a magnetic attraction force and a repulsion force with respect to the output pin 11, and can efficiently generate a magnetic operation force because it is formed by bending the planar magnetic member (i.e., first lower yoke 80) as in the aforementioned embodiment.

Concerning the positional relationship between the auxiliary magnetic pole piece 82 and the output pin (projection) 11, one side part 11a of the output pin 11 may be arranged to face the auxiliary magnetic pole piece 82 out of contact therewith and in the close vicinity thereof, or may be arranged to come in contact with the auxiliary magnetic pole piece 82 when the rotor 10 is in contact with the stopper 51 and is stopped at the initial position (resting position) as shown in FIG. 6A.

The operation of the electromagnetic actuator according to this embodiment follows the initial state of FIG. 7A, the state immediately after current application of FIG. 7B, the state of having rotated to the maximum rotational position of FIG. 7C, the state immediately after the stopping of current application at the maximum rotational position of FIG. 7D, and the state of having returned to the initial position of FIG. 7E. A description of the operation details is omitted because they are the same as those in the aforementioned embodiment.

As in the aforementioned embodiment, the projection (output pin 11) projecting from the rotor 10 and the auxiliary magnetic pole piece 82 facing the projection are provided in this embodiment, and a strong attraction force is generated therebetween. Therefore, this makes it possible to raise the maintaining force at the initial position, and a strong repulsion force generated therebetween makes it possible to obtain a sufficient rotational driving force, without raising an actuating voltage when rotated, i.e., without raising power consumption. Further, since the coils 40 are disposed at two places, respectively, efficiency can be improved, and the magnetic attraction force and the repulsion force can be forcefully exerted thereon.

In this structure, the magnetization angle of the rotor 10 may be changed, i.e., the boundary plane F may be set at the position where the plane F is rotated by a predetermined angle clockwise so that the area of an N-pole part (of the rotor 10) that faces the second magnetic pole part 91 can increase. If so, when the current to the coil 40 is stopped in the state where the rotor 10 has reached the maximum rotational position, the rotor 10 will be maintained at this maximum rotational position because of the action of a magnetic urging force.

Figure 8A:
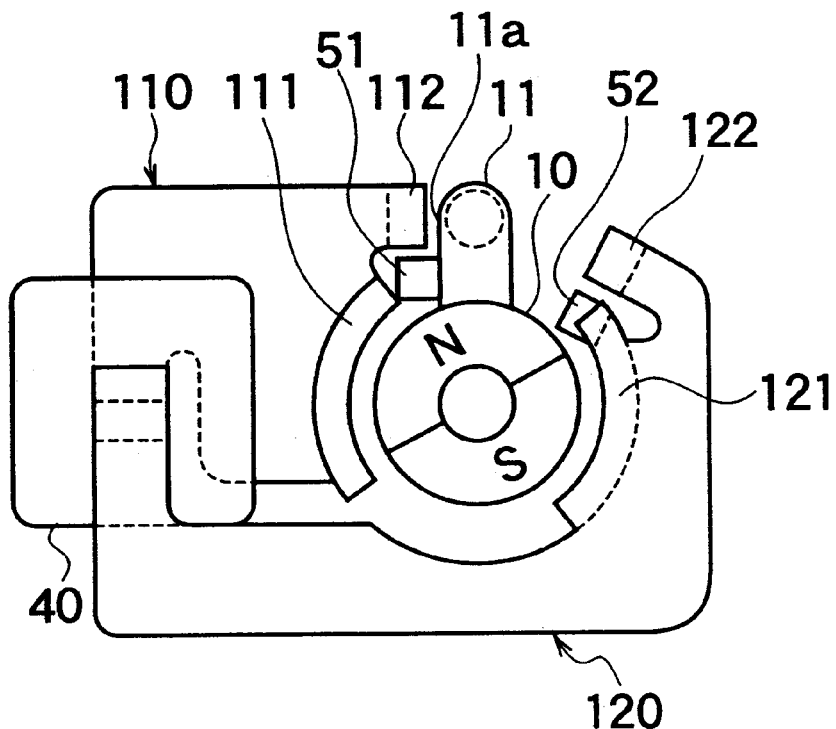
FIGS. 8A and 8B show one embodiment of the electromagnetic actuator according to the second aspect of the present invention.
Figure 8B:
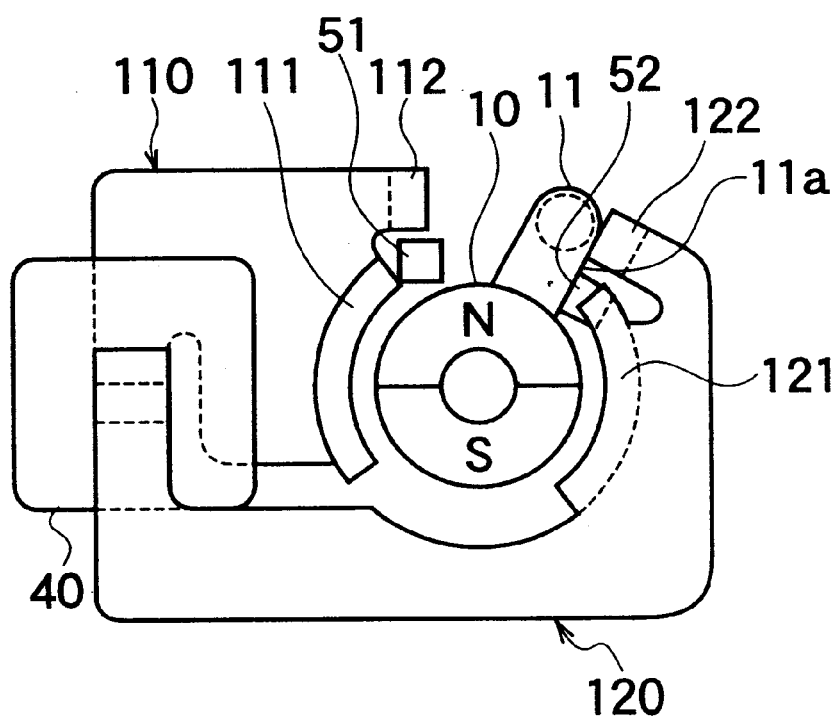

FIGS. 8A, 8B, and 9A through 9E show an embodiment of the electromagnetic actuator according to the second aspect of the present invention. FIG. 8A shows the rotor 10 located at the initial position, FIG. 8B shows the rotor 10 located at the maximum rotational position, and FIGS. 9A through 9E each show a state in the operating position.

As shown in FIGS. 8A and 8B, the electromagnetic actuator according to this embodiment is made up of a rotor 10 magnetized with different polarities, i.e., magnetized with the N and S poles with a boundary plane F passing through a rotational shaft therebetween, a first magnetic pole part 111 and a second magnetic pole part 121 disposed to face the outer circumferential surface of the rotor 10, a first auxiliary magnetic pole piece 112 disposed in the vicinity of the first magnetic pole part 111, a second auxiliary magnetic pole piece 122 disposed in the vicinity of the second magnetic pole part 121, a planar lower yoke 110 and a planar upper yoke 120 serving as magnetic-path forming members that form a magnetic path (magnetic circuit) by the connection between the first magnetic pole part 111 and the second magnetic pole part 121, and a magnetizing coil 40 wrapped around a bobbin at the connection between the lower and upper yokes 110 and 120.

Herein, the first magnetic pole part 111 is bent (erected) upward (frontward in the vertical direction with respect to the sheet of FIGS. 8A and 8B) at one end of the lower yoke 110 and is curved to face the outer circumferential surface of the rotor 10. The second magnetic pole part 121 is bent (erected) downward (rearward with respect to the sheet of FIGS. 8A and 8B) at one end of the upper yoke 120 and is curved to face the outer circumferential surface of the rotor 10.

Further, the first auxiliary magnetic pole piece 112 is formed in such a way as to branch from the first magnetic pole part 111, i.e., in the vicinity of the first magnetic pole part 111 at the end of the lower yoke 110. The first auxiliary magnetic pole piece 112 is bent downward in the same way as in the aforementioned embodiment. The first auxiliary magnetic pole piece 112 is used to generate a magnetic attraction force and a repulsion force with respect to the output pin 11, and can efficiently generate a magnetic operation force because it is formed by bending the planar magnetic member (i.e., lower yoke 110) as in the aforementioned embodiment.

Concerning the positional relationship between the first auxiliary magnetic pole piece 112 and the output pin (projection) 11, one side part 11*a* of the output pin 11 may be arranged to face the first auxiliary magnetic pole piece 112 out of contact therewith and in the close vicinity thereof, or may be arranged to come in contact with the first auxiliary magnetic pole piece 112 when the rotor 10 is in contact with the stopper 51 and is stopped at the initial position (resting position) as shown in FIG. 8A.

On the other hand, the second auxiliary magnetic pole piece 122 is formed in such a way as to branch from the second magnetic pole part 121, i.e., in the vicinity of the second magnetic pole part 121 at the end of the upper yoke 120. The second auxiliary magnetic pole piece 122 is bent downward in the same way as in the aforementioned embodiment. The second auxiliary magnetic pole piece 122 is used to generate a magnetic attraction force and a repulsion force with respect to the output pin 11, and can efficiently generate a magnetic operation force because it is formed by bending the planar magnetic member (i.e., upper yoke 120) as in the aforementioned embodiment.

Concerning the positional relationship between the second auxiliary magnetic pole piece 122 and the output pin (projection) 11, the other side part 11*a* of the output pin 11 may be arranged to come in contact with the second auxiliary magnetic pole piece 122, or may be arranged to face the second auxiliary magnetic pole piece 122 out of contact therewith and in the close vicinity thereof when the rotor 10 is in contact with the stopper 52 and is stopped at the maximum rotational position (operating position) as shown in FIG. 8B.

Figure 9A:
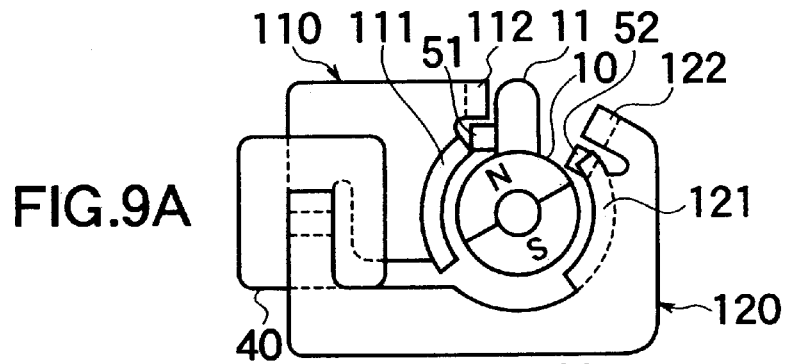
FIGS. 9A through 9E are views for explaining the operation of the electromagnetic actuator shown in FIGS. 8A and 8B.

Next, the operation of the electromagnetic actuator according to this embodiment will be described with reference to FIGS. 9A through 9E. First, in a current-stopped state in which an electric current is not passed through the coil 40, the rotor 10 is located at the initial position (resting position) where it is in contact with the stopper 51 as shown in FIG. 9A. At this time, a magnetic attraction force that urges the rotor 10 to rotate counterclockwise acts between the rotor 10 and the first magnetic pole part 111 and between the rotor 10 and the second magnetic pole part 121. Further, a strong magnetic attraction force acts between the output pin (projection) 11 magnetized with the N pole and the first auxiliary magnetic pole piece 112.

Especially, since the first auxiliary magnetic pole piece 112 and the output pin 11 are located outside in the radial direction by a predetermined distance from the outer circumferential surface of the rotor 10, torque T (f×d), which is a multiplication between a distance (d) from the rotational center shaft of the rotor 10 to the position and an attraction force (f) to be generated, effectively acts counterclockwise, and therefore the rotor 10 is infallibly maintained at the initial position.

Figure 9B:
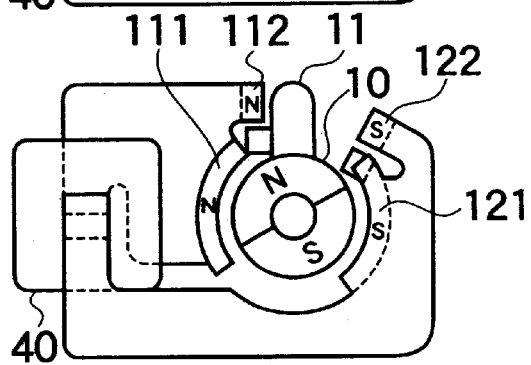

Thereafter, when a predetermined electric current (positive electric current) is passed through the coil 40, the N pole occurs in the first magnetic pole part 111 and in the first auxiliary magnetic pole piece 112, whereas the S pole occurs in the second magnetic pole part 121 and in the second auxiliary magnetic pole piece 122, as shown in FIG. 9B. Therefore, the first magnetic pole part 111 generates a repulsion force against the N pole of the rotor 10, whereas the second magnetic pole part 121 generates a repulsion force against the S pole of the rotor 10. Further, the first auxiliary magnetic pole piece 112 generates a repulsion force against the output pin 11 of the rotor 10, and the second auxiliary magnetic pole piece 122 generates an attraction force to the output pin 11 of the rotor 10.

Figure 9C:
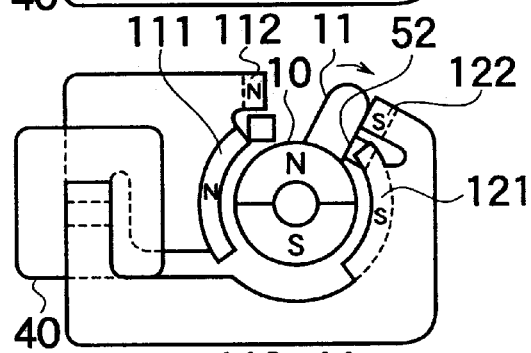

As a result, a strong clockwise rotational driving force is generated, and the rotor 10 rotates clockwise as shown in FIG. 9C, then comes in contact with the stopper 52, and is maintained at the maximum rotational position.

Figure 9D:
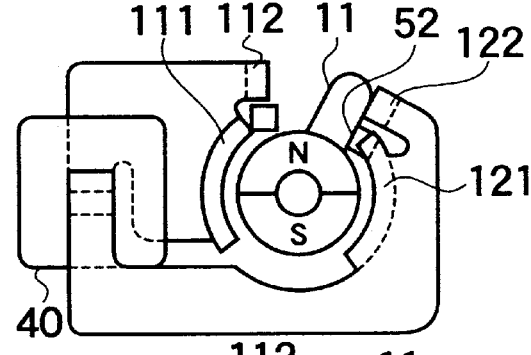

When the current to the coil 40 is stopped here, the magnetic poles occurring in the first magnetic pole part 111, in the first auxiliary magnetic pole piece 112, in the second magnetic pole part 121, and in the second auxiliary magnetic pole piece 122 disappear as shown in FIG. 9D. Simultaneously, a strong attraction force is generated between the second auxiliary magnetic pole piece 122 and the output pin 11.

As a result, the rotor 10 is infallibly maintained at the maximum rotational position in spite of the current-stopped state. In other words, the rotor 10 can be maintained at the maximum rotational position by a strong maintaining force without entailing power consumption.

Figure 9E:
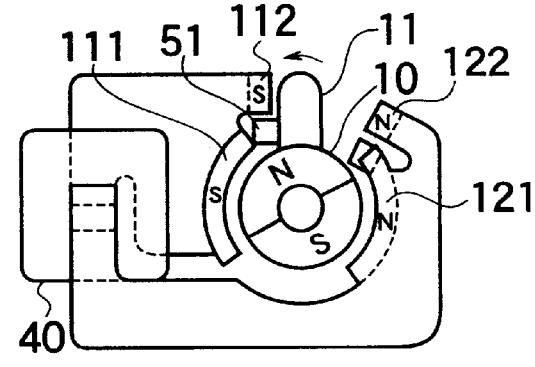

Thereafter, when the current is applied to the coil 40 in an opposite direction, the S pole occurs in the first magnetic pole part 111 and in the first auxiliary magnetic pole piece 112, whereas the N pole occurs in the second magnetic pole part 121 and in the second auxiliary magnetic pole piece 122. Thereafter, the rotor 10 rotates swiftly (at high speed) counterclockwise and returns to the initial position as shown in FIG. 9E by an attraction force generated between the N-pole part of the rotor 10 and the first magnetic pole part 111, by an attraction force generated between the first auxiliary magnetic pole piece 112 and the output pin 11, by a repulsion force generated between the S-pole part of the rotor 10 and the second magnetic pole part 121, and by a repulsion force generated between the second auxiliary magnetic pole piece 122 and the output pin 11.

In this embodiment, the projection (output pin 11) projecting from the rotor 10 and the first auxiliary magnetic pole piece 112 facing the projection are provided, and a strong attraction force is generated therebetween. Therefore, this makes it possible to raise the maintaining force at the initial position, and a strong repulsion force generated therebetween makes it possible to obtain a sufficient rotational driving force, without raising an actuating voltage when rotated, i.e., without raising power consumption.

Further, in this embodiment, the projection (output pin 11) projecting from the rotor 10 and the second auxiliary magnetic pole piece 122 facing the projection are provided, and a strong attraction force is generated therebetween. Therefore, this makes it possible to raise the maintaining force to maintain the rotor 10 at the maximum rotational position, and, on the other hand, a strong repulsion force generated therebetween makes it possible to smoothly return it to the initial position, without raising an actuating voltage when rotated, i.e., without raising power consumption.

Figure 10A:
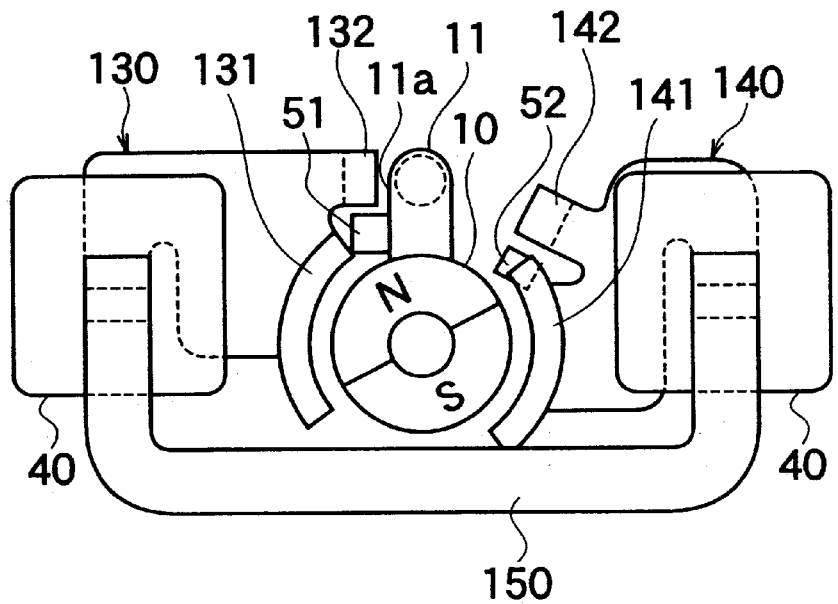
FIGS. 10A and 10B show another embodiment of the electromagnetic actuator according to the second aspect of the present invention.
Figure 10B:
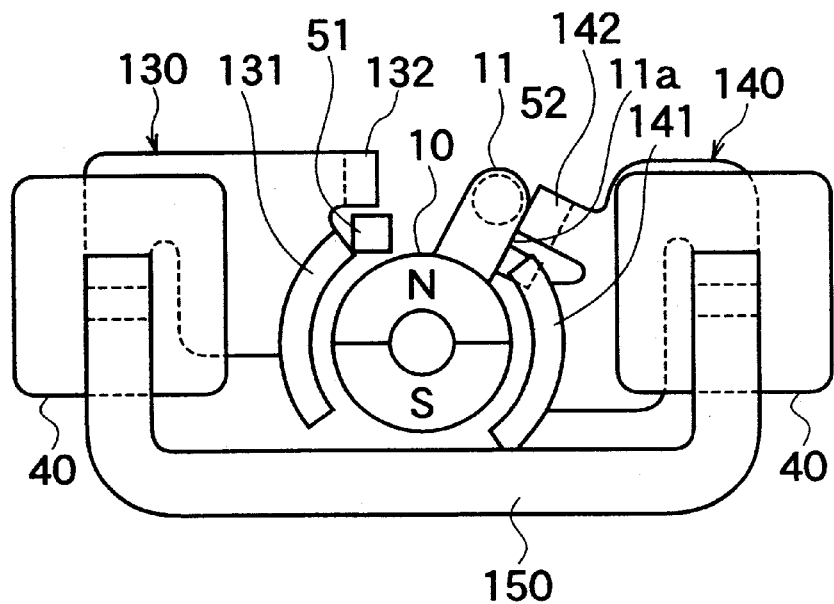

FIGS. 10A, 10B, and 11A through 11E show another embodiment of the electromagnetic actuator according to the second aspect of the present invention. FIG. 10A shows the rotor 10 located at the initial position, FIG. 10B shows the rotor 10 located at the maximum rotational position, and FIGS. 11A through 11E each show a state in the operating position.

As shown in FIGS. 10A and 10B, the electromagnetic actuator according to this embodiment is made up of a rotor 10 magnetized with different polarities, i.e., magnetized with the N and S poles with a boundary plane F passing through a rotational shaft therebetween, a first magnetic pole part 131 and a second magnetic pole part 141 disposed to face the outer circumferential surface of the rotor 10, a first auxiliary magnetic pole piece 132 disposed in the vicinity of the first magnetic pole part 131, a second auxiliary magnetic pole piece 142 disposed in the vicinity of the second magnetic pole part 141, a planar first lower yoke 130 serving as a magnetic-path forming member that has the first magnetic pole part 131 and the first auxiliary magnetic pole piece 132 at its end and forms a part of a magnetic path (magnetic circuit), a planar second lower yoke 140 serving as a magnetic-path forming member that has the second magnetic pole part 141 and the second auxiliary magnetic pole piece 142 at its end and forms a part of a magnetic path (magnetic circuit), a planar upper connection yoke 150 serving as a magnetic-path forming member that forms a magnetic path (magnetic circuit) by the connection between the other end of the first lower yoke 130 and the other end of the second lower yoke 140, and two magnetizing coils 40 wrapped around a bobbin at the connection between the first lower yoke 130 and the upper connection yoke 150 and around a bobbin at the connection between the second lower yoke 140 and the upper connection yoke 150, respectively.

Herein, the first magnetic pole part 131 is bent (erected) upward (frontward in the vertical direction with respect to the sheet of FIGS. 10A and 10B) at one end of the first lower yoke 130, and is curved to face the outer circumferential surface of the rotor 10. The second magnetic pole part 141 is bent (erected) upward (frontward with respect to the sheet of FIGS. 10A and 10B) at one end of the second lower yoke 140 and is curved to face the outer circumferential surface of the rotor 10.

Further, the first auxiliary magnetic pole piece 132 is formed in such a way as to branch from the first magnetic pole part 131, i.e., in the vicinity of the first magnetic pole part 131 at the end of the first lower yoke 130. The first auxiliary magnetic pole piece 132 is bent downward in the same way as in the aforementioned embodiment. The first auxiliary magnetic pole piece 132 is used to generate a magnetic attraction force and a repulsion force with respect to the output pin 11, and can efficiently generate a magnetic operation force because it is formed by bending the planar magnetic member (i.e., first lower yoke 130) as in the aforementioned embodiment.

Concerning the positional relationship between the first auxiliary magnetic pole piece 132 and the output pin (projection) 11, one side part 11a of the output pin 11 may be arranged to face the first auxiliary magnetic pole piece 132 out of contact therewith and in the close vicinity thereof, or may be arranged to come in contact with the first auxiliary magnetic pole piece 132 when the rotor 10 is in contact with the stopper 51 and is stopped at the initial position (resting position) as shown in FIG. 10A.

The second auxiliary magnetic pole piece 142 is formed in such a way as to branch from the second magnetic pole part 141, i.e., in the vicinity of the second magnetic pole part 141 at the end of the second lower yoke 140. The second auxiliary magnetic pole piece 142 is bent downward in the same way as the first auxiliary magnetic pole piece 132. The second auxiliary magnetic pole piece 142 is used to generate a magnetic attraction force and a repulsion force with respect to the output pin 11, and can efficiently generate a magnetic operation force because it is formed by bending the planar magnetic member (i.e., second lower yoke 140) as in the aforementioned embodiment.

Concerning the positional relationship between the second auxiliary magnetic pole piece 142 and the output pin (projection) 11, the other side part 11a of the output pin 11 may be arranged to come in contact with the second auxiliary magnetic pole piece 142, or may be arranged to face the second auxiliary magnetic pole piece 142 out of contact therewith and in the close vicinity thereof when the rotor 10 is in contact with the stopper 52 and is stopped at the maximum rotational position (operating position) as shown in FIG. 10B.

The operation of the electromagnetic actuator according to this embodiment follows the initial state of FIG. 11A, the state immediately after current application of FIG. 11B, the state of having rotated to the maximum rotational position of FIG. 1C, the state immediately after the stopping of current application at the maximum rotational position of FIG. 11D, and the state of having returned to the initial position of FIG. 1E. A description of the operation details is omitted because they are the same as in the aforementioned embodiment of FIGS. 8A, 8B, and 9A through 9E.

In this embodiment, the projection (output pin 11) projecting from the rotor 10 and the first auxiliary magnetic pole piece 132 facing the projection are provided, and a strong attraction force is generated therebetween. Therefore, this makes it possible to raise the maintaining force at the initial position, and a strong repulsion force generated therebetween makes it possible to obtain a sufficient rotational driving force, without raising an actuating voltage when rotated, i.e., without raising power consumption.

Further, in this embodiment, the projection (output pin 11) projecting from the rotor 10 and the second auxiliary magnetic pole piece 142 facing the projection are provided, and a strong attraction force is generated therebetween. Therefore, this makes it possible to raise the maintaining force to maintain the rotor 10 at the maximum rotational position, and, on the other hand, a strong repulsion force generated therebetween makes it possible to smoothly return it to the initial position, without raising an actuating voltage when rotated, i.e., without raising power consumption.

Figure 12A:
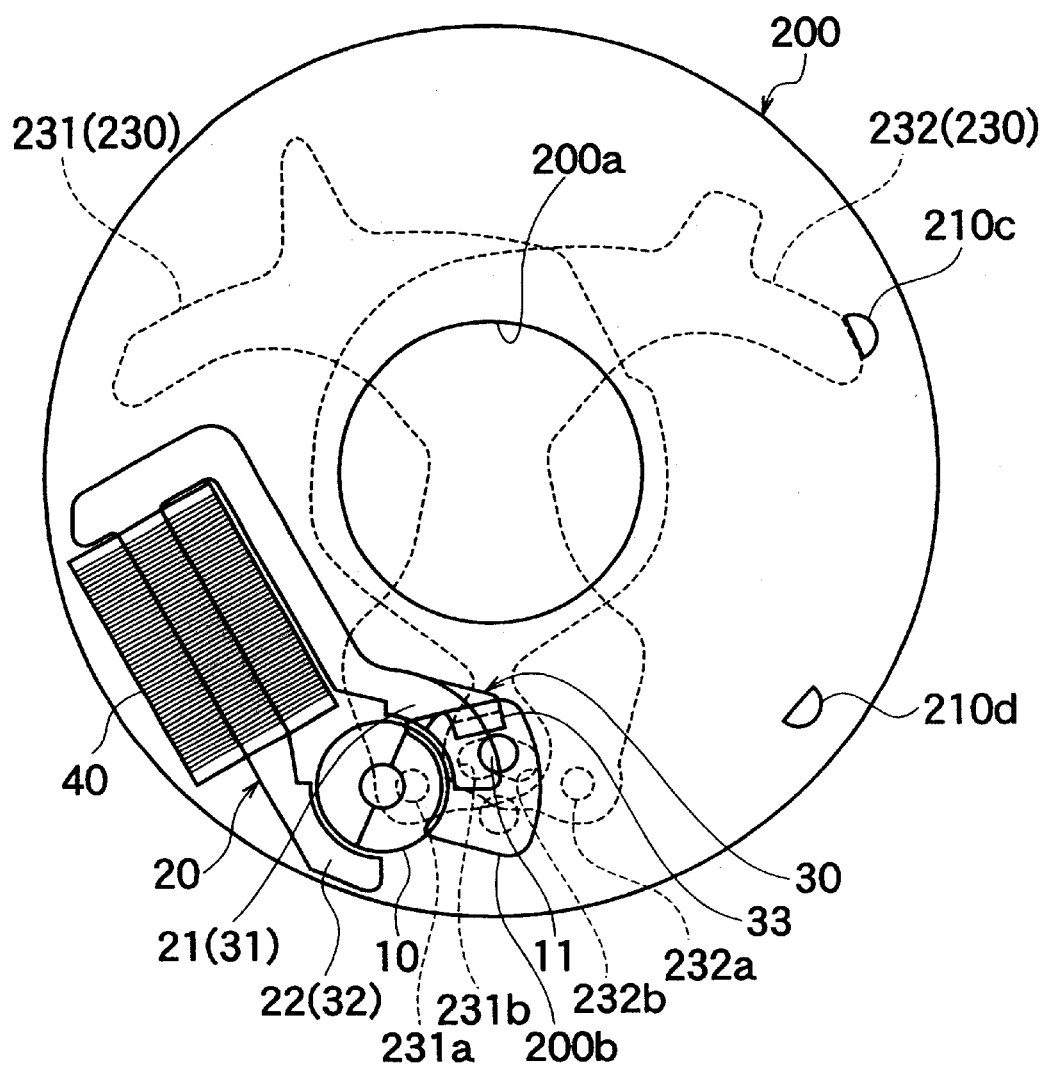
FIGS. 12A and 12B show one embodiment of a camera shutter unit according to the present invention.
Figure 12B:
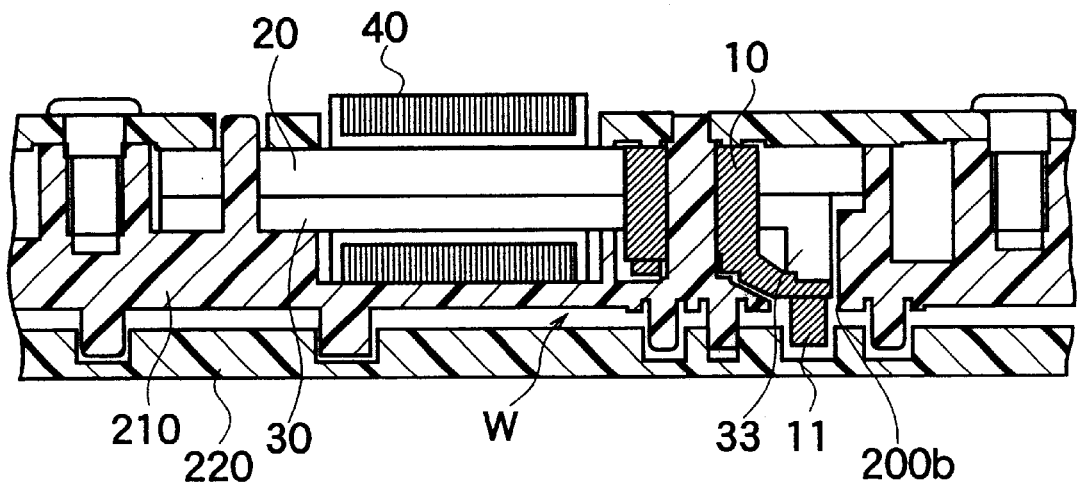

FIGS. 12A and 12B show an embodiment of a camera shutter unit according to the present invention. The camera shutter unit according to this embodiment includes, as shown in FIGS. 12A and 12B, a base plate 200 (front base plate 210 and rear base plate 220) that defines an opening 200a through which a beam of light passes, a shutter blade 230 disposed to freely reciprocate between an open position where the opening 200a is opened and a closed position where the opening 200a is closed, a driving source connected to the shutter blade 230 for exerting a driving force on the shutter blade 230 to be reciprocated, etc. Herein, the electromagnetic actuator shown in FIGS. 1A, 1B, and 3A through 3E is used as the driving source.

In more detail, the rotor 10 is rotatably supported by the front base plate 210, and the output pin 11 is extended to a blade chamber W formed between the front base plate 210 and the rear base plate 220 through a notch hole 200b. The lower yoke 30 that forms the first magnetic pole part 31, the auxiliary magnetic pole piece 33, and the second magnetic pole part 32, the upper yoke 20 that forms the first magnetic pole part 21 and the second magnetic pole part 22, the coil 40, etc., are disposed and fixed to the front base plate 210.

The shutter blade 230 consists of two shutter blades, i.e., a first shutter blade 231 and a second shutter blade 232. They are supported by the front base plate 210 rotatably upon supporting shafts 231a and 232a, respectively, and the output pin 11 of the rotor 10 is connected to long holes 231b and 232b thereof so as to transmit a rotational driving force to the shutter blade 230. The front base plate 210 is provided with stoppers 210c and 210d instead of the aforementioned stoppers 51 and 52. The operation of the shutter is well known, and the operation of the electromagnetic actuator is performed in the same way as mentioned above, and therefore a description is omitted.

According to this embodiment, the shutter blade 230 is driven by a desired rotational driving force through low power consumption in a current-running state, and the shutter blade 230 is infallibly maintained at a predetermined resting position (initial position) in a current-stopped state.

Figure 13A:
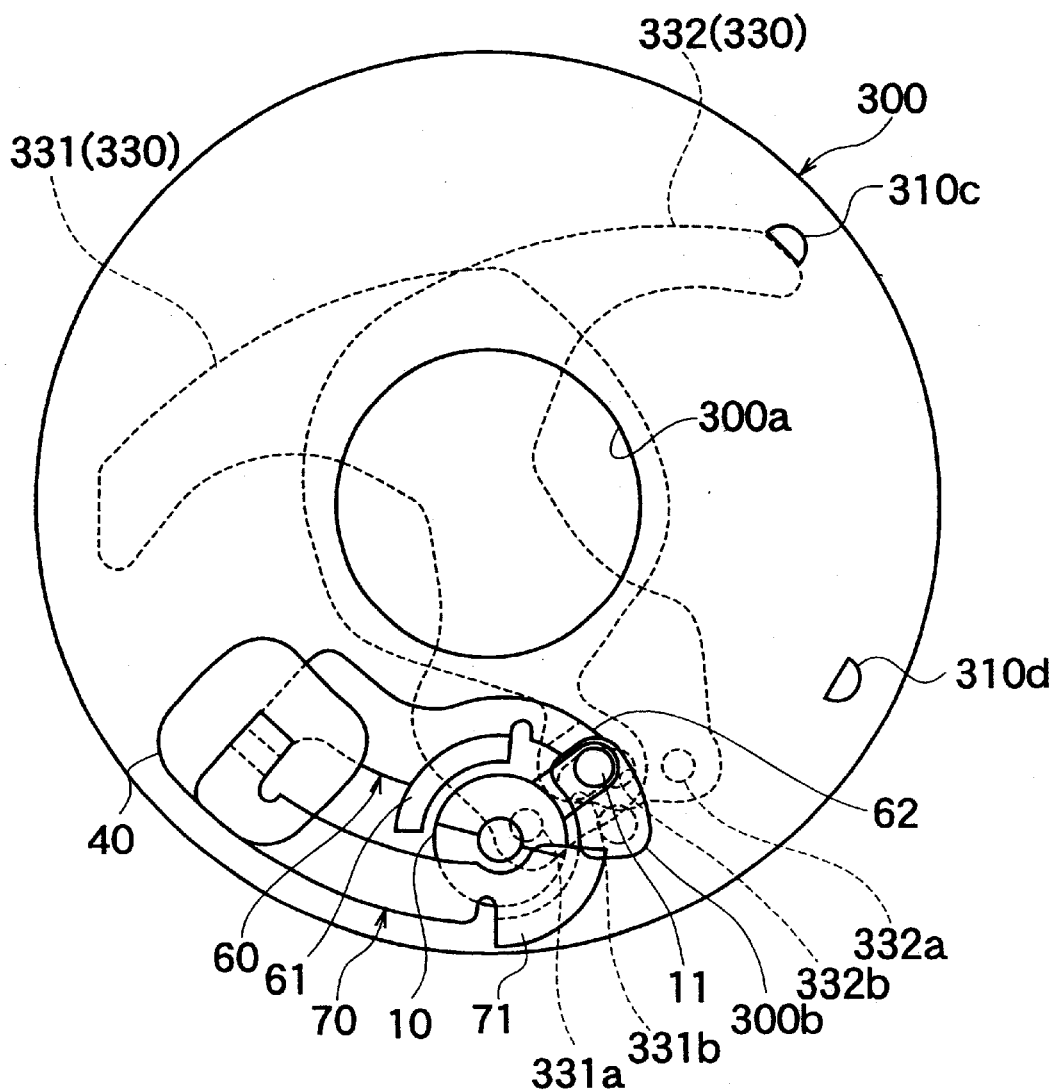
FIGS. 13A and 13B show another embodiment of the camera shutter unit according to the present invention.
Figure 13B:
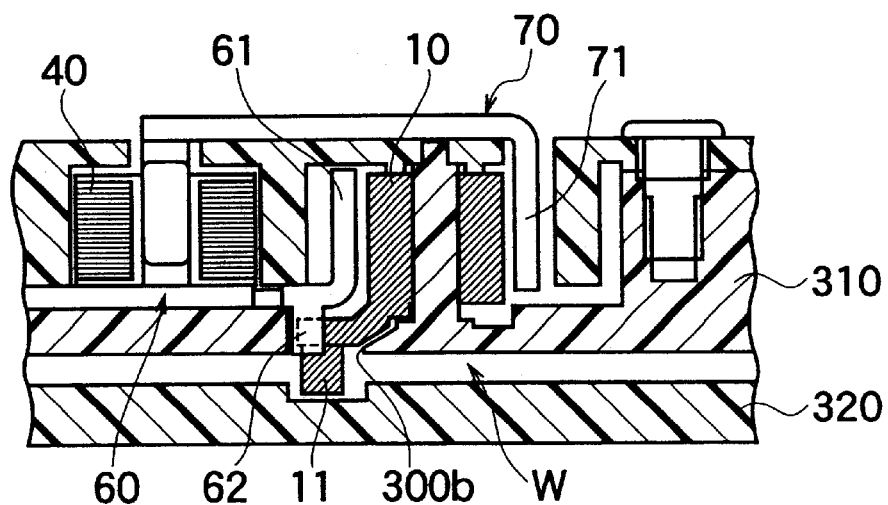

FIGS. 13A and 13B show another embodiment of the camera shutter unit according to the present invention. The camera shutter unit according to this embodiment includes, as shown in FIGS. 13A and 13B, a base plate 300 (front base plate 310 and rear base plate 320) that defines an opening 300a through which a beam of light passes, a shutter blade 330 disposed to freely reciprocate between an open position where the opening 300a is opened and a closed position where the opening 300a is closed, a driving source connected to the shutter blade 330 for exerting a driving force on the shutter blade 330 to be reciprocated, etc. Herein, the electromagnetic actuator shown in FIGS. 4A, 4B, and 5A through 5E is used as the driving source.

In more detail, the rotor 10 is rotatably supported by the front base plate 310, and the output pin 11 is extended to a blade chamber W formed between the front base plate 310 and the rear base plate 320 through a notch hole 300b. The lower yoke 60 that forms the first magnetic pole part 61 and the auxiliary magnetic pole piece 62, the upper yoke 70 that forms the second magnetic pole part 71, the coil 40, etc., are disposed and fixed to the front base plate 310.

The shutter blade 330 consists of two shutter blades, i.e., a first shutter blade 331 and a second shutter blade 332. They are supported by the front base plate 310 rotatably upon supporting shafts 331a and 332a, respectively, and the output pin 11 of the rotor 10 is connected to long holes 331b and 332b thereof so as to transmit a rotational driving force to the shutter blade 330. The front base plate 310 is provided with stoppers 310c and 310d instead of the aforementioned stoppers 51 and 52. The operation of the shutter is well known, and the operation of the electromagnetic actuator is performed in the same way as mentioned above, and therefore a description is omitted here.

According to this embodiment, the shutter blade 330 is driven by a desired rotational driving force through low power consumption in a current-running state, and the shutter blade 330 is infallibly maintained at a predetermined resting position (initial position) in a current-stopped state.

Figure 14A:
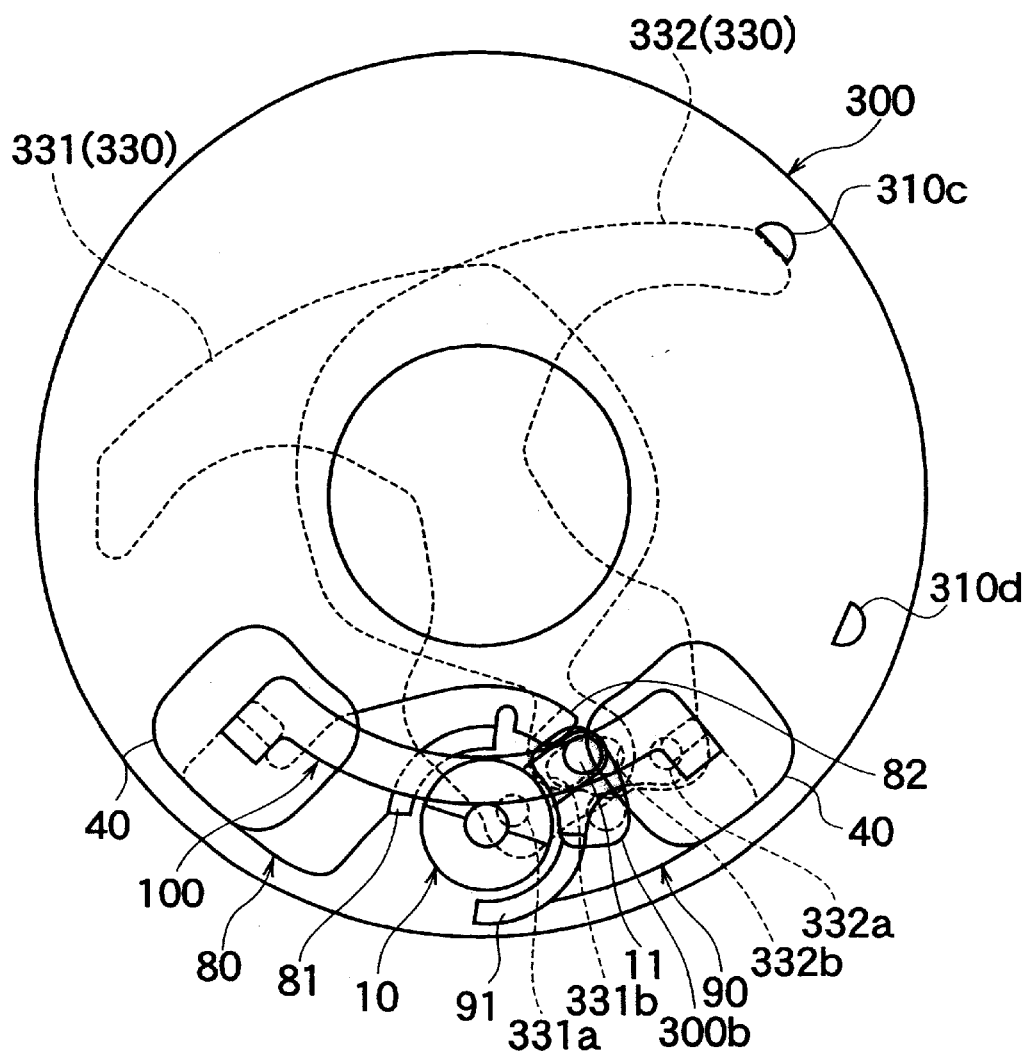
FIGS. 14A and 14B show still another embodiment of the camera shutter unit according to the present invention.
Figure 14B:
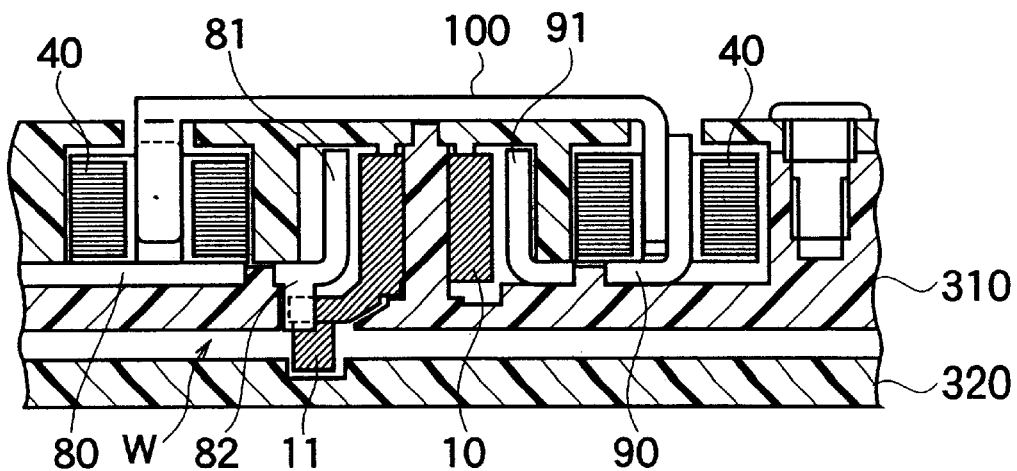

FIGS. 14A and 14B show still another embodiment of the camera shutter unit according to the present invention. The camera shutter unit according to this embodiment includes, as shown in FIGS. 14A and 14B, a base plate 300 (front base plate 310 and rear base plate 320) that defines an opening 300a through which a beam of light passes, a shutter blade 330 disposed to freely reciprocate between an open position where the opening 300a is opened and a closed position where the opening 300a is closed, a driving source connected to the shutter blade 330 for exerting a driving force on the shutter blade 330 to be reciprocated, etc. Herein, the electromagnetic actuator shown in FIGS. 6A, 6B, and 7A through 7E is used as the driving source.

In more detail, the rotor 10 is rotatably supported by the front base plate 310, and the output pin 11 is extended to a blade chamber W formed between the front base plate 310 and the rear base plate 320 through a notch hole 300b. The first lower yoke 80 that forms the first magnetic pole part 81 and the auxiliary magnetic pole piece 82, the second lower yoke 90 that forms the second magnetic pole part 91, the upper yoke 100 that connects the first lower yoke 80 to the second lower yoke 90, the two coils 40, etc., are disposed and fixed to the front base plate 310.

The shutter blade 330 is the same as in the aforementioned embodiment. In addition, the operation of the shutter is well known, and the operation of the electromagnetic actuator is performed in the same way as mentioned above. Therefore, a description is omitted here.

According to this embodiment, the shutter blade 330 is driven by a desired rotational driving force through low power consumption in a current-running state, and the shutter blade 330 is infallibly maintained at a predetermined resting position (initial position) in a current-stopped state.

The electromagnetic actuator shown in FIGS. 8A, 8B, 10A, and 10B may be used as the driving source of the camera shutter unit.

In the aforementioned embodiments, although the output pin 11 serves also as the projection of the rotor 10, a projection independent of the output pin 11 may be provided.

Further, the auxiliary magnetic pole pieces 33, 62, 82, 112, 122, 132 and 142 are each formed by bending a planar magnetic member. However, the present invention is not limited to this, and they can assume other shapes.

Thus, according to the electromagnetic actuator of the present invention, a magnetic urging force in the current-stopped state can be raised without entailing an increase in an actuating voltage i.e., with the aim of reducing power consumption, and the rotor can be infallibly maintained at a predetermined initial position. In addition, a sufficient rotational driving force can be obtained in the current-running state.

Additionally, the magnetic urging force can be raised in the current-stopped state at the maximum rotational position, and the rotor can be infallibly maintained at the maximum rotational position and can be swiftly returned to the initial position when the current is applied.

Further, according to the camera shutter unit of the present invention, the shutter blade can be infallibly maintained at the predetermined resting position or at the maximum rotational position in the current-stopped state, and the shutter blade can be swiftly opened or closed.

Figure 16:
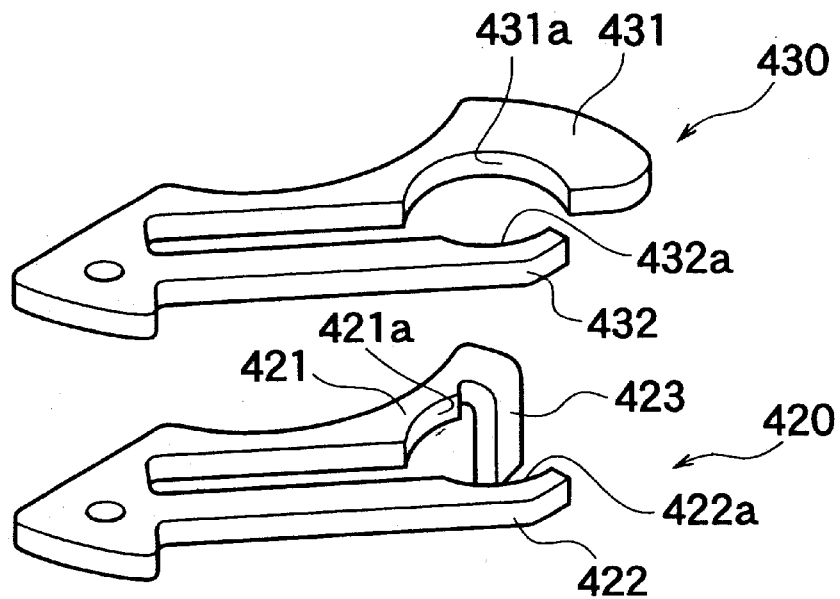
FIG. 16 is a perspective view showing a lower yoke and an upper yoke of the electromagnetic actuator shown in FIG. 15.

FIGS. 15 and 16 show an embodiment of the electromagnetic actuator according to a third aspect of the present invention. As shown in FIG. 15, the electromagnetic actuator according to this embodiment is made up of a rotor 410, a lower yoke 420 serving as a first yoke that has first and second magnetic pole parts 421 and 422 disposed to face the outer circumferential surface of the rotor 410 and that has an auxiliary magnetic pole piece 423 formed in the vicinity of the first magnetic pole part 421, an upper yoke 430 serving as a second yoke that has first and second magnetic pole parts 431 and 432 disposed to face the outer circumferential surface of the rotor 410, and a magnetizing coil 440 wrapped (i.e., wound) around a bobbin integrally surrounding the lower and upper yokes 420 and 430 laid on each other.

As shown in FIG. 15, the rotor 410 is magnetized with different polarities, i.e., magnetized with the N and S poles with a boundary plane F passing through a rotational shaft there between. The rotor 410 has a first outer circumferential surface 411 on the N-pole side and a second outer circumferential surface 412 on the S-pole side that are divided into two parts by this boundary plane F, and has an output pin 413 that projects outward in the radial direction from the side of the first outer circumferential surface 411 almost perpendicularly to the boundary plane and further extends downward.

One role of the output pin 413 is to transmit a rotational driving force of the rotor 410 to the outside. Another role of the output pin 413 is to be used also as a projection that generates a magnetic attraction force and a repulsion force in cooperation with the auxiliary magnetic pole piece 423, because the whole of it is magnetized with the N pole.

In a current-stopped state in which an electric current is not passed through the coil 440, the rotor 410 rotates counterclockwise, and the side part 413a thereof comes in contact with a stopper (not shown), and the rotor 410 is located at an initial position (resting position) where its further rotation is restricted. On the other hand, when the current is passed through the coil 440, the rotor 410 rotates clockwise angularly to the maximum, and the side part 413b thereof comes in contact with another stopper (not shown), and the rotor 410 is located at a maximum rotational position (operating position) where its further rotation is restricted.

In this structure, the output pin 413 used as a projection may be constructed in such a way as to project outward in the radial direction from the second outer circumferential surface 412 of the half that has been magnetized with the S pole almost perpendicularly to the boundary plane and as to magnetize the whole thereof with the S pole. Further, a projection in cooperation with the auxiliary magnetic pole piece 423 may be provided independently of the output pin 413 and may be magnetized with the N or S pole without using the output pin 413 also as the projection.

As shown in FIGS. 15 and 16, the lower yoke 420 is planar, and, in the vicinity of the first magnetic pole part 421 located at its end, is provided with the auxiliary magnetic pole piece 423 that has been vertically bent. The auxiliary magnetic pole piece 423 is used to generate a magnetic attraction force and a repulsion force with respect to the output pin 413, and, since it is formed by bending a part of the planer lower yoke 420, an area facing the output pin 413 increases, thus making it possible to efficiently generate a magnetic operation force.

Concerning the positional relationship between the auxiliary magnetic pole piece 423 and the output pin (projection) 413, when the rotor 410 is in contact with the stopper (not shown) and is stopped at the initial position (resting position), one side part 413a of the output pin 413 may be arranged to face the auxiliary magnetic pole piece 423 without contact therewith and in the close vicinity thereof, or, alternatively, may be arranged to be in contact with the auxiliary magnetic pole piece 423.

Further, in the lower yoke 420, a first wide facing surface 421a is formed on the first magnetic pole part 421 located at its end, whereas a second wide facing surface 422a is formed on the second magnetic pole part 422 located at the opposite end.

The first wide facing surface 421a has the form of an arcuate surface so as to chiefly face the first outer circumferential surface 411 of the rotor 410 over a length wider than a predetermined length and with a predetermined interval in the rotational direction of the rotor 410. The "length wider than a predetermined length" mentioned here means a sufficient length by which a facing area capable of obtaining a strong rotational force is acquired in a current-running state, in consideration of the fact that the auxiliary magnetic pole piece 423 is provided in the neighborhood. For example, as shown in FIGS. 15 and 16, it is a length that corresponds to an angle range in which a central angle is about 70° to 80°. However, the central angle is not limited to this angle range, and can be appropriately selected.

The second wide facing surface 422a has the form of an arcuate surface so as to chiefly face the second outer circumferential surface 412 of the rotor 410 over a length wider than a predetermined length and with a predetermined interval in the rotational direction of the rotor 410. The "length wider than a predetermined length" mentioned here means a sufficient length by which a facing area capable of obtaining a strong rotational force is acquired in a current-running state, in consideration of layout constraints. For example, as shown in FIGS. 15 and 16, it is a length that corresponds to an angle range of about 80° to 100° slightly greater than the central angle of the first wide facing surface 421a. However, the central angle is not limited to this angle range, and can be appropriately selected.

As shown in FIGS. 15 and 16, the upper yoke 430 is planar, and a first wide facing surface 431a is formed on the first magnetic pole part 431 located at its end, and a second wide facing surface 432a is formed on the second magnetic pole part 432 located at the opposite end.

The first wide facing surface 431a has the form of an arcuate surface so as to chiefly face the first outer circumferential surface 411 of the rotor 410 over a length wider than a predetermined length and with a predetermined interval in the rotational direction of the rotor 410. The "length wider than a predetermined length" mentioned here means a sufficient length by which a facing area capable of obtaining a strong rotational force is acquired in a current-running state. For example, as shown in FIGS. 15 and 16, it is a length that corresponds to an angle range in which a central angle is about 180° or about 170° to 180° slightly smaller than 180°. However, the central angle is not limited to this angle range, and can be appropriately selected.

The second wide facing surface 432a has the form of an arcuate surface so as to chiefly face the second outer circumferential surface 412 of the rotor 410 over a length wider than a predetermined length and with a predetermined interval in the rotational direction of the rotor 410. The "length wider than a predetermined length" mentioned here means a sufficient length by which a facing area capable of obtaining a strong rotational force is acquired in a current-running state, in consideration of layout constraints. For example, as shown in FIGS. 15 and 16, it is a length that corresponds to an angle range of about 80° to 100° smaller than the central angle of the first wide facing surface 421*a*. However, the central angle is not limited to this angle range, and can be appropriately selected.

The rotor 410, the lower yoke 420, and the upper yoke 430 are assembled in accordance with various uses and are modularized. If they are applied to, for example, the camera shutter unit as shown in FIG. 15, the rotor 410 is freely rotatably mounted to a supporting shaft 451 formed in the base plate 450, and the lower and upper yokes 420 and 430 are passed through a positioning shaft 452 formed in the base plate 450 and are laid on each other. They are then pressed by a cover plate 460 from the upper side, and are fastened to a boss 453 formed in the base plate 450 by means of a bolt 470.

Figure 17:
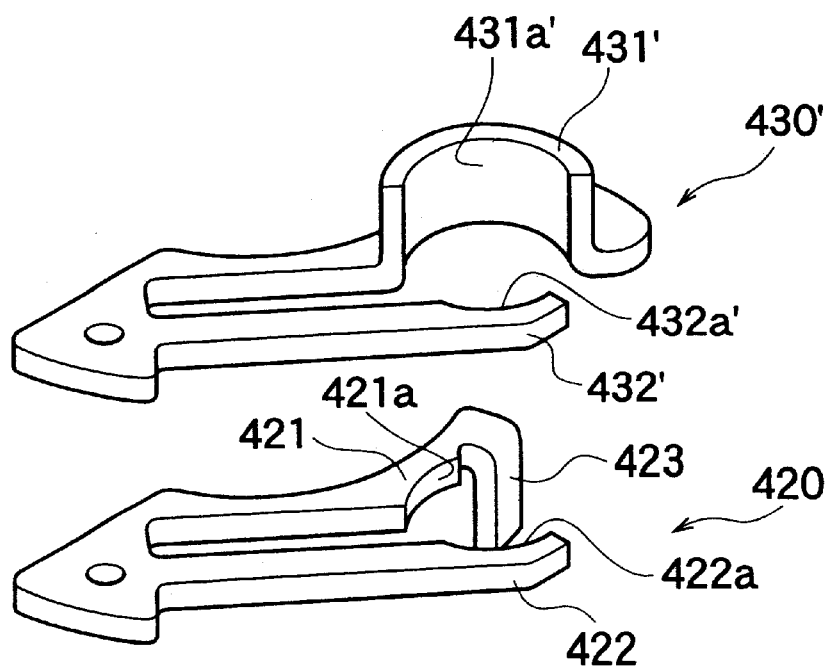
FIG. 17 is a perspective view showing a lower yoke and an upper yoke according to another embodiment of the electromagnetic actuator according to the third aspect of the present invention.

FIG. 17 shows another embodiment of the electromagnetic actuator according to the third aspect of the present invention, in which the shape of the first wide facing surface 431*a* of the aforementioned embodiment is changed. That is, as shown in FIG. 17, an upper yoke 430' is constructed to have a substantially semicylindrical surface such that a first magnetic pole part 431' located at its end is vertically bent and erected in the direction of the rotational shaft of the rotor 410.

Since this substantially semicylindrical surface is used as a first wide facing surface 431*a'* that faces the first outer circumferential surface 411 of the rotor 410 or that faces other parts, an area that faces the first outer circumferential surface 411 becomes wider proportionately with an extension in the direction of the rotational shaft of the rotor 410 than the first wide facing surface 431*a*, and therefore a rotational force in the current-running state increases proportionately therewith. Accordingly, a stronger rotational force is given to the rotor 410 in the current-running state.

Figure 18A:
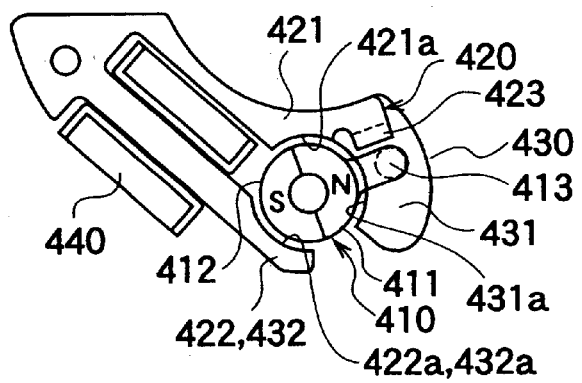
FIGS. 18A through 18E are views for explaining the operation of the electromagnetic actuator shown in FIGS. 15 and 16.

Next, the operation of the electromagnetic actuator according to the third aspect of the present invention will be described with reference to FIGS. 18A through 18E. First, in a current-stopped state in which an electric current is not passed through the coil 440, the rotor 410 is located at the initial position (resting position) where it is in contact with a stopper (not shown) as shown in FIG. 18A. At this time, a magnetic attraction force by which the rotor 410 is attracted in the radial direction acts between the first outer circumferential surface 411 of the rotor 410 and the first wide facing surfaces 421*a*, 431*a* of the first magnetic pole parts 421, 431 and between the second outer circumferential surface 412 of the rotor 410 and the second wide facing surfaces 422*a*, 432*a* of the second magnetic pole parts 422, 432. Further, a strong magnetic attraction force acts between the output pin (projection) 413 magnetized with the N pole and the auxiliary magnetic pole piece 423.

Especially, since the auxiliary magnetic pole piece 423 and the output pin 413 are located outside in the radial direction by a predetermined distance from the first outer circumferential surface 411 of the rotor 410, torque T (f×d), which is a multiplication between a distance (d) from the rotational center shaft of the rotor 410 to that position and an attraction force (f) to be generated, effectively acts counterclockwise, and therefore the rotor 410 is infallibly maintained at the initial position.

Figure 18B:
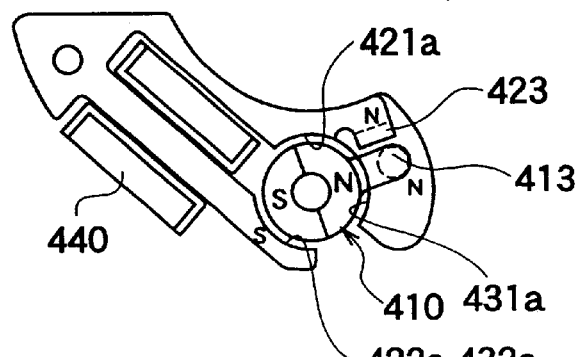

Thereafter, when a predetermined electric current (positive electric current) is passed through the coil 440, the N pole occurs in the first magnetic pole parts 421, 431 (first wide facing surfaces 421*a*, 431*a*) and in the auxiliary magnetic pole piece 423, whereas the S pole occurs in the second magnetic pole parts 422, 432 (second wide facing surfaces 422*a*, 432*a*), as shown in FIG. 18B.

Therefore, a repulsion force is generated between the first wide facing surfaces 421*a*, 431*a* and the first outer circumferential surface 411 (N pole) of the rotor 410, and a repulsion force is generated between the second wide facing surfaces 422*a*, 432*a* and the second outer circumferential surface 412 (S pole) of the rotor 410. Further, a repulsion force is generated between the auxiliary magnetic pole piece 423 and the output pin 413 of the rotor 410.

Figure 18C:
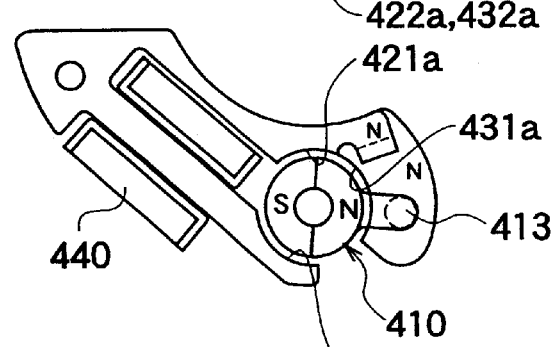

As a result, a strong clockwise rotational driving force is generated, and the rotor 410 swiftly rotates to the maximum rotational position as shown in FIG. 18C, then comes in contact with the stopper (not shown), and is maintained at this position. As long as the current-running state continues, the rotor 410 continues to be maintained at this maximum rotational position.

Figure 18D:
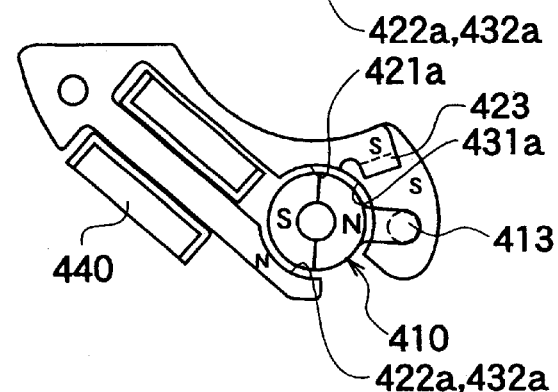

If the current is applied to the coil 440 in an opposite direction here, the S pole occurs in the first magnetic pole parts 421, 431 (first wide facing surfaces 421*a*, 431*a*) and in the auxiliary magnetic pole piece 423 as shown in FIG. 18D, whereas the N pole occurs in the second magnetic pole parts 422, 432 (second wide facing surfaces 422*a*, 432*a*).

Therefore, an attraction force is generated between the first wide facing surfaces 421*a*, 431*a* and the first outer circumferential surface 411 (N pole) of the rotor 410, and an attraction force is generated between the second wide facing surfaces 422*a*, 432*a* and the second outer circumferential surface 412 (S pole) of the rotor 410. Further, an attraction force is generated between the auxiliary magnetic pole piece 423 and the output pin 413 of the rotor 410.

Figure 18E:
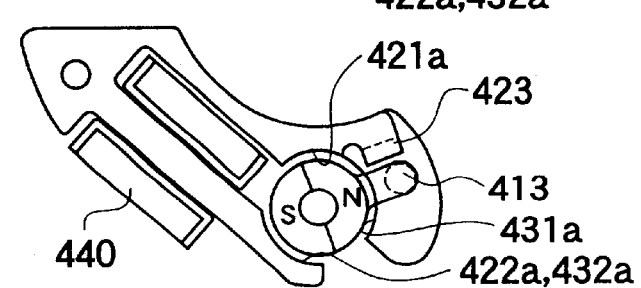

As a result, a strong counterclockwise rotational driving force is generated, and the rotor 410 swiftly rotates and returns to the initial position as shown in FIG. 18E. The rotor then comes in contact with the stopper (not shown), and is positioned there. Even if the current application to the coil 440 is stopped, the rotor 410 is maintained at the initial position by a strong attraction force between the auxiliary magnetic pole piece 423 and the output pin 413.

If the current application to the coil 440 is stopped in the state of the maximum rotational position shown in FIG. 18D, the rotor 410 rotates counterclockwise and returns to the initial position in the same way by the action of an attraction force generated from the relationship between the positions of the first and second magnetic pole parts 421, 431, 422 and 432 and the magnetization angle of the rotor 410 and by the action of an attraction force generated from the relationship between the auxiliary magnetic pole piece 423 and the output pin 413.

In this embodiment, the first magnetic pole part 421 of the lower yoke 420 and the first magnetic pole part 431 of the upper yoke 430 are formed as the first wide facing surfaces 421*a* and 431*a* that face the first outer circumferential surface 411 of the rotor 410 over a wide length, whereas the second magnetic pole part 422 of the lower yoke 420 and the second magnetic pole part 432 of the upper yoke 430 are formed as the second wide facing surfaces 422*a* and 432*a* that face the second outer circumferential surface 412 of the rotor 410 over a wide length. Therefore, a strong rotational driving force can be obtained especially when the current is passed through the coil 440.

Further, in this embodiment, the projection (output pin 413) projecting from the rotor 410 and the auxiliary magnetic pole piece 423 facing the projection are provided, and a strong attraction force is generated therebetween. Therefore, this makes it possible to raise the maintaining force (magnetic attraction force) at the initial position, and a strong repulsion force generated therebetween makes it possible to rotate it to the maximum rotational position. In other words, a strong rotational driving force can be obtained in the current-running state without raising an actuating voltage when rotated, i.e., without raising power consumption.

Figure 19:
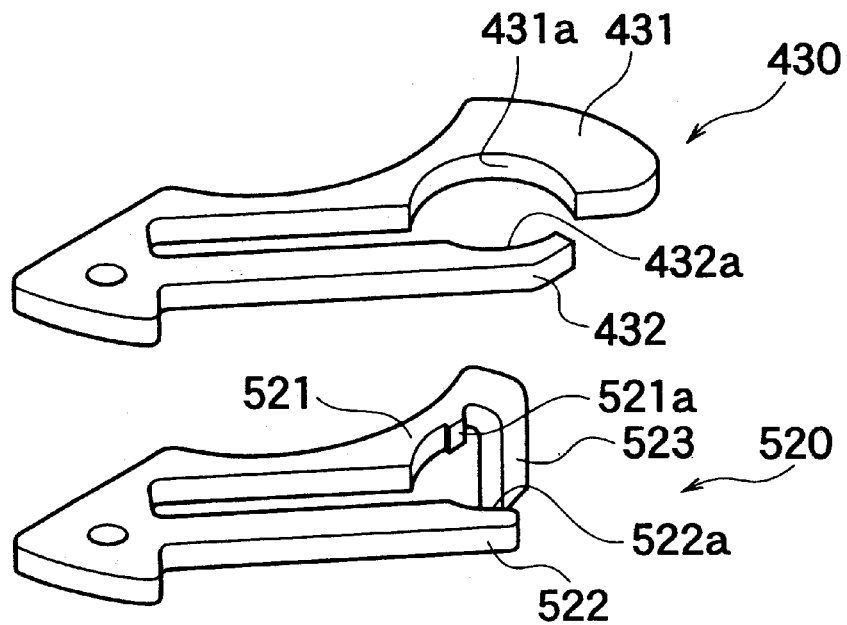
FIG. 19 is a perspective view showing a lower yoke and an upper yoke according to one embodiment of the electromagnetic actuator according to the fourth aspect of the present invention.

FIG. 19 shows an embodiment of the electromagnetic actuator according to a fourth aspect of the present invention. Since only the shape of the lower yoke is changed in this embodiment in comparison with the aforementioned embodiment shown in FIG. 16, the same reference characters are given to the upper yoke 430 and the other components, respectively, that are the same in structure, and a description is omitted. Differences alone will be described.

As shown in FIG. 19, a lower yoke 520 is planar, and, in the vicinity of a first magnetic pole part 521 located at its end, is provided with an auxiliary magnetic pole piece 523 that has been vertically bent. The auxiliary magnetic pole piece 523 is constructed to exert the same action on the output pin 413 of the rotor 410 as the aforementioned auxiliary magnetic pole piece 423.

In the lower yoke 520, a first narrow facing surface 521a is formed on the first magnetic pole part 521 located at its end, whereas a second narrow facing surface 522a is formed on the second magnetic pole part 522 located at the opposite end.

The first narrow facing surface 521a has the form of an arcuate surface so as to chiefly face the first outer circumferential surface 411 of the rotor 410 more narrowly than the first wide facing surface 431a and with a predetermined interval in the rotational direction of the rotor 410. Herein, the first narrow facing surface 521a is required to have a facing area capable of obtaining a strong rotational urging force by a magnetic attraction force in the current-stopped state. For example, the first narrow facing surface 521a is formed to have a length corresponding to an angle range in which a central angle is about 10° to 30°. However, the central angle is not limited to this angle range, and can be appropriately selected.

The second narrow facing surface 522a has the form of an arcuate surface so as to chiefly face the second outer circumferential surface 412 of the rotor 410 more narrowly than the second wide facing surface 432a and with a predetermined interval in the rotational direction of the rotor 410. Herein, the second narrow facing surface 522a is required to have a facing area capable of obtaining a strong rotational urging force in the current-stopped state. For example, the second narrow facing surface 522a is formed to have a length corresponding to an angle range in which a central angle is about 50° to 60° in consideration of layout constraints. However, the central angle is not limited to this angle range, and can be appropriately selected.

That is, in this embodiment, the first narrow facing surface 521a is formed on the first magnetic pole part 521 of the lower yoke 520, and the first wide facing surface 431a is formed on the first magnetic pole part 431 of the upper yoke 430. Further, the second narrow facing surface 522a is formed on the second magnetic pole part 522 of the lower yoke 520, and the second wide facing surface 432a is formed on the second magnetic pole part 432 of the upper yoke 430. In the current-stopped state, a static rotational urging force (maintaining force) at the resting position is raised by the action of the attraction force between the auxiliary magnetic pole piece 523 and the output pin 413, by the action of the attraction force between the first narrow facing surface 521a and the first outer circumferential surface 411, and by the action of the attraction force between the second narrow facing surface 522a and the second outer circumferential surface 412. On the other hand, in the current-running state, a strong rotational driving force is obtained by the action of the repulsion force between the auxiliary magnetic pole piece 523 and the output pin 413, by the action of the repulsion force between the first wide facing surface 431a and the first outer circumferential surface 411, and by the action of the repulsion force between the second wide facing surface 432a and the second outer circumferential surface 412.

Figure 20:
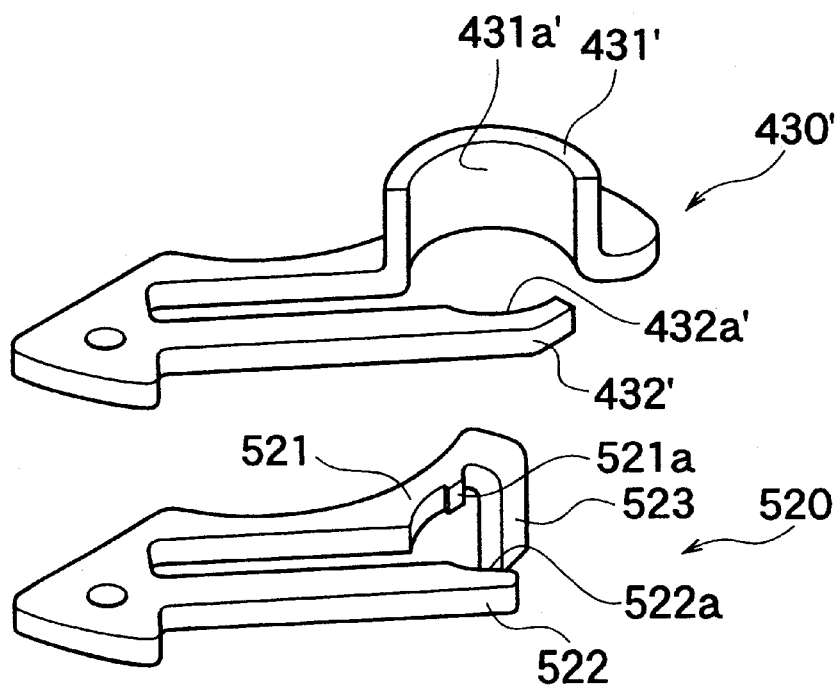
FIG. 20 is a perspective view showing a lower yoke and an upper yoke according to another embodiment of the electromagnetic actuator according to the fourth aspect of the present invention.

FIG. 20 shows another embodiment of the electromagnetic actuator according to the fourth aspect of the present invention, in which the shape of the first wide facing surface 431a of the aforementioned embodiment shown in FIG. 19 is changed. That is, as shown in FIG. 20, an upper yoke 430' is constructed to have a substantially semicylindrical surface such that a first magnetic pole part 431' located at its end is vertically bent and erected in the direction of the rotational shaft of the rotor 410.

Since this substantially semicylindrical surface is used as a first wide facing surface 431a' that faces the first outer circumferential surface 411 of the rotor 410 or that faces other parts, an area that faces the first outer circumferential surface 411 becomes wider proportionately with an extension in the direction of the rotational shaft of the rotor 410 than the first wide facing surface 431a mentioned above, and therefore a rotational force in the current-running state increases proportionately therewith. Accordingly, a stronger rotational force is given to the rotor 410 in the current-running state.

Figure 21A:
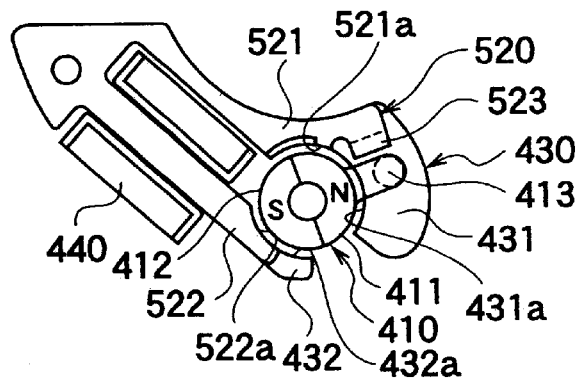
FIGS. 21A through 21E are views for explaining the operation of the electromagnetic actuator shown in FIG. 19.

Next, the operation of the electromagnetic actuator according to the fourth aspect of the present invention will be described with reference to FIGS. 21A through 21E. First, in a current-stopped state in which an electric current is not passed through the coil 440, the rotor 410 is located at the initial position (resting position) where it is in contact with a stopper (not shown) as shown in FIG. 21A. At this time, a magnetic attraction force (maintaining force) that urges the rotor 410 to rotate counterclockwise acts between the first outer circumferential surface 411 of rotor 410 and the first narrow facing surface 521a of the first magnetic pole part 521, between the second outer circumferential surface 412 of the rotor 410 and the second narrow facing surface 522a of the second magnetic pole part 522, and between the auxiliary magnetic pole piece 523 and the output pin 413 of the rotor 410. Further, an attraction force by which the rotor 410 is attracted in the radial direction acts between the first outer circumferential surface 411 of the rotor 410 and the first wide facing surface 431a of the first magnetic pole part 431, and between the second outer circumferential surface 412 of the rotor 410 and the second wide facing surface 432a of the second magnetic pole part 432.

Especially, since the action of the first narrow facing surface 521a and the action of the second narrow facing surface 522a are exerted, the rotor 410 is maintained at the resting position by a stronger magnetic attraction force.

Figure 21B:
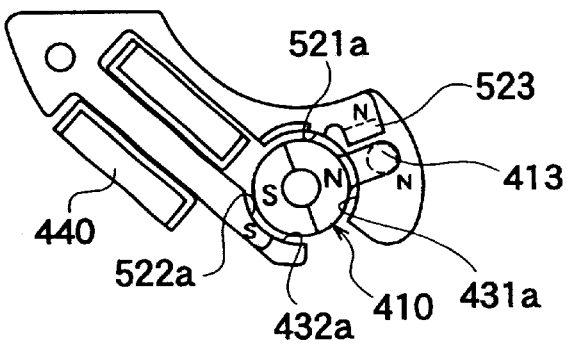

Thereafter, when a predetermined electric current (positive electric current) is passed through the coil 440, the N pole occurs in the first magnetic pole parts 521, 431 (the first narrow facing surface 521a and the first wide facing surface 431a) and in the auxiliary magnetic pole piece 523, and the S pole occurs in the second magnetic pole parts 522, 432 (the second narrow facing surface 522a and the second wide facing surface 432a) as shown in FIG. 21B.

Therefore, a repulsion force is generated between the first wide facing surface 431a and the first outer circumferential surface 411 (N pole) of the rotor 410, and a repulsion force is generated between the second wide facing surface 432a and the second outer circumferential surface 412 (S pole) of the rotor 410. Further, a repulsion force is generated between the auxiliary magnetic pole piece 523 and the output pin 413 of the rotor 410.

Figure 21C:
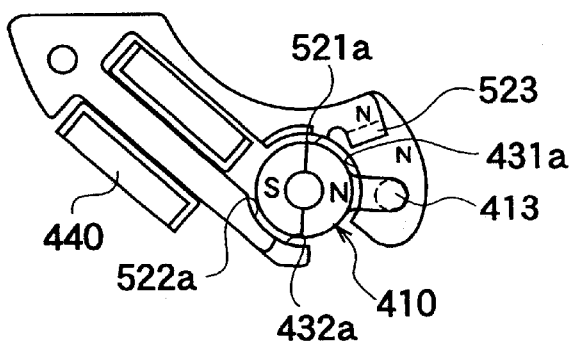

As a result, a strong clockwise rotational driving force is generated, and the rotor 410 swiftly rotates to the maximum rotational position as shown in FIG. 21C, then comes in contact with the stopper (not shown), and is maintained at this position. As long as the current-running state continues, the rotor 410 continues to be maintained at this maximum rotational position.

Figure 21D:
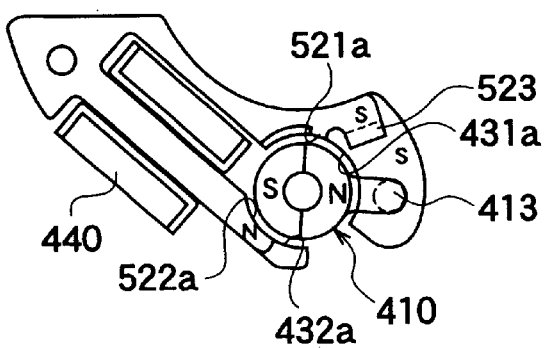

If the current is applied to the coil 440 in an opposite direction here, the S pole occurs in the first magnetic pole parts 521, 431 (the first narrow facing surface 521a and the first wide facing surface 431a) and in the auxiliary magnetic pole piece 523, and the N pole occurs in the second magnetic pole parts 522, 432 (the second narrow facing surface 522a and the second wide facing surface 432a) as shown in FIG. 21D.

Therefore, an attraction force is generated especially between the first wide facing surface 431a and the first outer circumferential surface 411 (N pole) of the rotor 410, and an attraction force is generated between the second wide facing surface 432a and the second outer circumferential surface 412 (S pole) of the rotor 410. Further, an attraction force is generated between the auxiliary magnetic pole piece 523 and the output pin 413 of the rotor 410.

Figure 21E:
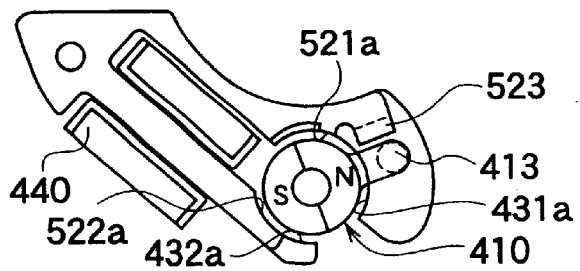

As a result, a strong counterclockwise rotational driving force is generated, and the rotor 410 swiftly rotates and returns to the initial position, then comes in contact with the stopper (not shown), and is positioned there as shown in FIG. 21E. Even if the current application to the coil 440 is stopped, the rotor 410 is maintained at the initial position by the strong attraction force between the auxiliary magnetic pole piece 523 and the output pin 413, between the first narrow facing surface 521a and the first outer circumferential surface 411, and between the second narrow facing surface 522a and the second outer circumferential surface 412.

If the current application to the coil 440 is stopped in the state of the maximum rotational position shown in FIG. 21D, the rotor 410 rotates counterclockwise and returns to the initial position in the same way by the action of an attraction force generated from the relationship between the positions of the first and second magnetic pole parts 521, 431, 522, 432 and the magnetization angle of the rotor 410 and by the action of an attraction force generated from the relationship between the auxiliary magnetic pole piece 523 and the output pin 413.

In this embodiment, the first magnetic pole part 521 of the lower yoke 520 and the first magnetic pole part 431 of the upper yoke 430 are formed as the first narrow facing surface 521a that narrowly faces the first outer circumferential surface 411 of the rotor 410 and as the first wide facing surface 431a that faces the first outer circumferential surface 411 of the rotor 410 over a wide length, whereas the second magnetic pole part 522 of the lower yoke 520 and the second magnetic pole part 432 of the upper yoke 430 are formed as the second narrow facing surface 522a that narrowly faces the second outer circumferential surface 412 of the rotor 410 and as the second wide facing surface 432a that faces the second outer circumferential surface 412 of the rotor 410 over a wide length. Therefore, a strong maintaining force (magnetic rotational urging force) is obtained especially when the current is not passed through the coil 440, and a strong rotational driving force is obtained when the current is passed therethrough.

Further, in this embodiment, the projection (output pin 413) projecting from the rotor 410 and the auxiliary magnetic pole piece 523 facing the projection are provided, and a strong attraction force is generated therebetween as in the aforementioned embodiment. Therefore, this makes it possible to raise the maintaining force at the initial position, and a strong repulsion force generated therebetween makes it possible to rotate it to the maximum rotational position. In other words, a strong rotational driving force can be obtained in the current-running state without raising an actuating voltage when rotated, i.e., without raising power consumption.

Figure 22:
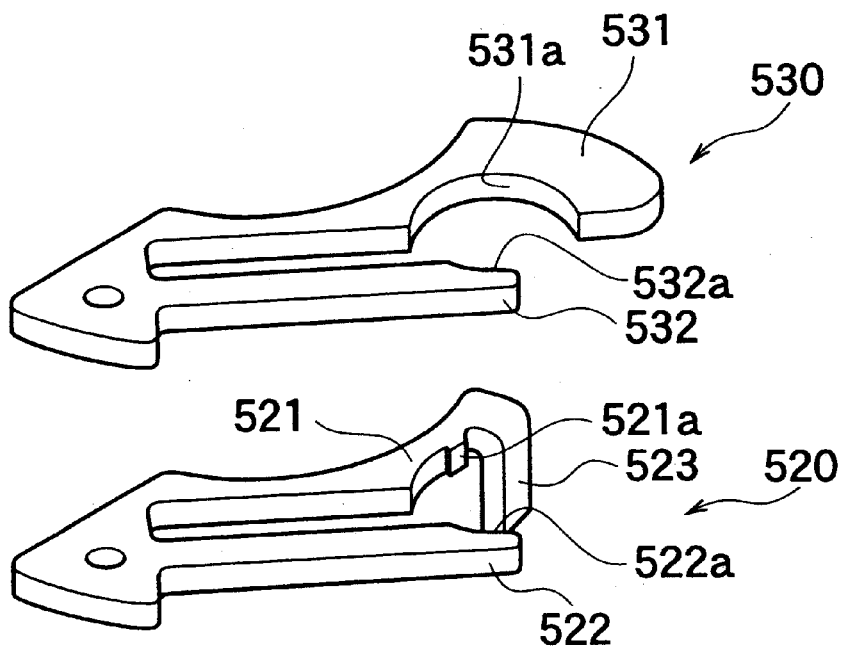
FIG. 22 is a perspective view showing a lower yoke and an upper yoke according to one embodiment of the electromagnetic actuator according to the fifth aspect of the present invention.

FIG. 22 shows an embodiment of the electromagnetic actuator according to a fifth aspect of the present invention. Since only the shape of the upper yoke is changed in this embodiment in comparison with the aforementioned embodiment of the fourth aspect of the present invention (see FIG. 19), the same reference characters are given to the lower yoke 520 and the other components, respectively, that are the same in structure, and a description is omitted. Differences alone will be described.

As shown in FIG. 22, the upper yoke 530 is planar, and a first wide facing surface 531a is formed on the first magnetic pole part 531 located at its end, and a second narrow facing surface 532a is formed on the second magnetic pole part 532 located at the opposite end.

The first wide facing surface 531a has the form of an arcuate surface so as to chiefly face the first outer circumferential surface 411 of the rotor 410 over a length wider than a predetermined length and with a predetermined interval therebetween in the rotational direction of the rotor 410. Herein, the first wide facing surface 531a is required to have a facing area capable of obtaining a strong rotational force in the current-running state. For example, the first wide facing surface 531a is formed to have a length corresponding to an angle range in which a central angle is about 180° or in which a central angle is 170° to 180° slightly smaller than 180°. However, the central angle is not limited to this angle range, and can be appropriately selected.

The second narrow facing surface 532a has the form of an arcuate surface so as to chiefly face the second outer circumferential surface 412 of the rotor 410 over a narrow length less than a predetermined length and with a predetermined interval therebetween in the rotational direction of the rotor 410. Herein, the second narrow facing surface 532a having a narrow length less than the predetermined length is required to have a facing area capable of obtaining a strong rotational urging force in the current-stopped state. For example, the second narrow facing surface 532a is formed to have a length corresponding to an angle range in which a central angle is about 50° to 60° in consideration of layout constraints. However, the central angle is not limited to this angle range, and can be appropriately selected.

That is, in this embodiment, the first narrow facing surface 521a is formed on the first magnetic pole part 521 of the lower yoke 520, and the first wide facing surface 531a is formed on the first magnetic pole part 531 of the upper yoke 530. Further, the second narrow facing surface 522a is formed on the second magnetic pole part 522 of the lower yoke 520, and the second narrow facing surface 532a is formed on the second magnetic pole part 532 of the upper yoke 530.

In the current-stopped state, a static rotational urging force (maintaining force) at the resting position is raised by the action of the attraction force between the auxiliary magnetic pole piece 523 and the output pin 413, by the action of the attraction force between the first narrow facing surface 521a and the first outer circumferential surface 411, by the action of the attraction force between the second narrow facing surface 522a and the second outer circumferential surface 412, and by the action of the attraction force between the second narrow facing surface 532a and the second outer circumferential surface 412. On the other hand, in the current-running state, a strong rotational driving force is obtained by the action of the repulsion force between the auxiliary magnetic pole piece 523 and the output pin 413, and by the action of the repulsion force between the first wide facing surface 531a and the first outer circumferential surface 411.

Figure 23:
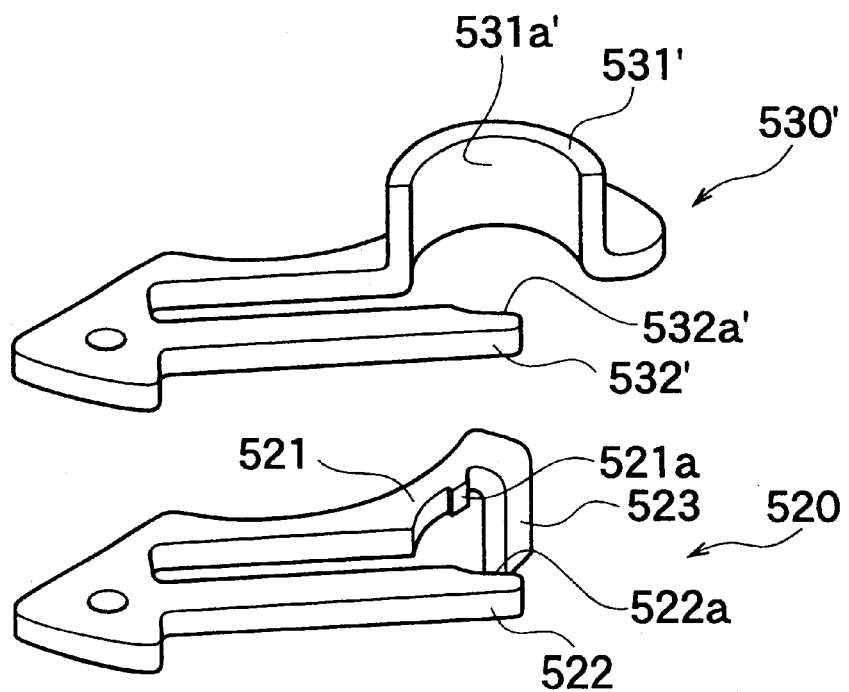
FIG. 23 is a perspective view showing a lower yoke and an upper yoke according to another embodiment of the electromagnetic actuator according to the fifth aspect of the present invention.

FIG. 23 shows another embodiment of the electromagnetic actuator according to the fifth aspect of the present invention, in which the shape of the first wide facing surface 531a of the aforementioned embodiment shown in FIG. 22 is changed. That is, as shown in FIG. 23, an upper yoke 530' is constructed to have a substantially semicylindrical surface such that a first magnetic pole part 531' located at its end is vertically bent and erected in the direction of the rotational shaft of the rotor 410.

Since this substantially semicylindrical surface is used as a first wide facing surface 531a' that faces the first outer circumferential surface 411 of the rotor 410 or that faces other parts, an area that faces the first outer circumferential surface 411 becomes wider proportionately with an extension in the direction of the rotational shaft of the rotor 410 than the first wide facing surface 531a mentioned above, and therefore a rotational force in the current-running state increases proportionately therewith. Accordingly, a stronger rotational force is given to the rotor 410 in the current-running state.

Figure 24A:
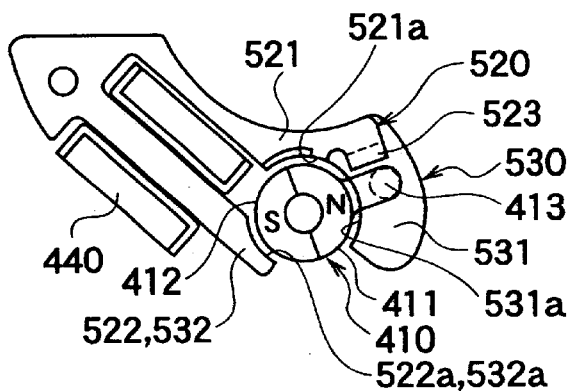
FIGS. 24A through 24E are views for explaining the operation of the electromagnetic actuator shown in FIG. 22.

Next, the operation of the electromagnetic actuator according to the fifth aspect of the present invention will be described with reference to FIGS. 24A through 24E. First, in a current-stopped state in which an electric current is not passed through the coil 440, the rotor 410 is located at the initial position (resting position) where it is in contact with a stopper (not shown) as shown in FIG. 24A. At this time, a magnetic urging force (attraction force) that urges the rotor 410 to rotate counterclockwise acts between the first outer circumferential surface 411 of rotor 410 and the first narrow facing surface 521a of the first magnetic pole part 521, between the second outer circumferential surface 412 of the rotor 410 and the second narrow facing surfaces 522a, 532a of the second magnetic pole parts 522, 532, and between the auxiliary magnetic pole piece 523 and the output pin 413 of the rotor 410. Further, an attraction force by which the rotor 410 is attracted in the radial direction acts between the first outer circumferential surface 411 of the rotor 410 and the first wide facing surface 531a of the first magnetic pole part 531.

Especially, since the action of the second narrow facing surface 532a in addition to the action of the first and second narrow facing surfaces 521a, 522a is exerted, the rotor 410 is maintained at the resting position by a stronger magnetic attraction force.

Figure 24B:
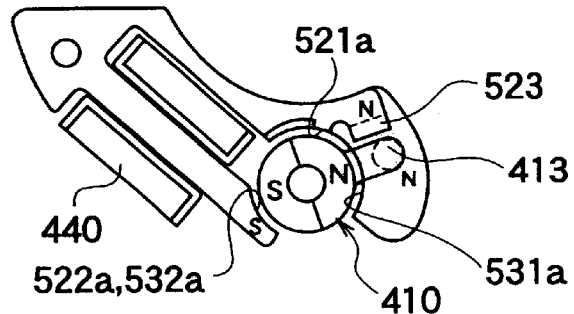

Thereafter, when a predetermined electric current (positive electric current) is passed through the coil 440, the N pole occurs in the first magnetic pole parts 521, 531 (the first narrow facing surface 521a and the first wide facing surface 531a) and in the auxiliary magnetic pole piece 523, and the S pole occurs in the second magnetic pole parts 522, 532 (the second narrow facing surface 522a and the second narrow facing surface 532a) as shown in FIG. 24B.

Therefore, a repulsion force is generated especially between the first wide facing surface 531a and the first outer circumferential surface 411 (N pole) of the rotor 410, and a repulsion force is generated between the auxiliary magnetic pole piece 523 and the output pin 413 of the rotor 410.

Figure 24C:
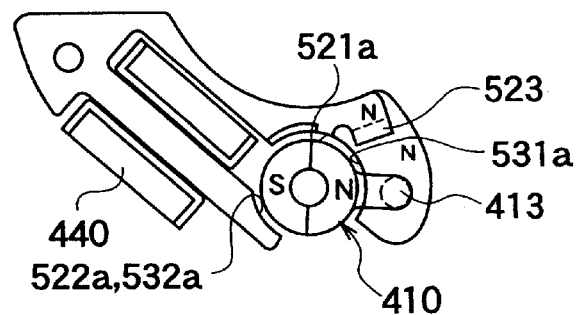

As a result, a clockwise rotational driving force is generated, and the rotor 410 swiftly rotates to the maximum rotational position as shown in FIG. 24C, then comes in contact with the stopper (not shown), and is maintained at this position. As long as the current-running state continues, the rotor 410 continues to be maintained at this maximum rotational position.

Figure 24D:
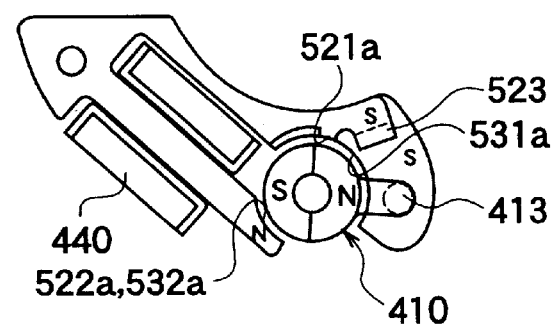

If the current is applied to the coil 440 in an opposite direction here, the S pole occurs in the first magnetic pole parts 521, 531 (the first narrow facing surface 521a and the first wide facing surface 531a) and in the auxiliary magnetic pole piece 523, and the N pole occurs in the second magnetic pole parts 522, 532 (the second narrow facing surface 522a and the second narrow facing surface 532a) as shown in FIG. 24D.

Therefore, an attraction force is generated especially between the first wide facing surface 531a and the first outer circumferential surface 411 (N pole) of the rotor 410, and an attraction force is generated between the auxiliary magnetic pole piece 523 and the output pin 413 of the rotor 410.

Figure 24E:
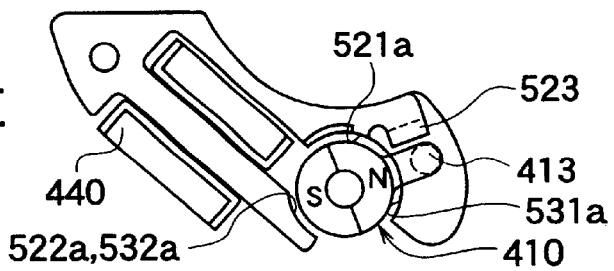

As a result, a counterclockwise rotational driving force is generated, and the rotor 410 swiftly rotates and returns to the initial position, then comes in contact with the stopper (not shown), and is positioned there as shown in FIG. 24E. Even if the current application to the coil 440 is stopped, the rotor 410 is maintained at the initial position by the strong attraction force between the auxiliary magnetic pole piece 523 and the output pin 413, by the strong attraction force between the first narrow facing surface 521a and the first outer circumferential surface 411, and by the strong attraction force between the second narrow facing surfaces 522a, 532a and the second outer circumferential surface 412.

If the current application to the coil 440 is stopped in the state of the maximum rotational position shown in FIG. 24D, the rotor 410 rotates counterclockwise and returns to the initial position in the same way by the action of an attraction force generated from the relationship between the positions of the first and second magnetic pole parts 521, 531, 522, 532 and the magnetization angle of the rotor 410 and by the action of an attraction force generated from the relationship between the auxiliary magnetic pole piece 523 and the output pin 413.

In this embodiment, the first magnetic pole part 521 of the lower yoke 520 and the first magnetic pole part 531 of the upper yoke 530 are formed as the first narrow facing surface 521a that narrowly faces the first outer circumferential surface 411 of the rotor 410 and as the first wide facing surface 531a that faces the first outer circumferential surface 411 of the rotor 410 over a wide length, whereas the second magnetic pole part 522 of the lower yoke 520 and the second magnetic pole part 532 of the upper yoke 530 are formed as the second narrow facing surface 522a that narrowly faces the second outer circumferential surface 412 of the rotor 410 and as the second narrow facing surface 532a that narrowly faces the second outer circumferential surface 412 of the rotor 410. Therefore, a strong maintaining force (magnetic rotational urging force) is obtained especially when the current is not passed through the coil 440.

Further, in this embodiment, the projection (output pin 413) projecting from the rotor 410 and the auxiliary magnetic pole piece 523 facing the projection are provided, and a strong attraction force is generated therebetween as in the aforementioned embodiment. Therefore, this makes it possible to raise the maintaining force at the initial position, and a strong repulsion force generated therebetween makes it possible to rotate it to the maximum rotational position. In other words, a strong rotational driving force can be obtained in the current-running state without raising an actuating voltage when rotated, i.e., without raising power consumption.

FIG. 25 shows an embodiment of the electromagnetic actuator according to a sixth aspect of the present invention. Since the shape of the lower yoke and the shape of the upper yoke are changed in this embodiment in comparison with the aforementioned embodiment of the present invention, the same reference characters are given to the rotor 410 and the other components, respectively, that are the same in structure, and a description is omitted. Differences alone will be described.

As shown in FIG. 25, the upper yoke 550 is planar, and a first wide facing surface 551a and a first narrow facing surface 551b are formed on the first magnetic pole part 551 located at its end, and a second wide facing surface 552a and a third narrow facing surface 552b are formed on the second magnetic pole part 552 located at the opposite end.

The first wide facing surface 551a is an arcuate surface so as to chiefly face the first outer circumferential surface 411 of the rotor 410 over a length wider than a predetermined length and with a predetermined interval therebetween in the rotational direction of the rotor 410. Herein, the first wide facing surface 551a having the length wider than the predetermined length is required to have a facing area capable of obtaining a strong rotational force in the current-running state and capable of obtaining a rotational urging force by a magnetic attraction force in the current-stopped state. For example, it has a length corresponding to an angle range in which a central angle is about 60° to 80°, preferably about 70°. However, the central angle is not limited to this angle range, and can be appropriately selected.

The first narrow facing surface 551b is disposed in close vicinity to the first wide facing surface 551a with a slight magnetic gap in the rotational direction of the rotor 410, and assumes the form of an arcuate surface so as to chiefly face the first outer circumferential surface 411 of the rotor 410 more narrowly than the first wide facing surface 551a and with a predetermined interval therebetween. Herein, the first narrow facing surface 551b is required to have a facing area capable of obtaining a rotational urging force by which the rotor 410 is rotated counterclockwise when the rotor 410 is located at the maximum rotational position. For example, it has a length corresponding to an angle range in which a central angle is about 20° to 30°, preferably about 25°. However, the central angle is not limited to this angle range, and can be appropriately selected.

The first wide facing surface 551a and the first narrow facing surface 551b are separated from each other such that an angle of 50° to 60°, preferably about 55°, is formed between the respective centers in the rotational direction of the rotor 410.

The second wide facing surface 552a assumes the form of an arcuate surface so as to chiefly face the second outer circumferential surface 412 of the rotor 410 over a length wider than a predetermined length and with a predetermined interval therebetween in the rotational direction of the rotor 410. Like the first wide facing surface 551a, the second wide facing surface 552a having the length wider than the predetermined length is required to have a facing area capable of obtaining a strong rotational force in the current-running state and capable of obtaining a rotational urging force by a magnetic attraction force in the current-stopped state. For example, it has a length corresponding to an angle range in which a central angle is about 60° to 80°, preferably about 70°. The second wide facing surface 552a is disposed to face the first wide facing surface 551a with the rotor 410 therebetween.

The third narrow facing surface 552b is disposed in close vicinity to the second wide facing surface 552a with a slight magnetic gap in the rotational direction of the rotor 410, and assumes the form of an arcuate surface so as to chiefly face the second outer circumferential surface 412 of the rotor 410 more narrowly than the second wide facing surface 552a and with a predetermined interval therebetween. Herein, the third narrow facing surface 552b is required to have a facing area capable of obtaining a rotational urging force by which the rotor 410 is rotated counterclockwise when the rotor 410 is located at the maximum rotational position. For example, like the first narrow facing surface 551b, it has a length corresponding to an angle range in which a central angle is about 20° to 30°, preferably about 25°.

The second wide facing surface 552a and the third narrow facing surface 552b are separated from each other such that an angle of 50° to 60°, preferably about 55°, is formed between the respective centers in the rotational direction of the rotor 410.

As shown in FIG. 25, the lower yoke 540 is planar, and is provided with an auxiliary magnetic pole piece 543 vertically bent in the vicinity of the first magnetic pole part 541 located at its end. The auxiliary magnetic pole piece 543 is constructed to exert the same action as the aforementioned auxiliary magnetic pole pieces 423, 523 on the output pin 413 of the rotor 410.

In the lower yoke 540, a second narrow facing surface 541a is formed on the first magnetic pole part 541 located at its end, and a second wide facing surface 542a and a third narrow facing surface 542b are formed on the second magnetic pole part 542 located at the opposite end.

The second narrow facing surface 541a assumes the form of an arcuate surface so as to chiefly face the first outer circumferential surface 411 of the rotor 410 more narrowly than the first wide facing surface 551a of the upper yoke 550 and with a predetermined interval therebetween. Herein, the second narrow facing surface 541a is required to have a facing area capable of obtaining a strong rotational urging force by a magnetic attraction force in the current-stopped state when the rotor 410 is located at the initial position. For example, it has a length corresponding to an angle range in which a central angle is about 10° to 30°. However, the central angle is not limited to this angle range, and can be appropriately selected.

The second wide facing surface 542a assumes the form of an arcuate surface so as to chiefly face the second outer circumferential surface 412 of the rotor 410 over a length wider than a predetermined length and with a predetermined interval therebetween in the rotational direction of the rotor 410. Like the second wide facing surface 552a, the second wide facing surface 542a having the length wider than the predetermined length is required to have a facing area capable of obtaining a strong rotational force in the current-running state and capable of obtaining a rotational urging force by a magnetic attraction force in the current-stopped state. For example, it has a length corresponding to an angle range in which a central angle is about 60° to 80°, preferably about 70°. The second wide facing surface 542a is disposed to face the second narrow facing surface 541a with the rotor 410 therebetween. Further, the second wide facing surface 542a is disposed with the same length and at the same angular position as the second wide facing surface 552a of the upper yoke 550 in the rotational direction of the rotor 410.

The third narrow facing surface 542b is disposed in close vicinity to the second wide facing surface 542a with a slight magnetic gap in the rotational direction of the rotor 410, and assumes the form of an arcuate surface so as to chiefly face the second outer circumferential surface 412 of the rotor 410 more narrowly than the second wide facing surface 542a and with a predetermined interval therebetween. Herein, the third narrow facing surface 542b is required to have a facing area capable of obtaining a rotational urging force by which the rotor 410 is rotated counterclockwise when the rotor 410 is located at the maximum rotational position. For example, like the first narrow facing surface 551b and the third narrow facing surface 552b of the upper yoke 550, it has a length corresponding to an angle range in which a central angle is about 20° to 30°, preferably about 25°. Further, the third narrow facing surface 542b is disposed with the same length and at the same angular position as the third narrow facing surface 552b of the upper yoke 550 in the rotational direction of the rotor 410. Further, the second wide facing surface 542a and the third narrow facing surface 542b are separated from each other such that an angle of 50° to 60°, preferably about 55°, is formed between the respective centers in the rotational direction of the rotor 410.

That is, in this embodiment, the second narrow facing surface 541a is formed on the first magnetic pole part 541 of the lower yoke 540, and the first wide facing surface 551a and the first narrow facing surface 551b are formed on the first magnetic pole part 551 of the upper yoke 550. Further, the second wide facing surface 542a and the third narrow facing surface 542b are formed on the second magnetic pole part 542 of the lower yoke 540, and the second wide facing surface 552a and the third narrow facing surface 552b are formed on the second magnetic pole part 552 of the upper yoke 550.

Accordingly, in the current-stopped state, a static rotational urging force (maintaining force) at the resting position is raised by the action of the attraction force between the auxiliary magnetic pole piece 543 and the output pin 413, by the action of the attraction force between the second narrow facing surface 541a and the first outer circumferential surface 411, by the action of the attraction force between the first wide facing surface 542a and the first outer circumferential surface 411, and by the action of the attraction force between the second wide facing surfaces 542a, 552a and the second outer circumferential surface 412. On the other hand, in the current-running state, a dynamic rotational driving force is raised by the repulsion force between the auxiliary magnetic pole piece 543 and the output pin 413, by the repulsion force between the first wide facing surface 551a and the first outer circumferential surface 411, by the repulsion force between the second wide facing surfaces 542a, 552a and the second outer circumferential surface 412, and so on. Further, when the rotor 410 is located at the maximum rotational position, a rotational urging force (returning force) to the resting position is raised by the attraction force between the first narrow facing surface 551b and the first outer circumferential surface 411, and by the attraction force between the third narrow facing surfaces 542b, 552b and the second outer circumferential surface 412.

Figure 26A:
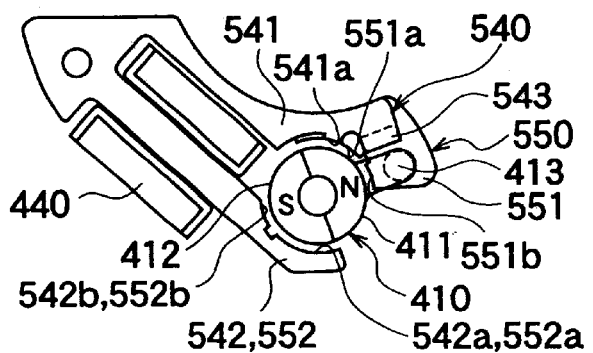
FIGS. 26A through 26E are views for explaining the operation of the electromagnetic actuator shown in FIG. 25.

Next, the operation of the electromagnetic actuator according to the sixth aspect of the present invention will be described with reference to FIGS. 26A through 26E. First, in a current-stopped state in which an electric current is not passed through the coil 440, the rotor 410 is located at the initial position (resting position) where it is in contact with a stopper (not shown) as shown in FIG. 26A. At this time, a magnetic attraction force (maintaining force) that urges the rotor 410 to rotate counterclockwise acts between the first outer circumferential surface 411 of the rotor 410 and the second narrow facing surface 541a and the first wide facing surface 551a of the first magnetic pole parts 541, 551, between the second outer circumferential surface 412 of the rotor 410 and the second wide facing surfaces 542a, 552a of the second magnetic pole parts 542, 552, and between the auxiliary magnetic pole piece 543 and the output pin 413 of the rotor 410, so that the rotor 410 is maintained at the resting position by a strong magnetic attraction force. At this time, the first narrow facing surface 551b and the third narrow facing surfaces 542b, 552b hardly contribute to the rotational urging force (maintaining force) of the rotor 410.

Figure 26B:
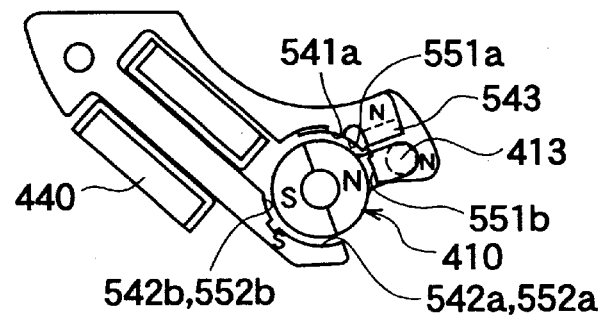

Thereafter, when a predetermined electric current (positive electric current) is passed through the coil 440, the N pole occurs in the first magnetic pole parts 541, 551 (the second narrow facing surface 541a, the first wide facing surface 551a, the first narrow facing surface 551b) and in the auxiliary magnetic pole piece 543, and the S pole occurs in the second magnetic pole parts 542, 552 (the second wide facing surfaces 542a, 552a, the third narrow facing surfaces 542b, 552b) as shown in FIG. 26B.

Therefore, a strong repulsion force is generated especially between the first wide facing surface 551a and the first outer circumferential surface 411 (N pole) of the rotor 410, and between the third narrow facing surfaces 542b, 552b and the second outer circumferential surface 412 (S pole) of the rotor 410. Further, a strong repulsion force is generated between the auxiliary magnetic pole piece 543 and the output pin 413 of the rotor 410.

Figure 26C:
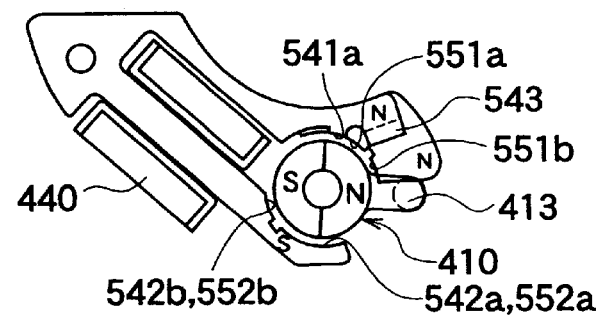

As a result, a strong clockwise rotational driving force is generated, and the rotor 410 swiftly rotates to the maximum rotational position as shown in FIG. 26C, then comes in contact with the stopper (not shown), and is maintained at this position. As long as the current-running state continues, the rotor 410 continues to be maintained at this maximum rotational position.

Figure 26D:
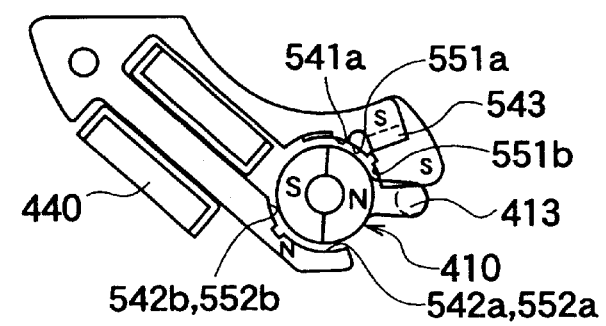

If the current is applied to the coil 440 in an opposite direction here, the S pole occurs in the first magnetic pole parts 541, 551 (the second narrow facing surface 541a, the first wide facing surface 551a, the first narrow facing surface 551b) and in the auxiliary magnetic pole piece 543, and the N pole occurs in the second magnetic pole parts 542, 552 (the second wide facing surfaces 542a, 552a, the third narrow facing surfaces 542b, 552b) as shown in FIG. 26D.

Therefore, a strong attraction force is generated especially between the first narrow facing surface 551b and the first outer circumferential surface 411 (N pole) of the rotor 410, and between the third narrow facing surfaces 542b, 552b and the second outer circumferential surface 412 (S pole) of the rotor 410. Further, an attraction force is generated between the first wide facing surface 551a and the first outer circumferential surface 411, between the second wide facing surfaces 542a, 552a and the second outer circumferential surface 412, and between the auxiliary magnetic pole piece 543 and the output pin 413 of the rotor 410.

Further, at the maximum rotational position, the center part of the first wide facing surface 551a slightly deviates to the first outer circumferential surface 411 from the boundary plane between the first outer circumferential surface 411 and the second outer circumferential surface 412, and the center parts of the second wide facing surfaces 542a, 552a slightly deviate to the second outer circumferential surface 412 from the boundary plane therebetween. Therefore, an attraction force is generated between the first wide facing surface 551a and the first outer circumferential surface 411 and between the second wide facing surfaces 542a, 552a and the second outer circumferential surface 412.

Figure 26E:
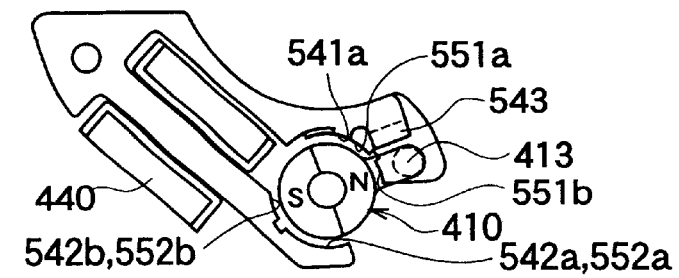

As a result, a strong counterclockwise rotational driving force is generated, and the rotor 410 swiftly rotates and returns to the initial position, then comes in contact with the stopper (not shown), and is positioned there as shown in FIG. 26E. Even if the current application to the coil 440 is stopped, the rotor 410 is maintained at the initial position by the strong attraction force between the auxiliary magnetic pole piece 543 and the output pin 413, between the second narrow facing surface 541a and the first wide facing surface 551a and the first outer circumferential surface 411, and between the second wide facing surfaces 542a, 552a and the second outer circumferential surface 412.

If the current application to the coil 440 is stopped in the state of the maximum rotational position shown in FIG. 26D, the rotor 410 rotates counterclockwise and returns to the initial position in the same way by the action of an attraction force generated from the relationship between the positions of the first and second magnetic pole parts 541, 551, 542, 552 and the magnetization angle of the rotor 410, i.e., by the action of an attraction force generated between the auxiliary magnetic pole piece 543 and the output pin 413, between the first narrow facing surface 551a and the first outer circumferential surface 411, and between the third narrow facing surfaces 542b, 552b and the second outer circumferential surface 412.

In this embodiment, the first magnetic pole part 541 of the lower yoke 540 and the first magnetic pole part 551 of the upper yoke 550 are formed as the second narrow facing surface 541a that narrowly faces the first circumferential surface 411 of the rotor 410, as the first wide facing surface 551a that widely faces it, and as the first narrow facing surface 551b that narrowly faces it, whereas the second magnetic pole part 542 of the lower yoke 540 and the second magnetic pole part 552 of the upper yoke 550 are formed as the second wide facing surfaces 542a, 552a that widely face the second outer circumferential surface 412 of the rotor 410, and as the third narrow facing surfaces 542b, 552b that narrowly face it. Therefore, a strong maintaining force (magnetic rotational urging force) is obtained at the resting position especially when the current is not passed through the coil 440, and a strong rotational driving force is obtained when the current is passed therethrough. Further, at the maximum rotational position, a strong rotational urging force is obtained toward the resting position.

Further, in this embodiment, the projection (output pin 413) projecting from the rotor 410 and the auxiliary magnetic pole piece 543 facing the projection are provided, and a strong attraction force is generated therebetween as in the aforementioned embodiment. Therefore, this makes it possible to raise the maintaining force at the initial position, and a strong repulsion force generated therebetween makes it possible to rotate it to the maximum rotational position. In other words, a strong rotational driving force can be obtained in the current-running state without raising an actuating voltage when rotated, i.e., without raising power consumption.

Figure 27A:
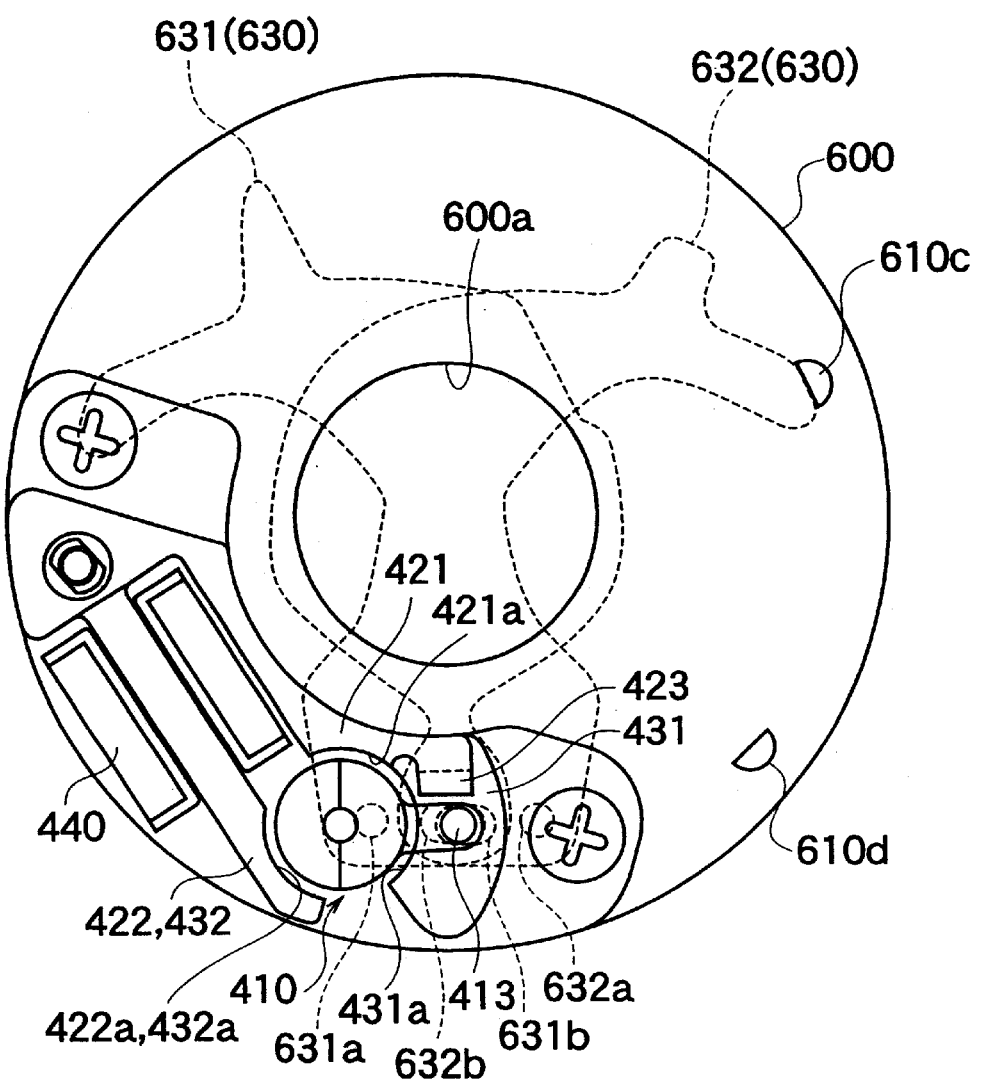
FIGS. 27A and 27B show one embodiment of a camera shutter unit according to the present invention.
Figure 27B:
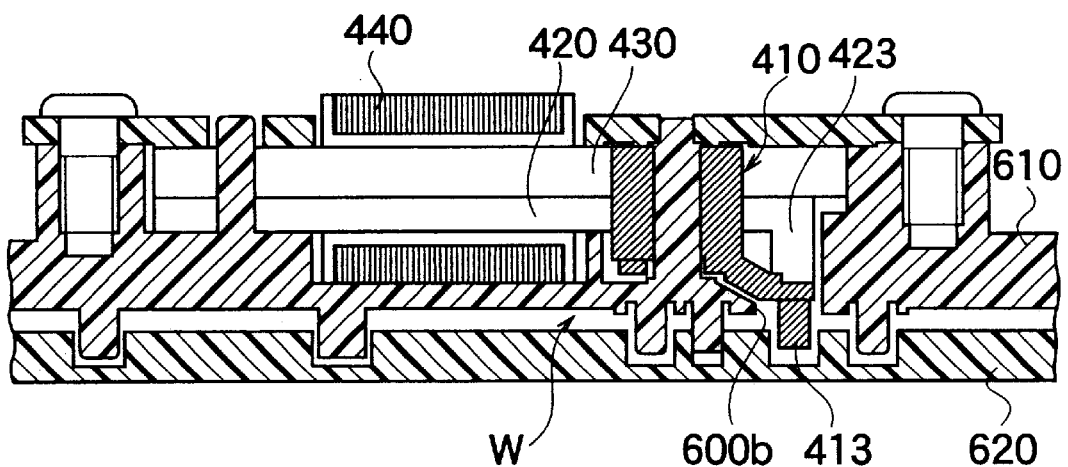

FIGS. 27A and 27B show an embodiment of a camera shutter unit according to the present invention. The shutter unit according to this embodiment is made up of, as shown in FIGS. 27A and 27B, a base plate 600 (front base plate 610 and rear base plate 620) that defines an opening 600a for exposure, a shutter blade 630 disposed to freely reciprocate between an open position where the opening 600a is opened and a closed position where the opening 600a is closed, a driving source connected to the shutter blade 630 for exerting a driving force on the shutter blade 630 to be reciprocated, and so forth. In this embodiment, the electromagnetic actuator shown in FIGS. 15, 16, and 18A through 18E is employed as the driving source.

In detail, the rotor 410 is supported by the front base plate 610 so as to be freely rotated, and the output pin 413 thereof extends to a blade chamber W formed between the front base plate 610 and the rear base plate 620 through a notch hole 600b. Further, the lower yoke 420, which forms the first magnetic pole part 421 (first wide facing surface 421a), the auxiliary magnetic pole piece 423, and the second magnetic pole part 422 (second wide facing surface 422a), the upper yoke 430, which forms the first magnetic pole part 431 (first wide facing surface 431a) and the second magnetic pole part 432 (second wide facing surface 432a), the coil 440, etc., are disposed and fixed to the front base plate 610.

The shutter blade 630 consists of two shutter blades, i.e., a first shutter blade 631 and a second shutter blade 632, and is supported by the front base plate 610 so as to be freely rotated around supporting shafts 631a and 632a, respectively. Further, the output pin 413 of the rotor 410 is connected to long holes 631b and 632b thereof so as to transmit a rotational driving force to the shutter blade 630. Further, stoppers 610c and 610d are disposed on the front base plate 610. The operation of the shutter is well known, and the operation of the electromagnetic actuator is performed in the same way as mentioned above, and therefore a description is omitted here.

According to this embodiment, a strong rotational driving force is obtained with low power consumption, and the shutter blade 630 is swiftly rotated and driven in a current-running state, whereas the shutter blade 630 is infallibly maintained at a predetermined resting position (initial position) in a current-stopped state.

Figure 28A:
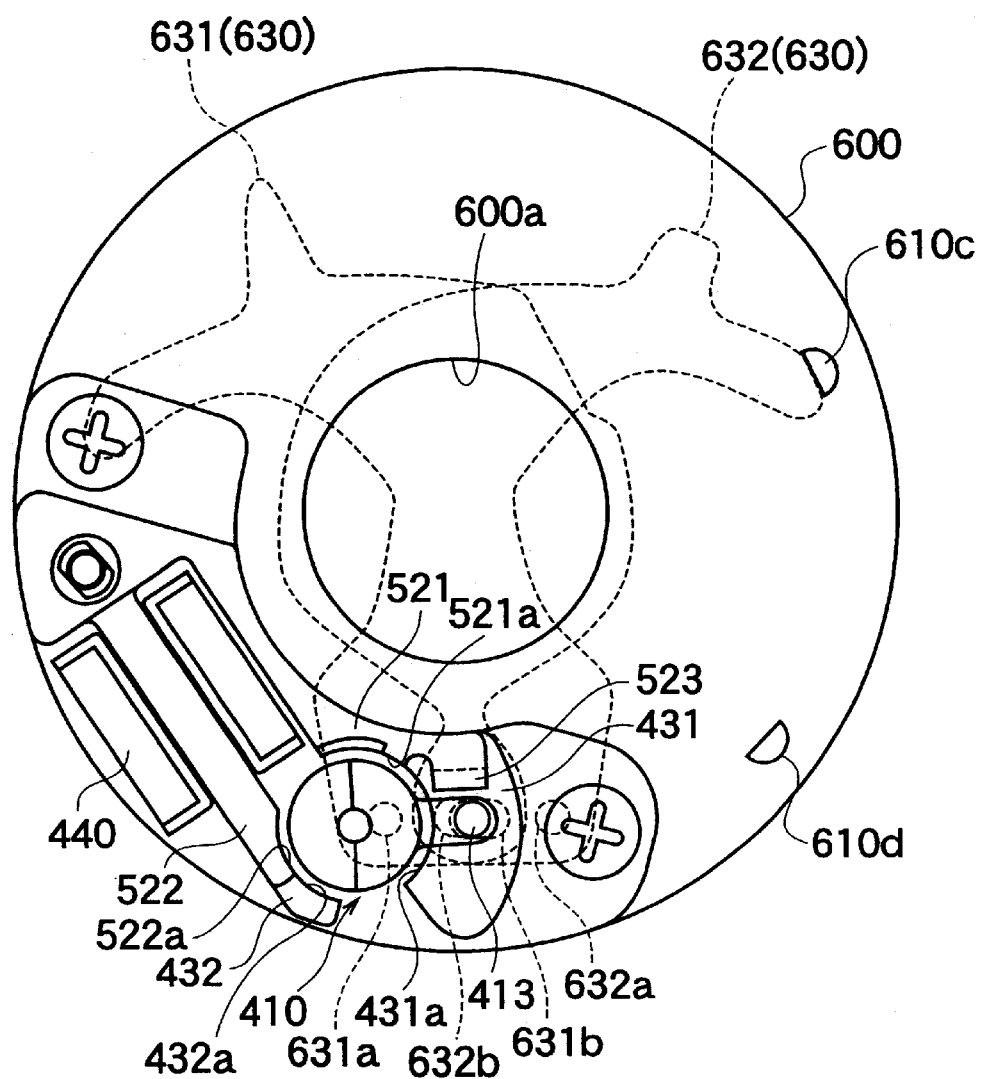
FIGS. 28A and 28B show another embodiment of the camera shutter unit according to the present invention.
Figure 28B:
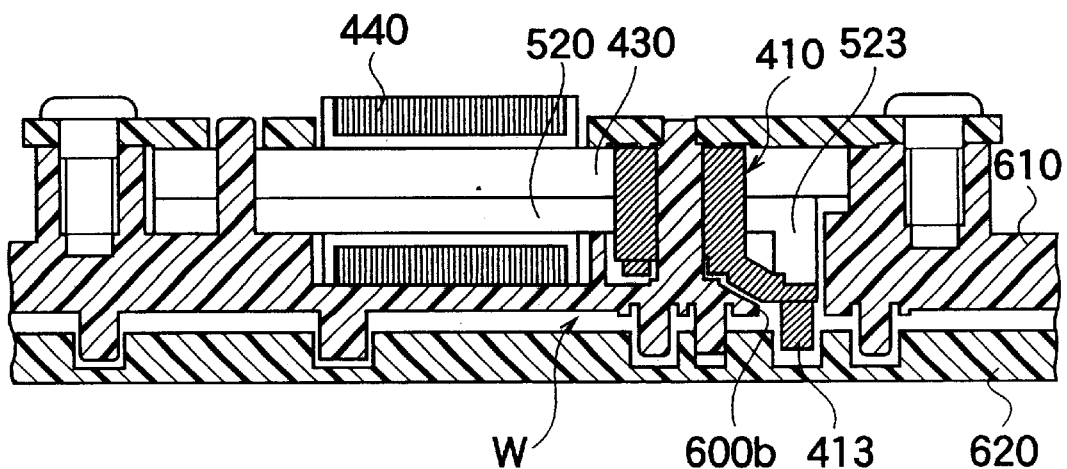

FIGS. 28A and 28B show another embodiment of the camera shutter unit according to the present invention. The camera shutter unit according to this embodiment is made up of, as shown in FIGS. 28A and 28B, the base plate 600 (front base plate 610 and rear base plate 620), the shutter blade 630, etc., as in the aforementioned embodiment. The electromagnetic actuator shown in FIGS. 19 and 21A through 21E is employed as the driving source.

In detail, the rotor 410 is supported by the front base plate 610 so as to be freely rotated, and the output pin 413 thereof extends to the blade chamber W formed between the front base plate 610 and the rear base plate 620 through the notch hole 600b. Further, the lower yoke 520, which forms the first magnetic pole part 521 (first narrow facing surface 521a), the auxiliary magnetic pole piece 523, and the second magnetic pole part 522 (second narrow facing surface 522a), the upper yoke 430, which forms the first magnetic pole part 431 (first wide facing surface 431a) and the second magnetic pole part 432 (second wide facing surface 432a), the coil 440, etc., are disposed and fixed to the front base plate 610.

The operation of the shutter is well known, and the operation of the electromagnetic actuator is performed in the same way as mentioned above, and therefore a description is omitted here.

According to this embodiment, a strong rotational driving force is obtained with low power consumption, and the shutter blade 630 is swiftly rotated and driven in a current-running state, whereas the shutter blade 630 is maintained at a predetermined resting position (initial position) by a stronger maintaining force in a current-stopped state.

Figure 29A:
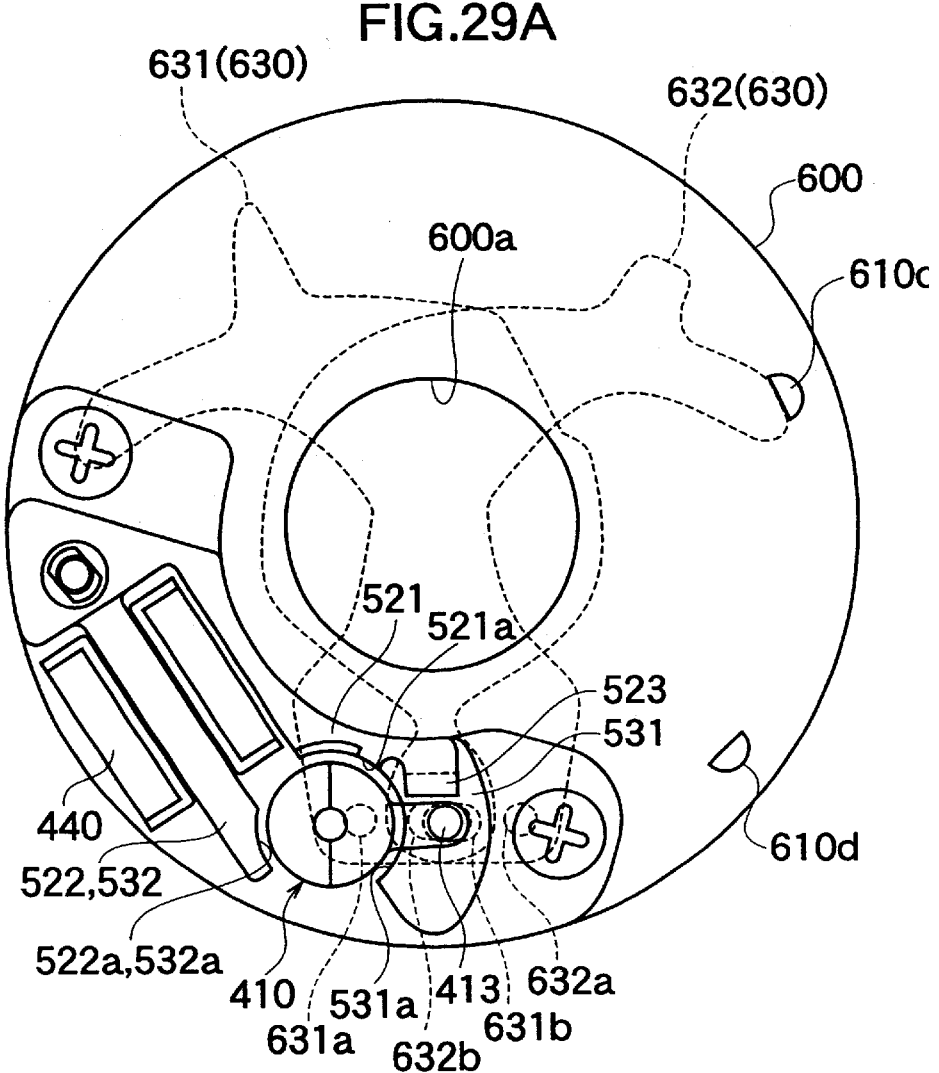
FIGS. 29A and 29B show still another embodiment of the camera shutter unit according to the present invention.
Figure 29B:
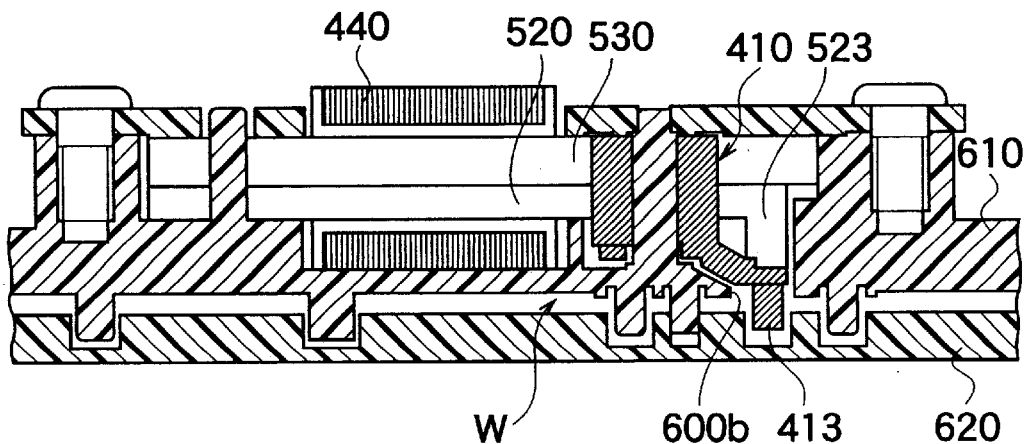

FIGS. 29A and 29B show still another embodiment of the camera shutter unit according to the present invention. The camera shutter unit according to this embodiment is made up of, as shown in FIGS. 29A and 29B, the base plate 600 (front base plate 610 and rear base plate 620), the shutter blade 630, etc., as in the aforementioned embodiment. The electromagnetic actuator shown in FIGS. 22 and 24A through 24E is employed as the driving source.

In detail, the rotor 410 is supported by the front base plate 610 so as to be freely rotated, and the output pin 413 thereof extends to the blade chamber W formed between the front base plate 610 and the rear base plate 620 through the notch hole 600b. Further, the lower yoke 520, which forms the first magnetic pole part 521 (first narrow facing surface 521a), the auxiliary magnetic pole piece 523, and the second magnetic pole part 522 (second narrow facing surface 522a), the upper yoke 530, which forms the first magnetic pole part 531 (first wide facing surface 531a) and the second magnetic pole part 532 (second narrow facing surface 532a), the coil 440, etc., are disposed and fixed to the front base plate 610.

The operation of the shutter is well known, and the operation of the electromagnetic actuator is performed in the same way as mentioned above, and therefore a description is omitted here.

According to this embodiment, the shutter blade 630 is driven by a rotational driving force through low power consumption in a current-running state, and the shutter blade 630 is infallibly maintained at a predetermined resting position (initial position) by a strong maintaining force especially in a current-stopped state.

Figure 30A:
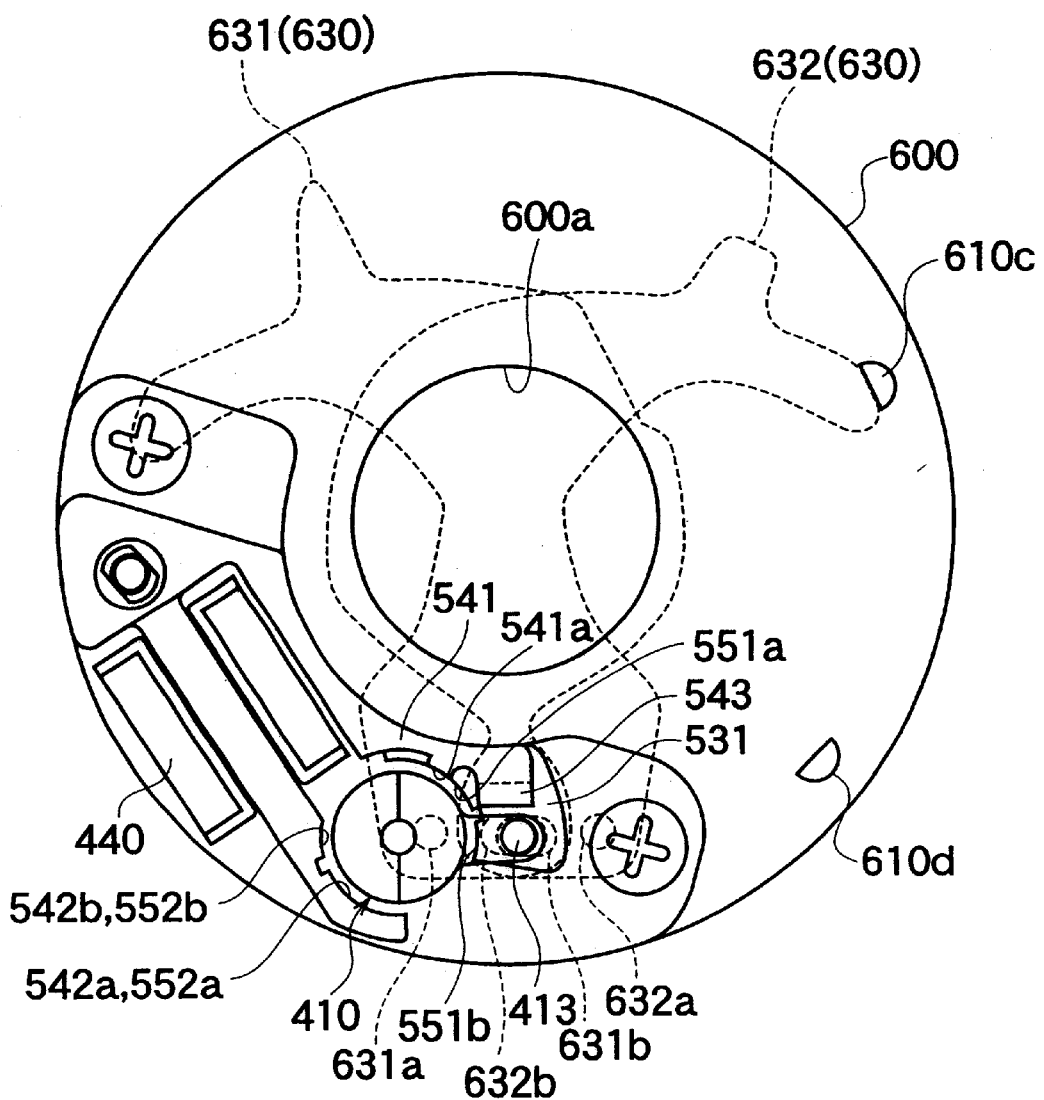
FIGS. 30A and 30B show still another embodiment of the camera shutter unit according to the present invention.
Figure 30B:
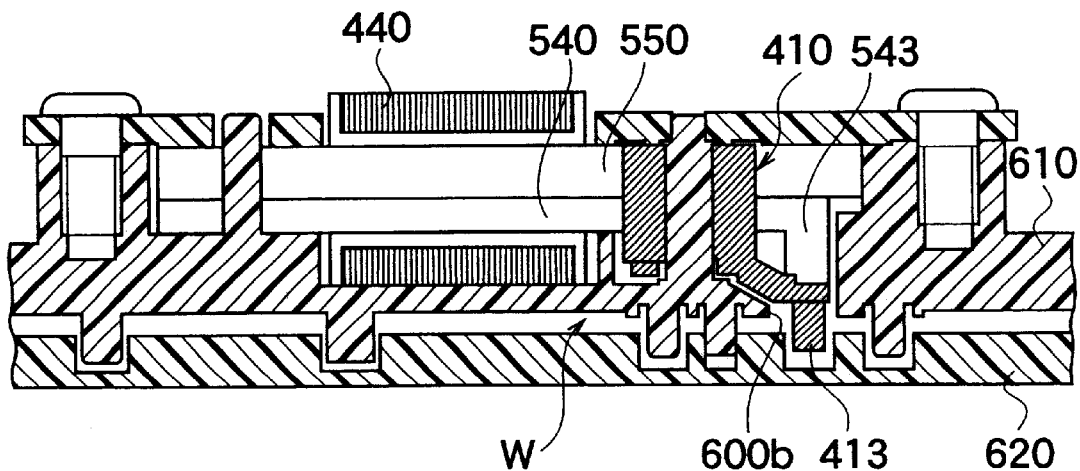

FIGS. 30A and 30B show still another embodiment of the camera shutter unit according to the present invention. The camera shutter unit according to this embodiment is made up of, as shown in FIGS. 30A and 30B, the base plate 600 (front base plate 610 and rear base plate 620), the shutter blade 630, etc., as in the aforementioned embodiment. The electromagnetic actuator shown in FIGS. 25 and 26A through 26E is employed as the driving source.

In detail, the rotor 410 is supported by the front base plate 610 so as to be freely rotated, and the output pin 413 thereof extends to the blade chamber W formed between the front base plate 610 and the rear base plate 620 through the notch hole 600b. Further, the lower yoke 540, which forms the first magnetic pole part 541 (second narrow facing surface 541a), the auxiliary magnetic pole piece 543, and the second magnetic pole part 542 (second wide facing surface 542a and third narrow facing surface 542b), the upper yoke 550, which forms the first magnetic pole part 551 (first wide facing surface 551a and first narrow facing surface 551b) and the second magnetic pole part 552 (second wide facing surface 552a and third narrow facing surface 552b), the coil 440, etc., are disposed and fixed to the front base plate 610. The operation of the shutter is well known, and the operation of the electromagnetic actuator is performed in the same way as mentioned above, and therefore a description is omitted here.

According to this embodiment, the shutter blade 630 is driven by a rotational driving force through low power consumption in a current-running state, and the shutter blade 630 is infallibly maintained at a predetermined resting position (initial position) by a strong maintaining force especially in a current-stopped state.

An example where the output pin 413 is used also as the projection of the rotor 410 is given in the aforementioned embodiments. However, a projection independent of the output pin 413 may be provided.

The auxiliary magnetic pole pieces 423, 523, 543 are formed by bending the planar lower yokes 420, 520, 540, respectively. However, without being limited to this, other shapes can be employed.

Further, concerning the length with which the first wide facing surfaces 421a, 431a, 531a, 551a, the first narrow facing surfaces 521a, 551b, the second wide facing surfaces 422a, 432a, 542a, 552a, the second narrow facing surfaces 522a, 532a, 541a, and the third narrow facing surfaces 542b, 552b each face the outer circumferential surface of the rotor 410, these lengths are not limited to those shown in the aforementioned embodiments. A desired static attraction force or rotational driving force can be obtained through appropriate selection.

As described above, according to the electromagnetic actuator of the present invention, a wide facing surface or a narrow facing surface is appropriately set as the first magnetic pole part or as the second magnetic pole part that faces the outer circumferential surface of the rotor, thus making it possible to raise a magnetic urging force in the current-stopped state without entailing an increase in the actuating voltage i.e., with the aim of reducing power consumption, and making it possible to infallibly maintain the rotor at a predetermined initial position. Additionally, a strong rotational driving force can be obtained in the current-running state. Additionally, it is possible to obtain a strong rotational driving force (return force) from the maximum rotational position to the resting position.

Further, according to the camera shutter unit of the present invention, the shutter blade can be infallibly maintained at a predetermined resting position in the current-stopped state, and can be swiftly opened or closed by applying the current.

Figure 31:
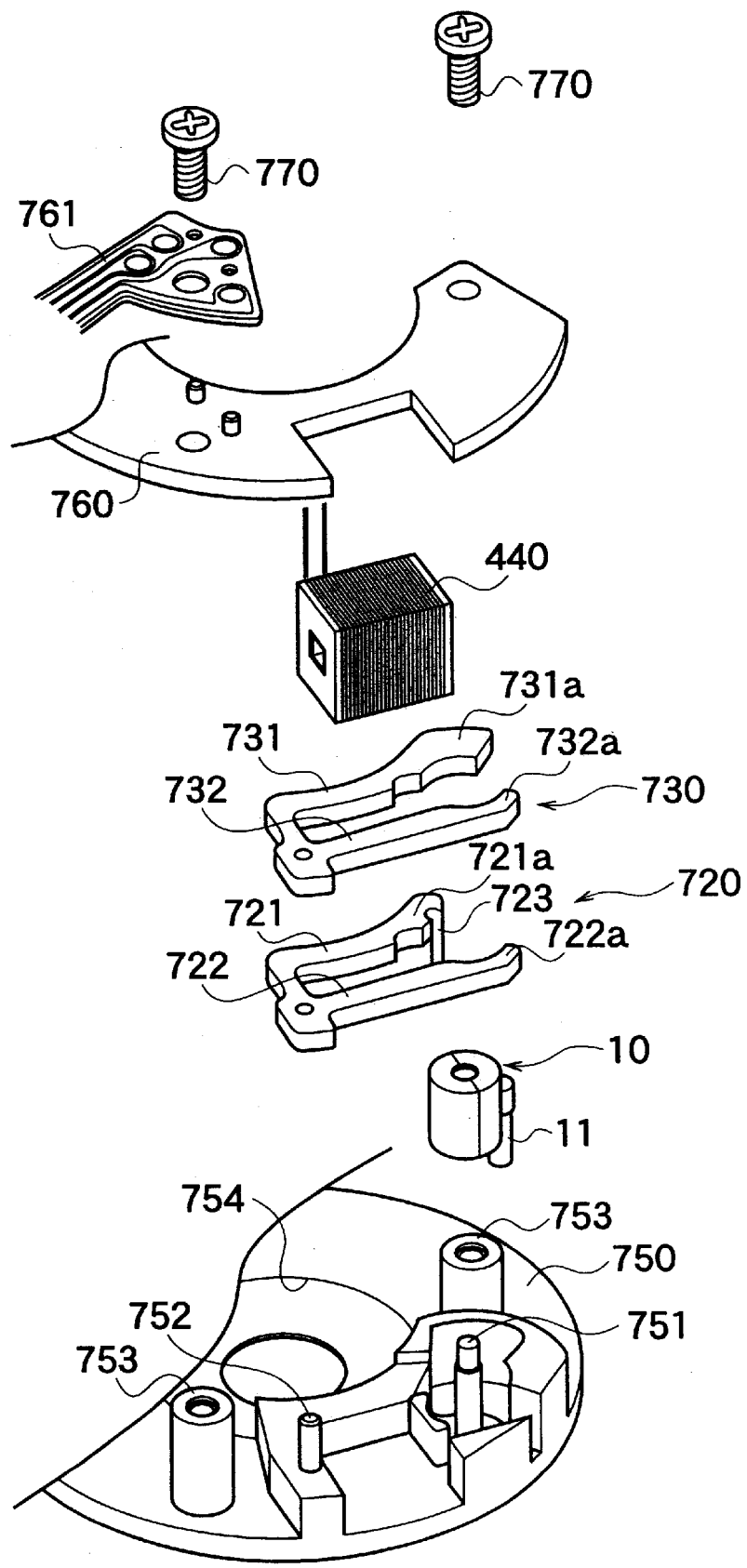
FIG. 31 is an exploded perspective view showing one embodiment of the electromagnetic actuator according to the seventh aspect of the present invention.
Figure 32A:
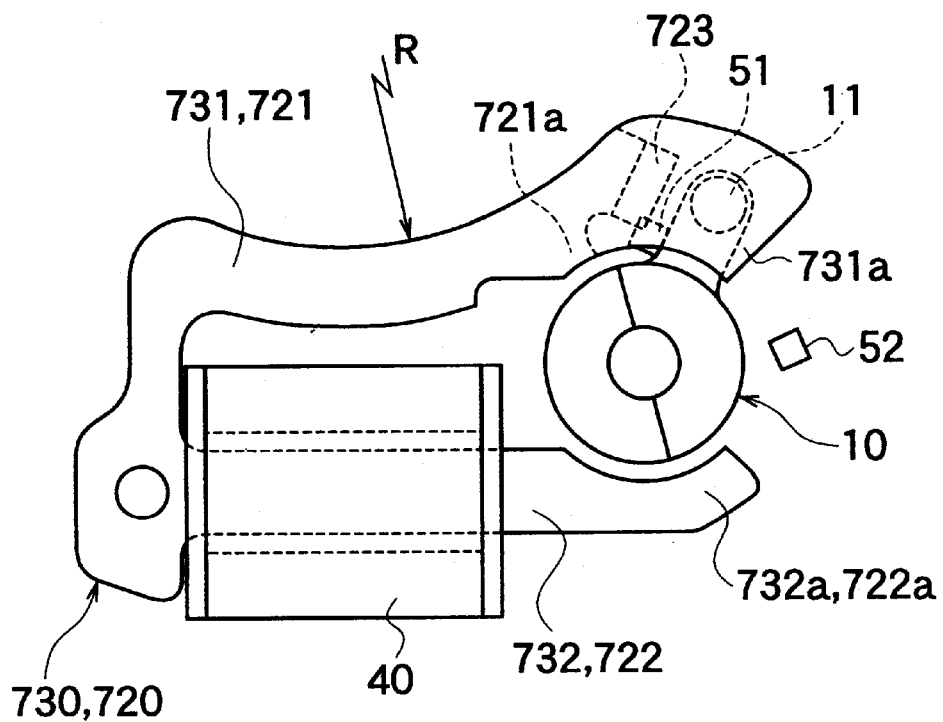
FIG. 32A is a plan view showing the rotor in the resting position in the electromagnetic actuator shown in FIG. 31.
Figure 32B:
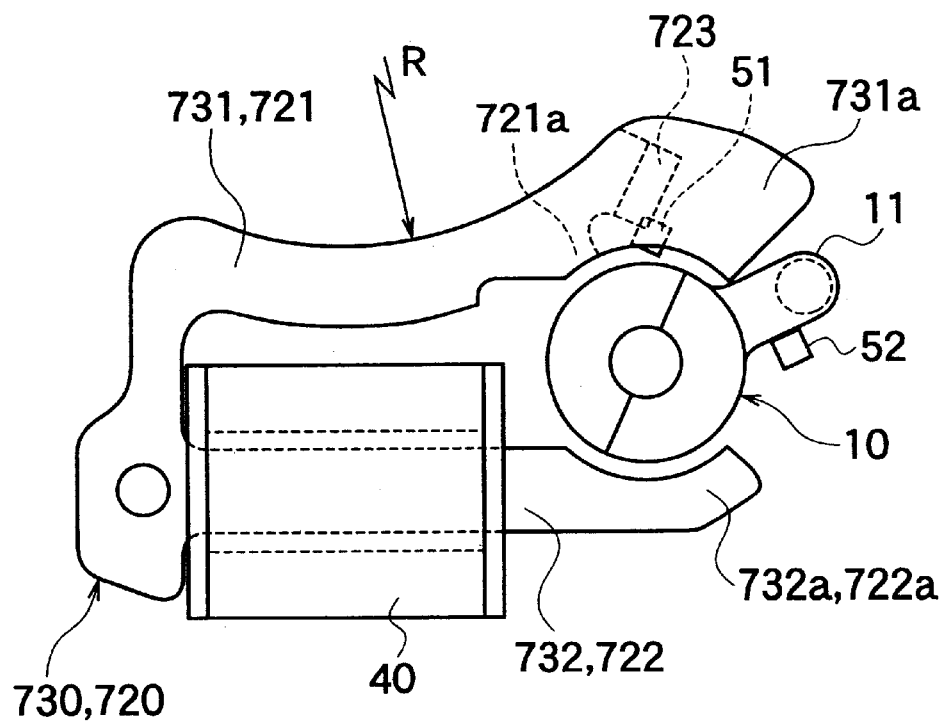
FIG. 32B is a plan view showing the rotor in the maximum rotational position.

FIGS. 31, 32A, and 32B show an embodiment of the electromagnetic actuator according to a seventh aspect of the present invention. FIG. 32A shows the rotor 10 located at the initial position, and FIG. 32B shows the rotor 10 located at the maximum rotational position. As shown in FIGS. 31, 32A, 32B, the electromagnetic actuator according to this embodiment is made up of the rotor 10, a lower yoke 720 that has first and second magnetic pole parts 721 and 722 disposed to face the outer circumferential surface of the rotor 10 and that has an auxiliary magnetic pole piece 723 formed in the vicinity of the first magnetic pole part 721, an upper yoke 730 that has first and second magnetic pole parts 731 and 732 disposed to face the outer circumferential surface of the rotor 10, a magnetizing coil 440 wrapped (i.e., wound) around a bobbin integrally surrounding the lower and upper yokes 720 and 730 laid on each other, and so on.

The lower yoke 720 has a first long part 721 and a second long part 722 that branch off in two directions as shown in FIGS. 31, 32A, and 32B. The first long part 721 is bent according to predetermined curvature (1/R), and a first magnetic pole part 721a having an arcuate surface and the auxiliary magnetic pole piece 723 bent downward are formed at its end. The second long part 722 is formed to be straight, and a second magnetic pole part 722a having an arcuate surface is formed at its end.

The upper yoke 730 has a first long part 731 and a second long part 732 that branch off in two directions as shown in FIGS. 31, 32A, and 32B. The first long part 731 is bent according to predetermined curvature (1/R), and a first magnetic pole part 731a having an arcuate surface is formed at its end. The second long part 732 is formed to be straight, and a second magnetic pole part 732a having an arcuate surface is formed at its end. The arcuate surface of the first magnetic pole part 731a and the arcuate surfaces of the second magnetic pole parts 722a and 732a each have the same width in the circumferential direction. The arcuate surface of the first magnetic pole part 721a is narrower than the aforementioned arcuate surface.

With the lower and upper yokes 720 and 730 laid on each other, the coil 40 is wrapped around the second long parts 722 and 732 through a bobbin. That is, since the second long parts 722 and 732 are shaped straight, the coil 40 is easily attached or detached, and assembling is improved. On the other hand, since the first long parts 721 and 731 are shaped curvedly, they are modularized. Therefore, if the present invention is applied to, for example, a camera shutter unit, it will contribute to size reduction of the unit.

In more detail, when the present invention is applied to a camera shutter unit as shown in FIG. 31, the rotor 10 is mounted to a supporting shaft 751 formed on the base plate 750 so as to be freely rotated, and the lower and upper yokes 720 and 730 are fitted onto a positioning shaft 752 formed on the base plate 750 and are piled together. Thereafter, they are pressed by a cover plate 760 from the upper side, are then provided with wires 761, and are fastened to a boss 753 formed on the base plate 750 by means of a bolt 770.

Herein, since the first long parts 731 and 721 of the upper and lower yokes 730 and 720 are disposed along the edge of an opening 754 of the base plate 750, a useless space is not produced between the opening 754 and the first long parts 731, 721, thus enabling the consolidation of the unit, and making the unit more compact.

Since the operation and other structures of the electromagnetic actuator according to this embodiment are the same as those of the aforementioned electromagnetic actuator according to the first aspect of the present invention, a description is omitted.

Figure 33A:
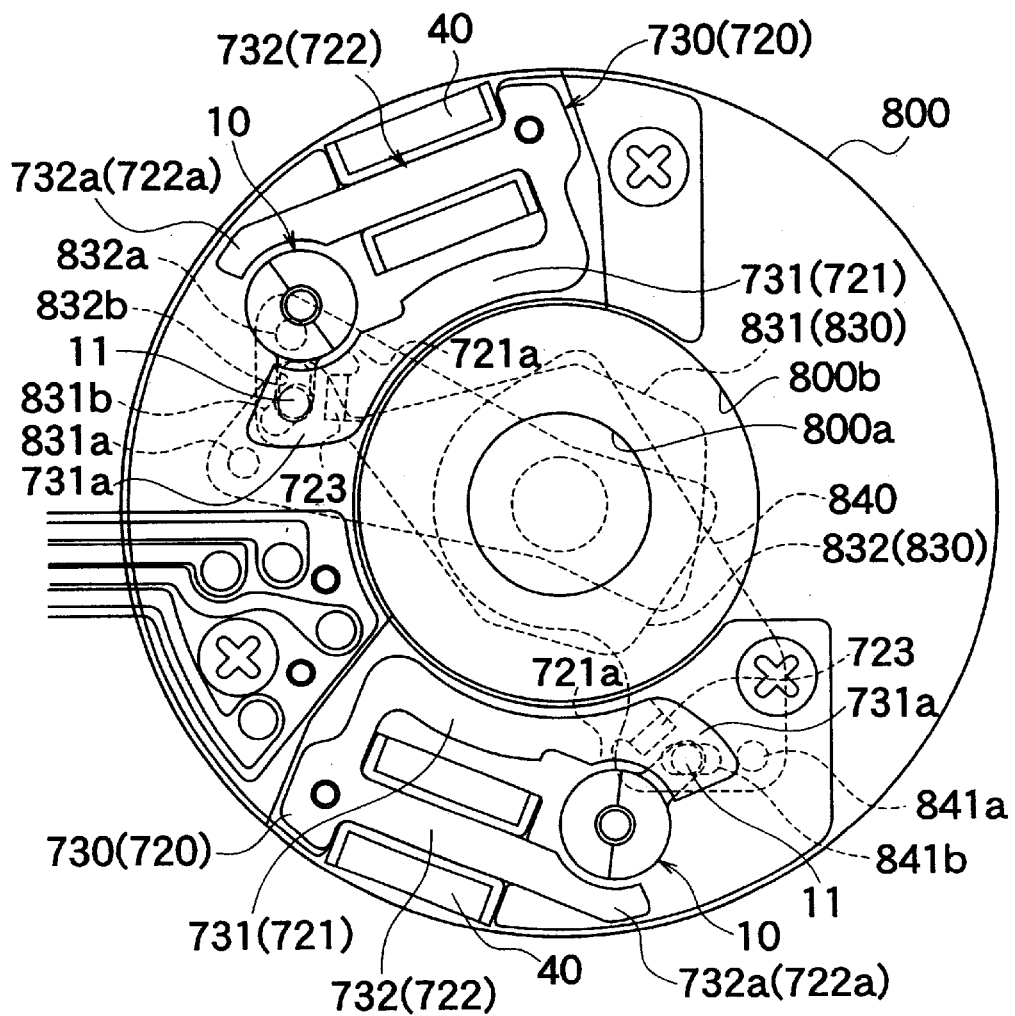
FIGS. 33A and 33B show still another embodiment of the camera shutter unit according to the present invention.
Figure 33B:
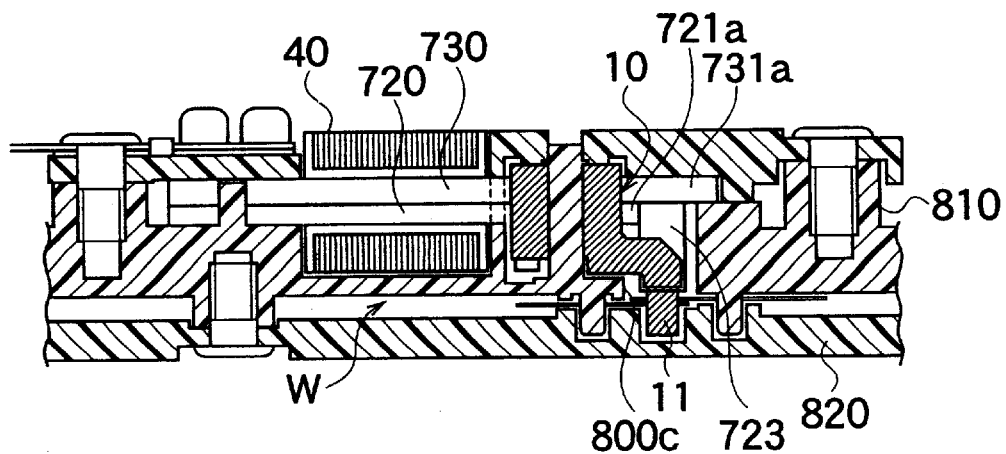

FIGS. 33A and 33B show an embodiment of the camera shutter unit according to the present invention. The camera shutter unit according to this embodiment is made up of, as shown in FIGS. 33A and 33B, a base plate 800 (front base plate 810 and rear base plate 820) that defines an opening 800a for exposure through which a beam of light passes and an opening 800b having a greater aperture outside the opening 800a, a shutter blade 830 disposed to freely reciprocate between an open position where the opening 800a is opened and a closed position where the opening 800a is closed, a first driving source M1 connected to the shutter blade 830 so as to exert a driving force thereon and reciprocate it, a diaphragm blade 840 used to restrict the opening 800a to a predetermined aperture, and a second driving source M2 connected to the diaphragm blade 840 so as to exert a driving force thereon and reciprocate it, and so on. In this embodiment, the electromagnetic actuators shown in FIGS. 31, 32A, and 32B are employed as the first and second driving sources M1 and M2.

In detail, the rotor 10 that serves as the first and second driving sources M1 and M2 is supported by the front base plate 810 so as to be freely rotated, and the output pins 11 extend to the blade chamber W formed between the front and rear base plates 810 and 820 through a notch hole 800c. The lower yoke 720 that forms the first magnetic pole part 721a, the auxiliary magnetic pole piece 723, and the second magnetic pole part 722a, the upper yoke 730 that forms the first magnetic pole part 731a and the second magnetic pole part 732a, the coil 40, etc., are disposed and fixed to the front base plate 810.

The shutter blade 830 consists of two shutter blades, i.e., a first shutter blade 831 and a second shutter blade 832, and are supported by the front base plate 810 so as to be freely rotated upon supporting shafts 831a and 832a, respectively. Further, the output pin 11 of the rotor 10 is connected to long holes 831b and 832b so as to transmit a rotational driving force to the shutter blade 830. The front base plate 810 is provided with a stopper (not shown) by which the moving range of the shutter blade 830 is restricted.

The diaphragm blade 840 is supported by the front base plate 810 so as to be freely rotated upon a supporting shaft 841a, and the output pin 11 of the rotor 10 is connected to a long hole 841b so as to transmit a rotational driving force to the diaphragm blade 840. The front base plate 810 is further provided with a stopper (not shown) by which the moving range of the diaphragm blade 840 is restricted.

The operation of the shutter blade 830 and the operation of the diaphragm blade 840 are well known, and the operation of the electromagnetic actuator is performed in the same way as above, and therefore a description is omitted here.

According to this embodiment, the shutter blade 830 and the diaphragm blade 840 are driven by a desired rotational driving force through low power consumption in the current-running state, whereas the shutter blade 830 and the diaphragm blade 840 are infallibly maintained at a predetermined resting position (initial position) in the current-stopped state. Further, since the first long parts 731 and 721 of the upper and lower yokes 730 and 720 are curved along the edge of the opening 800b, the electromagnetic actuator can be disposed near the opening 800b, and the whole of the unit can be made compact.

INDUSTRIAL APPLICABILITY

As described above, the electromagnetic actuator according to the present invention is useful as a driving source for driving a small-sized unit of a low power consumption type, and is suitable especially as a driving source for driving a shutter blade or a diaphragm blade of a camera shutter unit, for example. Further, such a camera shutter unit using the electromagnetic actuator is suitable for a small-sized digital camera or the like.

What is claimed is:

1. An electromagnetic actuator characterized in that it comprises:

a magnetizing coil;

a rotor that is magnetized with different polarities and rotates by a predetermined angle range between an initial position taken when an electric current is stopped and a maximum rotational position where the rotor rotates angularly to the maximum when an electric current is applied, thereby outputting a driving force; and a first magnetic pole part and a second magnetic pole part that are disposed so as to face an outer circumferential surface of the rotor and that generate mutually different magnetic poles through a magnetic path when an electric current is passed through the coil;

wherein the rotor has a projection that is magnetized with one of the different polarities and that projects outward in its radial direction, and an auxiliary magnetic pole piece is provided in the vicinity of the first magnetic pole part, the auxiliary magnetic pole piece being disposed so as to be close to or be in contact with the projection when the rotor is located at the initial position, and the auxiliary magnetic pole piece generating the same magnetic pole as the first magnetic pole part when a current is applied.

2. An electromagnetic actuator characterized in that it comprises:

a magnetizing coil;

a rotor that is magnetized with different polarities and rotates by a predetermined angle range between an initial position taken when an electric current is stopped and a maximum rotational position where the rotor rotates angularly to the maximum when an electric current is applied, thereby outputting a driving force; and a first magnetic pole part and a second magnetic pole part that are disposed so as to face an outer circumferential surface of the rotor and that generate mutually different magnetic poles through a magnetic path when an electric current is passed through the coil;

wherein the rotor has a projection that is magnetized with one of the different polarities and that projects outward in its radial direction, a first auxiliary magnetic pole piece is provided in the vicinity of the first magnetic pole part, the first auxiliary magnetic pole piece being disposed so as to be close to or be in contact with the projection when the rotor is located at the initial position, and the first auxiliary magnetic pole piece generating the same magnetic pole as the first magnetic pole part when a current is applied, and a second auxiliary magnetic pole piece is provided in the vicinity of the second magnetic pole part, the second auxiliary magnetic pole piece being disposed so as to be close to or be in contact with the projection when the rotor is located at the maximum rotational position, and the second auxiliary magnetic pole piece generating the same magnetic pole as the second magnetic pole part when a current is applied.

3. The electromagnetic actuator as recited in claim 1 or 2, characterized in that the auxiliary magnetic pole piece is formed by bending a planar magnetic member so as to be close to or be in contact with the projection.

4. The electromagnetic actuator as recited in claim 1 or 2, characterized in that the rotor has an output pin, integrally formed, for outputting its rotational driving force, and the output pin is used also as the projection.

5. The electromagnetic actuator as recited in claim 1, characterized in that the first magnetic pole part and the second magnetic pole part are positioned at both ends, respectively, of a magnetic-path forming member that has a part around which the coil is wrapped and that forms a magnetic path, the auxiliary magnetic pole piece branching from a part that forms the first magnetic pole part, and the coil being wrapped around two places of the magnetic-path forming member.

6. The electromagnetic actuator as recited in claim 2, characterized in that the first magnetic pole part and the second magnetic pole part are positioned at both ends, respectively, of a magnetic-path forming member that has a part around which the coil is wrapped and that forms a magnetic path, the first auxiliary magnetic pole piece branching from a part that forms the first magnetic pole part, the second auxiliary magnetic pole piece branching from a part that forms the second magnetic pole part, and the coil being wrapped around two places of the magnetic-path forming member.

7. The electromagnetic actuator as recited in claim 1 or 2, characterized in that the first magnetic pole part and the second magnetic pole part are disposed so as to generate a magnetic urging force by which the rotor is returned to the initial position when no current is passed through the coil.

8. The electromagnetic actuator as recited in claim 1 or 2, characterized in that the first magnetic pole part and the second magnetic pole part are disposed so as to generate a magnetic urging force by which the rotor is maintained at the maximum rotational position when the application of a current to the coil is stopped in a state in which the rotor is located at the maximum rotational position.

9. An electromagnetic actuator characterized in that it comprises:

a magnetizing coil;

a rotor that has a first outer circumferential surface and a second outer circumferential surface which are magnetized with different polarities and into which the rotor is divided, the rotor rotating by a predetermined angle range between an initial position taken when an electric current is not applied and a maximum rotational position where the rotor rotates angularly to the maximum when an electric current is applied, thereby outputting a driving force; and a yoke that has a first magnetic pole part and a second magnetic pole part that are disposed so as to face an outer circumferential surface of the rotor, the first and second magnetic pole parts generating mutually different magnetic poles when an electric current is passed through the coil;

wherein the rotor has a projection that is magnetized with one of the different polarities and that projects outward in its radial direction; and, an auxiliary magnetic pole piece is provided in the vicinity of the first magnetic pole part, the auxiliary magnetic pole piece being disposed so as to be close to or be in contact with the projection when the rotor is located at the initial position, and the auxiliary magnetic pole piece generating the same magnetic pole as the first magnetic pole part when a current is applied;

the first magnetic pole part having a first wide facing surface that faces the first outer circumferential surface of the rotor over a length wider than a predetermined length in a rotational direction of the rotor; and the second magnetic pole part having a second wide facing surface that faces the second outer circumferential surface of the rotor over a length wider than a predetermined length in the rotational direction of the rotor.

10. The electromagnetic actuator as recited in claim 9, characterized in that the yoke is made up of a first planar yoke and a second planar yoke that are laid on each other in a direction of a rotational shaft of the rotor, the first yoke being provided with the first wide facing surface, the second wide facing surface, and the auxiliary magnetic pole piece, and the second yoke being provided with the first wide facing surface and the second wide facing surface.

11. An electromagnetic actuator characterized in that it comprises:

a magnetizing coil;

a rotor that has a first outer circumferential surface and a second outer circumferential surface which are magnetized with different polarities and into which the rotor is divided, the rotor rotating by a predetermined angle range between an initial position taken when an electric current is not applied and a maximum rotational position where the rotor rotates angularly to the maximum when an electric current is applied, thereby outputting a driving force; and a yoke that has a first magnetic pole part and a second magnetic pole part that are disposed so as to face an outer circumferential surface of the rotor, the first and second magnetic pole parts generating mutually different magnetic poles when an electric current is passed through the coil;

wherein the rotor has a projection that is magnetized with one of the different polarities and that projects outward in its radial direction; and, an auxiliary magnetic pole piece is provided in the vicinity of the first magnetic pole part, the auxiliary magnetic pole piece being disposed so as to be close to or be in contact with the projection when the rotor is located at the initial position, and the auxiliary magnetic pole piece generating the same magnetic pole as the first magnetic pole part when a current is applied;

the first magnetic pole part having a first wide facing surface that faces the first outer circumferential surface of the rotor over a length wider than a predetermined length in a rotational direction of the rotor, and having a first narrow facing surface narrower than the first wide facing surface that faces the first outer circumferential surface of the rotor; and the second magnetic pole part having a second wide facing surface that faces the second outer circumferential surface of the rotor over a length wider than a predetermined length in the rotational direction of the rotor, and having a second narrow facing surface narrower than the second wide facing surface that faces the second outer circumferential surface of the rotor.

12. The electromagnetic actuator as recited in claim 11, characterized in that the yoke is made up of a first planar yoke and a second planar yoke that are laid on each other in a direction of a rotational shaft of the rotor; the first yoke being provided with the first narrow facing surface, the second narrow facing surface, and the auxiliary magnetic pole piece; and the second yoke being provided with the first wide facing surface and the second wide facing surface.

13. An electromagnetic actuator characterized in that it comprises:

a magnetizing coil;

a rotor that has a first outer circumferential surface and a second outer circumferential surface which are magnetized with different polarities and into which the rotor is divided, the rotor rotating by a predetermined angle range between an initial position taken when an electric current is not applied and a maximum rotational position where the rotor rotates angularly to the maximum when an electric current is applied, thereby outputting a driving force; and a yoke that has a first magnetic pole part and a second magnetic pole part that are disposed so as to face an outer circumferential surface of the rotor, the first and second magnetic pole parts generating mutually different magnetic poles when an electric current is passed through the coil;

wherein the rotor has a projection that is magnetized with one of the different polarities and that projects outward in its radial direction; and, an auxiliary magnetic pole piece is provided in the vicinity of the first magnetic pole part, the auxiliary magnetic pole piece being disposed so as to be close to or be in contact with the projection when the rotor is located at the initial position, and the auxiliary magnetic pole piece generating the same magnetic pole as the first magnetic pole part when a current is applied;

the first magnetic pole part having a first wide facing surface that faces the first outer circumferential surface of the rotor over a length wider than a predetermined length in a rotational direction of the rotor, and having a first narrow facing surface narrower than the first wide facing surface that faces the first outer circumferential surface of the rotor; and the second magnetic pole part having a second narrow facing surface that faces the second outer circumferential surface of the rotor over a narrow length less than a predetermined length in the rotational direction of the rotor.

14. The electromagnetic actuator as recited in claim 13, characterized in that the yoke is made up of a first planar yoke and a second planar yoke that are laid on each other in a direction of a rotational shaft of the rotor; the first yoke being provided with the first narrow facing surface, the second narrow facing surface, and the auxiliary magnetic pole piece; and the second yoke being provided with the first wide facing surface and the second narrow facing surface.

15. An electromagnetic actuator characterized in that it comprises:

a magnetizing coil;

a rotor that has a first outer circumferential surface and a second outer circumferential surface which are magnetized with different polarities and into which the rotor is divided, the rotor rotating by a predetermined angle range between an initial position taken when an electric current is not applied and a maximum rotational position where the rotor rotates angularly to the maximum when an electric current is applied, thereby outputting a driving force; and a yoke that has a first magnetic pole part and a second magnetic pole part that are disposed so as to face the outer circumferential surface of the rotor and that generate mutually different magnetic poles when an electric current is passed through the coil;

wherein the rotor has a projection that is magnetized with one of the different polarities and that projects outward in its radial direction; and an auxiliary magnetic pole piece is provided in the vicinity of the first magnetic pole part, the auxiliary magnetic pole piece being disposed so as to be close to or be in contact with the projection when the rotor is located at the initial position, and the auxiliary magnetic pole piece generating the same magnetic pole as the first magnetic pole part when a current is applied;

the first magnetic pole part having a first wide facing surface that faces the first outer circumferential surface of the rotor over a length wider than a predetermined length in a rotational direction of the rotor, a first narrow facing surface that is disposed close to the first wide facing surface in the rotational direction of the rotor and that is narrower than the first wide facing surface that faces the first outer circumferential surface of the rotor, and a second narrow facing surface that is disposed close to the first wide facing surface in the direction of a rotational shaft of the rotor and that is narrower than the first wide facing surface in the rotational direction of the rotor that faces the first outer circumferential surface of the rotor; and the second magnetic pole part having a second wide facing surface that faces the second outer circumferential surface of the rotor over a length wider than a predetermined length in the rotational direction of the rotor, and a third narrow facing surface that is disposed close to the second wide facing surface in the rotational direction of the rotor and that is narrower than the second wide facing surface.

16. The electromagnetic actuator as recited in claim 15, characterized in that the yoke is made up of a first planar yoke and a second planar yoke that are laid on each other in the direction of the rotational shaft of the rotor; the first yoke being provided with the second narrow facing surface, the second wide facing surface, the third narrow facing surface, and the auxiliary magnetic pole piece; and the second yoke being provided with the first wide facing surface, the first narrow facing surface, the second wide facing surface, and the third narrow facing surface;

wherein the first wide facing surface, the second narrow facing surface, and the second wide facing surface are disposed to face each other with the rotor therebetween; and the first narrow facing surface and the third narrow facing surface are disposed to face each other with the rotor therebetween.

17. The electromagnetic actuator as recited in any one of claims 10, 12, and 14, characterized in that the first wide facing surface of the second yoke is formed by bending a part of the second yoke in the direction of the rotational shaft of the rotor.

18. The electromagnetic actuator as recited in any one of claims 10, 12, 14, and 16, characterized in that the auxiliary magnetic pole piece is formed by bending a part of the first yoke so as to be close to or be in contact with the projection.

19. The electromagnetic actuator as recited in any one of claims 9, 11, 13, and 15, characterized in that the rotor has an output pin that is integrally formed, that is used to output its rotational driving force, and that is used also as the projection.

20. An electromagnetic actuator characterized in that it comprises:

a magnetizing coil;

a rotor that is magnetized with different polarities and that rotates by a predetermined angle range between an initial position taken when an electric current is not applied and a maximum rotational position where the rotor rotates angularly to the maximum when an electric current is applied, thereby outputting a driving force; and a yoke that has a first magnetic pole part and a second magnetic pole part that are disposed so as to face the outer circumferential surface of the rotor, the first and second magnetic pole parts generating mutually different magnetic poles when an electric current is passed through the coil;

wherein the rotor has a projection that is magnetized with one of the different polarities and that projects outward in its radial direction; and an auxiliary magnetic pole piece is provided in the vicinity of the first magnetic pole part, the auxiliary magnetic pole piece being disposed so as to be close to or be in contact with the projection when the rotor is located at the initial position, and the auxiliary magnetic pole piece generating the same magnetic pole as the first magnetic pole part when a current is applied;

the yoke having a first long part that forms the first magnetic pole part in an end area thereof and a second long part that forms the second magnetic pole part in an end area thereof;

the first long part having a bent shape, and the second long part having a linear shape, by which the coil is held.

21. A camera shutter unit characterized in that the unit comprises a base plate to define an opening for exposure, a shutter blade mounted on the base plate so that it can freely reciprocate between an open position where the opening is opened and a closed position where the opening is closed, and a driving source to exert a driving force for reciprocating the shutter blade, the driving source being the electromagnetic actuator as recited in any one of claims 1, 2, 9, 11, 13, 15, and 20.

* * * * *